United States Patent [19]
Maki et al.

[11] Patent Number: 5,758,308
[45] Date of Patent: May 26, 1998

[54] FUEL METERING CONTROL SYSTEM FOR INTERNAL COMBUSTION ENGINE

[75] Inventors: Hidetaka Maki; Shusuke Akazaki; Yusuke Hasegawa; Isao Komoriya; Yoichi Nishimura; Toshiaki Hirota, all of Wako, Japan

[73] Assignee: Honda Giken Kogyo Kabushiki Kaisha, Tokyo, Japan

[21] Appl. No.: 580,632

[22] Filed: Dec. 29, 1995

[30] Foreign Application Priority Data

Dec. 30, 1994 [JP] Japan ................... 6-340034

[51] Int. Cl.⁶ ........................... F02D 41/00
[52] U.S. Cl. ............... 701/104; 701/101; 701/103; 701/102; 123/491; 123/687; 123/478
[58] Field of Search .......... 364/431.051, 431.052, 364/431.053, 431.061, 431.07, 431.03, 431.04; 123/673, 677, 680, 681, 687, 684, 481, 491, 698, 520, 674, 704; 73/117.3, 580; 60/274, 276, 277, 289

[56] References Cited

U.S. PATENT DOCUMENTS

| 4,706,633 | 11/1987 | Nakagawa | 123/491 |
|---|---|---|---|
| 5,343,846 | 9/1994 | Ogawa et al. | 123/520 |
| 5,426,938 | 6/1995 | Ogawa et al. | 60/285 |
| 5,483,935 | 1/1996 | Ogawa et al. | 123/421 |
| 5,505,174 | 4/1996 | Komoriya et al. | 123/417 |
| 5,520,160 | 5/1996 | Aota et al. | 123/675 |
| 5,540,209 | 7/1996 | Hasegawa et al. | 123/679 |
| 5,546,907 | 8/1996 | Komoriya et al. | 123/478 |
| 5,558,076 | 9/1996 | Maki et al. | 123/687 |
| 5,590,638 | 1/1997 | Nishimura et al. | 123/687 |

FOREIGN PATENT DOCUMENTS

| 0 221 386A2 | 5/1987 | European Pat. Off. |
| 0 221 386A3 | 8/1988 | European Pat. Off. |
| 0 221 386B1 | 9/1991 | European Pat. Off. |
| 35 39 395 A1 | 5/1987 | Germany |
| 57-122144 | 7/1982 | Japan |
| 62-150047 | 7/1987 | Japan |
| 64-53038 | 1/1989 | Japan |
| 1-313644 | 12/1989 | Japan |

(List continued on next page.)

OTHER PUBLICATIONS

"Digital Adaptive Control", Computrol (Corona Publishing Co., Ltd.) No. 27, pp. 28–41, published Jul. 10, 1989.

Automatic Control Handbook (Ohm Publishing Co., Ltd.) pp. 703–707, published Oct. 30, 1983.

"A Survey of Model Reference Adaptive Techniques – Theory and Applications" by I.D. Landau In Automatica, vol. 10, pp. 353–379 published Jun. 18–21 1973.

"Unification of Discrete Time Explicit Model Reference Adaptive COntrol Designs" by I.D. Landau et al. In Automatica, vol. 17, No. 4, pp. 593–611, Jan. 1981.

"Combining Model Reference Adaptive Controller and Stochastic Self–tuning Regulators" by I.D. Landau In Automatica vol. 18, No. 1, pp. 77–84, published Aug. 1981.

*Primary Examiner*—Jacques H. Louis-Jacques
*Attorney, Agent, or Firm*—Nikaido, Marmelstein, Murray & Oram LLP

[57] ABSTRACT

A fuel metering control system for an internal combustion engine having a plurality of cylinders. The system includes an air/fuel ratio sensor and engine operating condition detecting device for detecting engine operating conditions at least including engine speed and engine load. The basic quantity of fuel injection is determined by retrieving mapped data predetermined based on an effective opening area of a throttle valve, according to the engine speed and engine load. An adaptive controller is provided to calculate a feedback correction coefficient to correct the quantity of basic fuel injection such that the detected air/fuel ratio is brought to a desired value. The output quantity of fuel injection is further corrected by fuel adhered on an intake manifold wall.

14 Claims, 49 Drawing Sheets

FOREIGN PATENT DOCUMENTS

| | | |
|---|---|---|
| 2-67443 | 3/1990 | Japan . |
| 2-275043 | 11/1990 | Japan . |
| 4-321740 | 11/1992 | Japan . |
| 6-017680 | 1/1994 | Japan . |
| 6-294014 | 3/1994 | Japan . |
| 7-83094 | 3/1995 | Japan . |
| 7-247886 | 9/1995 | Japan . |
| 7-259588 | 10/1995 | Japan . |
| 7-279774 | 10/1995 | Japan . |
| 8-423380 | 2/1996 | Japan . |

FIG. 14

| | Pb |
|---|---|
| Ne | Desired A/F (KBS) |

FIG. 22

|    | Pb      |
|----|---------|
| Ne | KEGRMAP |

FIG. 23

|    | Pb   |
|----|------|
| Ne | LCMD |

FIG. 25

KEGRN

| Current value | NO 0 |
|---|---|
| 1 TDC earlier | 1 |
| 2 TDCs earlier | 2 |
| 3 TDCs earlier | 3 |
| 4    // | 4 |
| 5    // | 5 |
| 6    // | 6 |
| 7    // | 7 |
| 8    // | 8 |
| 9    // | 9 |
| 10   // | 10 |
| 11   // | 11 |
| 12   // | 12 |
| ⋮ | ⋮ |
| n | n |

FIG. 26

| | Pb | | | |
|---|---|---|---|---|
| Ne | | | | |
| | | | τ | |
| | | | | |
| | | | | |

FIG.55
| | Pb |
|---|---|
| Ne | A for LoV/T |
| | Pb |
|---|---|
| Ne | A for HiV/T |
| | Pb |
|---|---|
| Ne | B for LoV/T |
| | Pb |
|---|---|
| Ne | B for HiV/T |
FIG.56
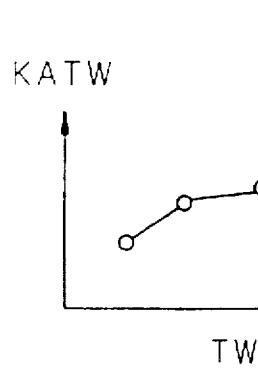
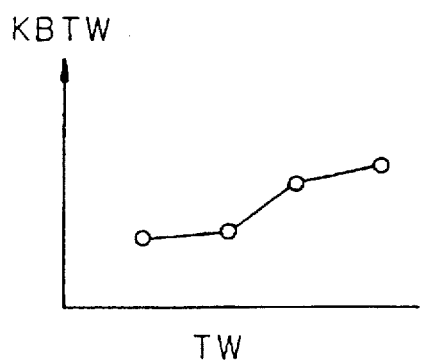

FUEL METERING CONTROL SYSTEM FOR INTERNAL COMBUSTION ENGINE

BACKGROUND OF THE INVENTION

1. Field of the Invention

This invention relates to a fuel metering control system for an internal combustion engine.

2. Description of the Related Art

There has been proposed a fuel metering control system for a multicylinder internal combustion engine where a sensor is installed for detecting the air/fuel ratio of the engine exhaust and for feedback controlling the air/fuel ratio to a desired value, as taught, for example, by Japanese Patent Publication No. Sho 62(1987)-20,365.

In the prior art fuel metering control systems including the one just mentioned, the amount of air or fuel is determined by using various correction factors which have initially been designed. Since, however, the correction factors have often been designed as general terms and have not been designed as countermeasures for a specific problem, when the air/fuel ratio deviates from a desired value, it is difficult to know that the deviation results from the determination of the amount of intake air, or from the fuel transport delay, or from the feedback system.

In other words, since the correction factors are related to each other, it is difficult to determine which factor is dominant in the relationship between the deviation and these specific causes of the deviation. As a result, it is impossible to supply the engine exhaust at an optimum air/fuel ratio to a catalytic converter.

SUMMARY OF THE INVENTION

An object of the invention is therefore to provide a fuel metering control system for an internal combustion engine provided with an air/fuel ratio sensor at its exhaust system which can solve the above problem and makes it possible to improve control performance, by classifying correction factors into one for determining the amount of intake air, one for fuel transport delay and one for feedback control such that they function independently, thereby enhancing the purification efficiency of the catalytic converter.

This invention achieves this object by providing a system for controlling fuel metering for an internal combustion engine having an air intake system including a throttle valve, a plurality of cylinders, and an exhaust system, comprising, an air/fuel ratio sensor located in the exhaust system of the engine for detecting an air/fuel ratio of an exhaust gas of the engine, engine operating condition detecting means for detecting engine operating conditions including at least engine speed and engine load, basic fuel injection quantity determining means for determining basic a quantity of fuel injection for individual cylinders based on at least the detected engine operating conditions and a change in effective opening area of the throttle valve, a catalytic converter installed downstream of said air/fuel ratio sensor, a feedback loop for calculating a feedback correction coefficient to correct the basic quantity of fuel injection such that the detected air/fuel ratio detected by said air/fuel ratio sensor is brought to a desired air/fuel ratio, output fuel injection quantity determining means for correcting the basic quantity of fuel injection based on the feedback correction coefficient, to determine an output quantity of fuel injection, fuel adhesion correction means for determining an adhered fuel correction based on quantity of fuel adhered on an intake manifold wall of the engine, output fuel injection correcting means for correcting the output quantity of fuel injection based on the adhered fuel correction, and fuel injector means for injecting fuel in the individual cylinders of the engine based on the corrected quantity of fuel injection.

BRIEF EXPLANATION OF THE DRAWINGS

These and other objects and advantages of the invention will be more apparent from the following description and drawings, in which:

FIG. 14 is a view explaining the characteristics of mapped data of a base value of a desired air/fuel ratio referred to in the calculation of FIG. 9;

FIG. 22 is an explanatory view showing the characteristics of mapped data of a coefficient KEGRMAP;

FIG. 23 is an explanatory view showing the characteristics of mapped data of a command value for valve lifting amount LCMD;

FIG. 25 is an explanatory view showing the configuration of a ring buffer used in the flowchart of FIG. 24;

FIG. 26 is an explanatory view showing the characteristics of mapped data of a delay time τ used in the flowchart of FIG. 24;

FIG. 55 is a graph showing the direct ratio etc., referred to in the flowchart of FIG. 54;

FIG. 56 is a graph showing the characteristics of the coefficient referred to in the flowchart of FIG. 54;

PREFERRED EMBODIMENTS OF THE INVENTION

Embodiments of the invention will now be explained with reference to the drawings.

Figure 1:
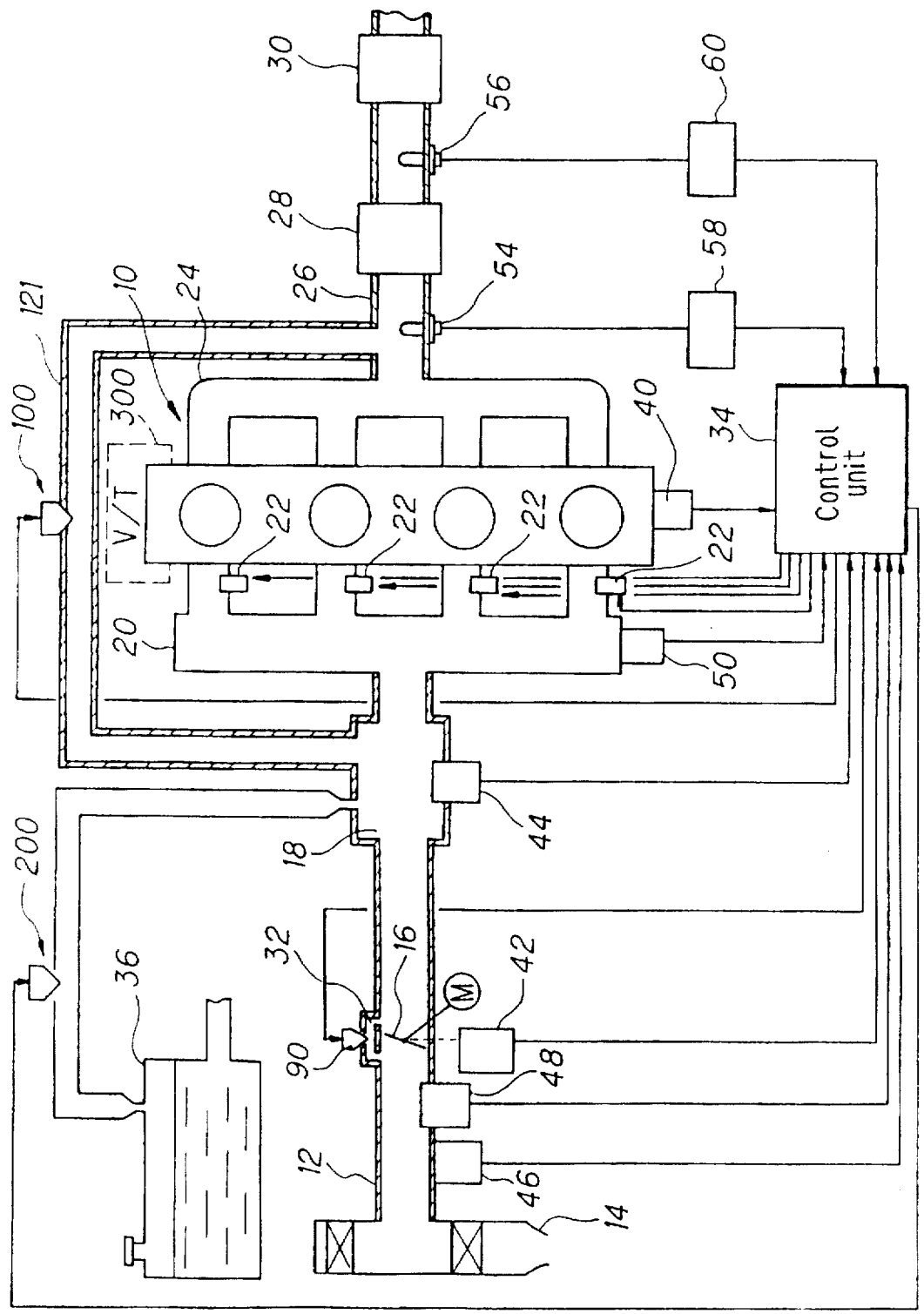
FIG. 1 is an overall schematic view showing a fuel metering control system for an internal combustion engine according to the present invention.

FIG. 1 is an overview of a fuel metering control system for an internal combustion engine according to the invention.

Reference numeral 10 in this figure designates an overhead cam (OHC) in-line four-cylinder internal combustion engine. Air drawn into an air intake pipe 12 through an air cleaner 14 mounted on a far end thereof is supplied to the first to fourth cylinders through a surge tank 18, an intake manifold 20 and two intake valves (not shown), while the flow thereof is adjusted by a throttle valve 16. A fuel injector 22 for injecting fuel is installed in the vicinity of the intake valves of each cylinder. The injected fuel mixes with the intake air to form an air-fuel mixture that is ignited in the associated cylinder by a spark plug (not shown) in the firing order of #1, #3, #4 and #2 cylinder. The resulting combustion of the air-fuel mixture drives down a piston (not shown).

The exhaust gas produced by the combustion is discharged through two exhaust valves (not shown) into an exhaust manifold 24, from where it passes through an exhaust pipe 26 to a first catalytic converter (three-way catalyst) 28 and a second catalytic converter 30 (also a three-way catalyst) where noxious components are removed therefrom before it is discharged to the external atmosphere. Not mechanically linked with the accelerator pedal (not shown), the throttle valve 16 is controlled to a desired degree of opening by a stepping motor M. In addition, the throttle valve 16 is bypassed by a bypass 32 provided at the air intake pipe 12 in the vicinity thereof.

The engine 10 is equipped with an exhaust gas recirculation (EGR) mechanism 100 which recirculates a part of the exhaust gas to the intake side.

Figure 2:
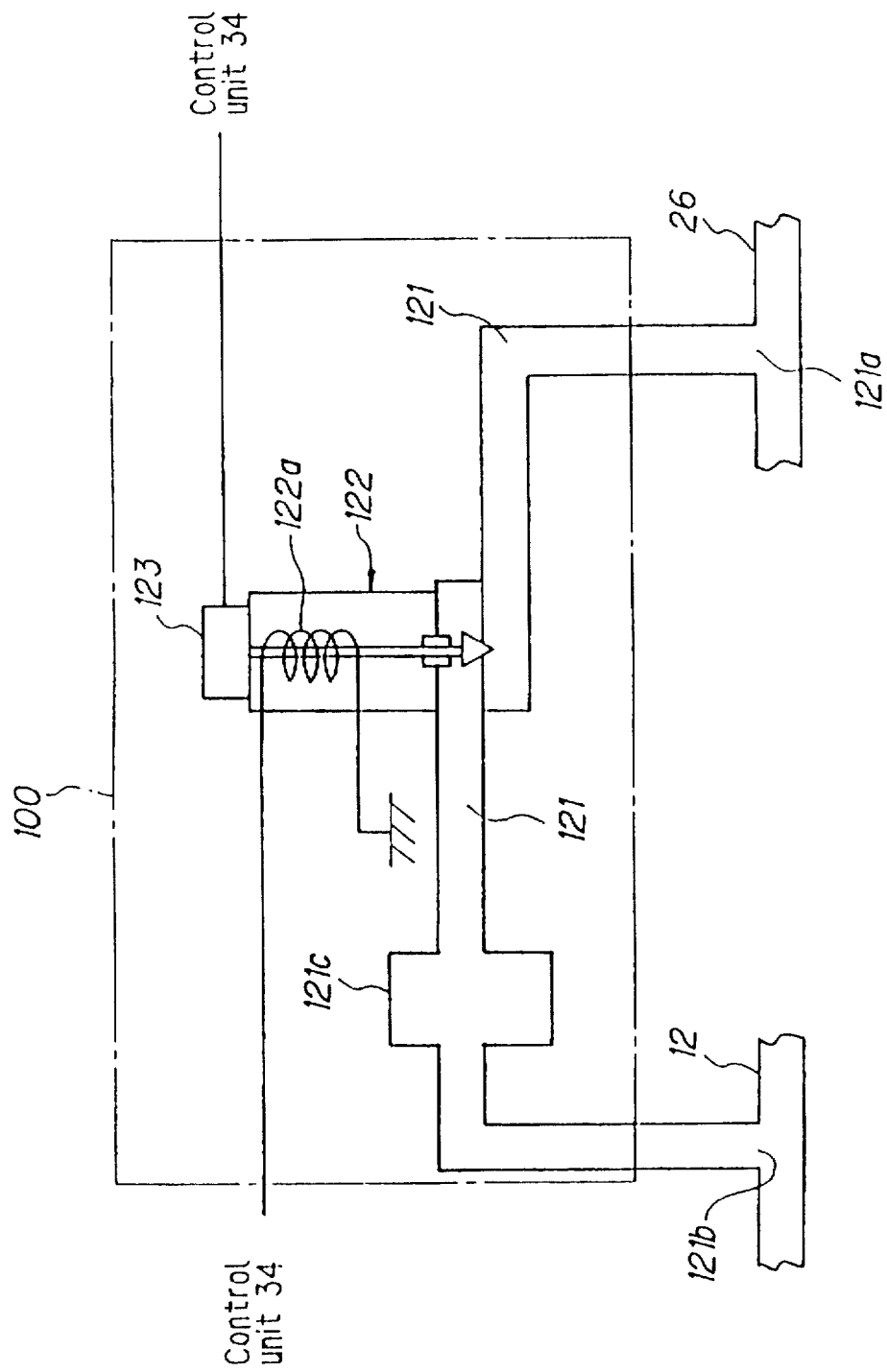
FIG. 2 is a schematic view showing the details of an exhaust gas recirculation (EGR) mechanism illustrated in FIG. 1.

More specifically, as shown in FIG. 2, the exhaust gas recirculation mechanism 100 has an exhaust gas recirculation pipe 121 having one end (port) 121a connected with the exhaust pipe 26 on the upstream side of the first catalytic converter 28 (not shown in FIG. 2) and another end (port) 121b connected to the air intake pipe 12 on the downstream side of the throttle valve 16 (not shown in FIG. 2). For regulating the amount of recirculated exhaust gas, an EGR (exhaust gas recirculation) control valve 122 and a surge tank 121c are provided at an intermediate portion of the exhaust gas recirculation pipe 121. The EGR control valve 122 is a solenoid valve having a solenoid 122a which is connected to a control unit (ECU) 34 (described later). The EGR control valve 122 is linearly controlled to the desired degree of opening by an output from the control unit 34 to the solenoid 122a. The EGR control valve 122 is provided with a lift sensor 123 which detects the degree of opening of the EGR control valve 122 and sends a corresponding signal to the control unit 34.

The engine 10 is also equipped with a canister purge mechanism 200 connected between the air intake system and a fuel tank 36.

Figure 3:
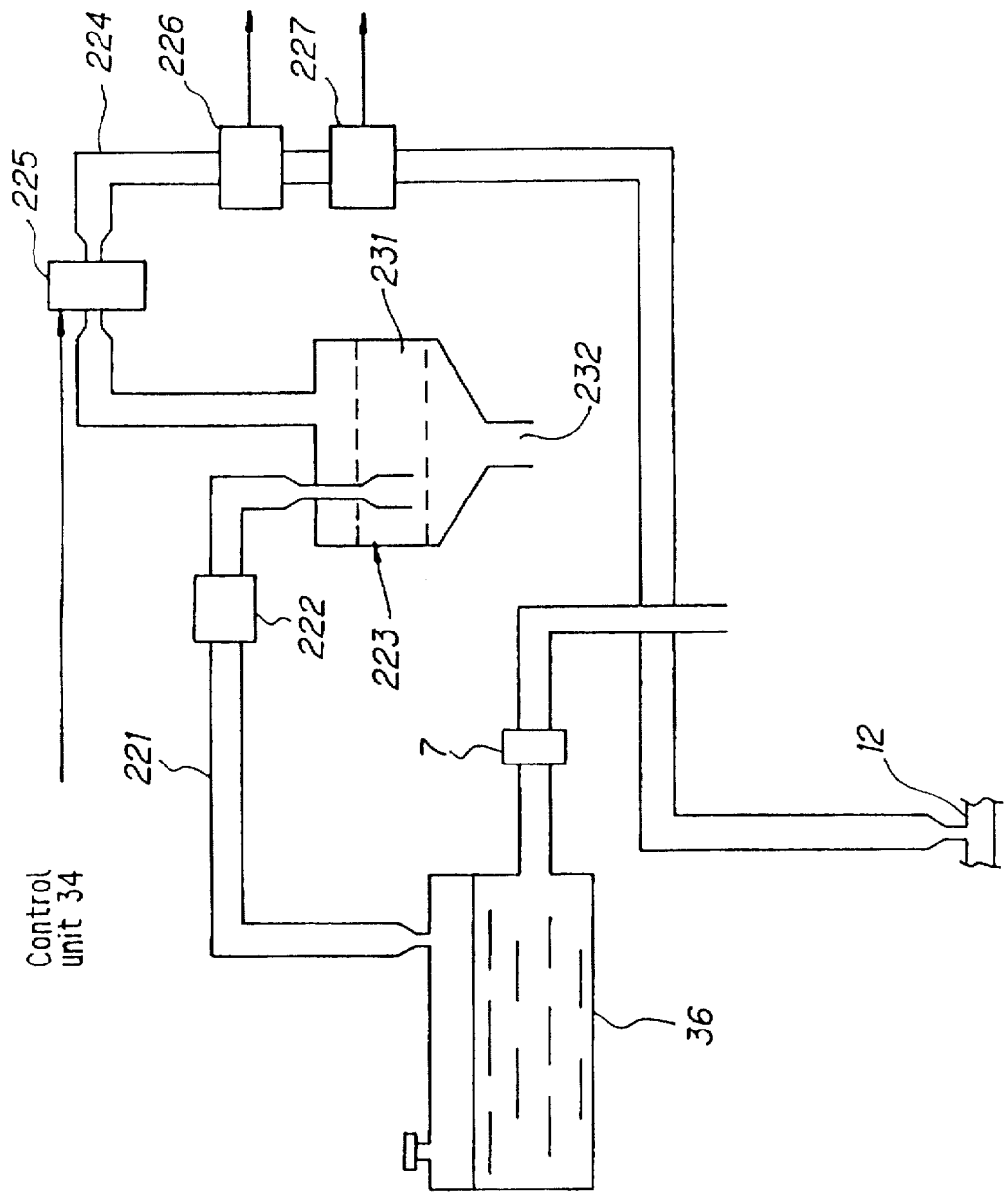
FIG. 3 is a schematic view showing the details of a canister purge mechanism illustrated in FIG. 1.

As shown in FIG. 3, the canister purge mechanism 200, which is provided between the top of the sealed fuel tank 36 and a point on the air intake pipe 12 downstream of the throttle valve 16, comprises a vapor supply pipe 221, a canister 223 containing an absorbent 231, and a purge pipe 224. The vapor supply pipe 221 is fitted with a two-way valve 222, and the purge pipe 224 is fitted with a purge control valve 225, a flow meter 226 for measuring the amount of air-fuel mixture containing fuel vapor flowing through the purge pipe 224 and a hydrocarbon (HC) concentration sensor 227 for detecting the HC concentration of the air-fuel mixture. The purge control valve (solenoid valve) 225 is connected to the control unit 34 and is linearly controlled to the desired degree of opening by a signal from the control unit 34.

When the amount of fuel vapor generated in the fuel tank 36 reaches a prescribed level, it pushes open the positive pressure valve of the two-way valve 222 and flows into the canister 223, where it is stored by absorption on the absorbent 231. Then when the purge control valve 225 is opened to an amount corresponding to the duty ratio of the on/off signal from the control unit 34, the vaporized fuel temporarily stored in the canister 223 and air drawn in through an external air intake 232 are together sucked into the air intake pipe 12 owing to the negative pressure in the air intake pipe 12. On the other hand, when the negative pressure in the fuel tank 36 increases owing to cooling of the fuel tank by the ambient air temperature, for example, the negative valve of the two-way valve 222 opens to allow the vaporized fuel temporarily stored in the canister 223 to return to the fuel tank 36.

Figure 4:
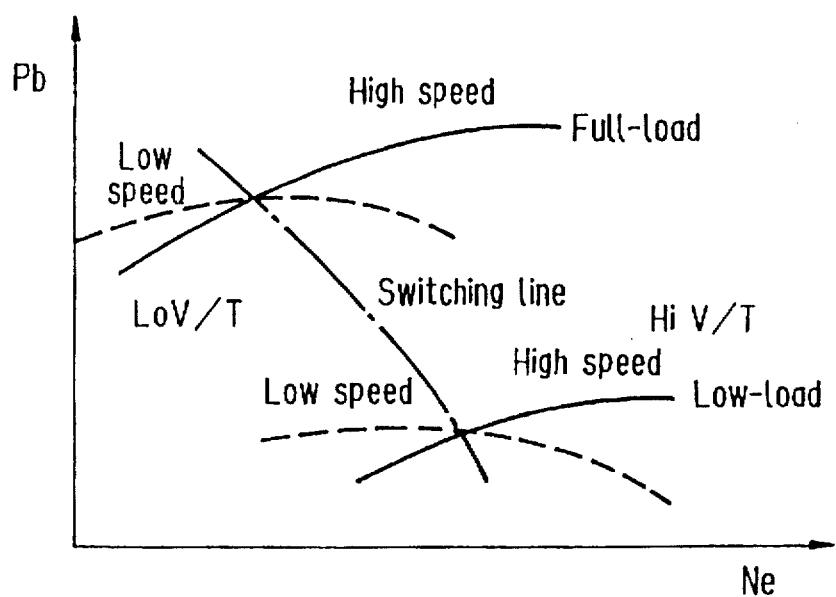
FIG. 4 is a graph showing the valve timing characteristics of a variable valve timing mechanism illustrated in FIG. 1.

The engine 10 is also equipped with a variable valve timing mechanism 300 (denoted as V/T in FIG. 1). As taught by Japanese Laid-open Patent Application No. Hei 2(1990) -275,043, for example, the variable valve timing mechanism 300 switches the opening/closing timing of the intake and/or exhaust valves between two types of timing characteristics, a characteristic for low engine speed designated LoV/T and a characteristic for high engine speed designated HiV/T, as illustrated in FIG. 4, in response to engine speed Ne and manifold pressure Pb. Since this is a well-known mechanism, however, it will not be described further here. (Among the different ways of switching between valve timing characteristics is included that of deactivating one of the two intake valves.)

The engine 10 of FIG. 1 is provided in its ignition distributor (not shown) with a crank angle sensor 40 for detecting the piston crank angles and is further provided with a throttle position sensor 42 for detecting the degree of opening of the throttle valve 16, and a manifold absolute pressure sensor 44 for detecting the pressure Pb of the intake manifold downstream of the throttle valve 16 in terms of absolute value. An atmospheric pressure sensor 46 for detecting atmospheric pressure Pa is provided at an appropriate portion of the engine 10, an intake air temperature sensor 48 for detecting the temperature of the intake air is provided upstream of the throttle valve 16, and a coolant temperature sensor 50 for detecting the temperature of the engine coolant is provided at an appropriate portion of the engine. The engine 10 is further provided with a valve timing (V/T) sensor 52 (not shown in FIG. 1) which detects the valve timing characteristic selected by the variable valve timing mechanism 300 based on oil pressure.

Further, an air/fuel sensor 54 constituted as an oxygen detector or oxygen sensor is provided in the exhaust pipe 26 at, or downstream of, a confluence point in the exhaust system downstream of the exhaust manifold 24 and upstream of the first catalytic converter 28, where it detects the oxygen concentration in the exhaust gas at the confluence point and produces a corresponding signal (explained later). In addition, an $O_2$ sensor 56 is provided as a second oxygen sensor downstream of the air/fuel ratio sensor 54 (first oxygen sensor). The volume of the first and second catalysts are appropriately determined taking into account the purification (conversion) efficiency, and temperature characteristics and are set to be 1 liter or thereabout for the first catalyst and 1.7 liter or thereabout for the second one, for example.

Figure 5:
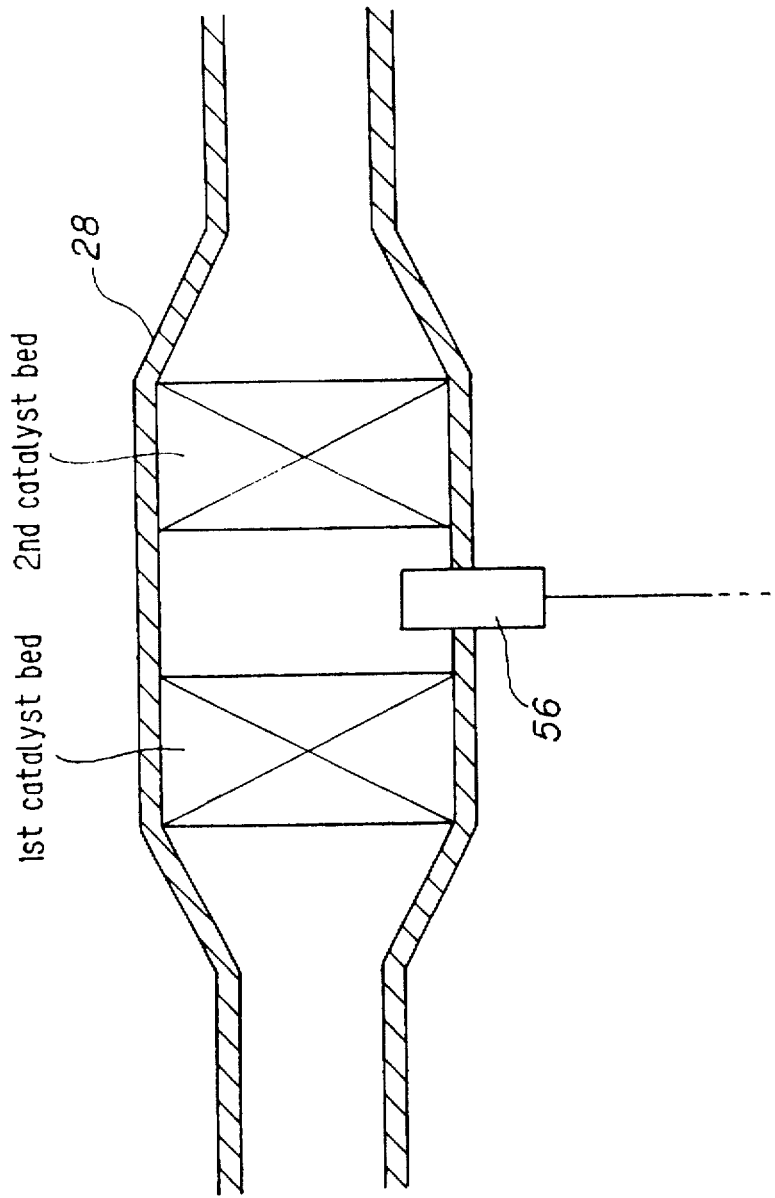
FIG. 5 is an explanatory view showing the catalytic converter and an example of $O_2$ sensor positioning illustrated in FIG. 1.

As illustrated in FIG. 5, the first catalytic converter 28 may be configured to have a multiple of beds each carrying a catalyst, specifically dual beds in the illustration comprising a first catalyst bed and a second catalyst bed. When the first catalytic converter 28 is configured as depicted, the $O_2$ sensor 56 may be positioned between the first and second beds, as illustrated. In that case, the volume of the catalyst carried on the first bed is approximately 1 liter and that on the second bed is approximately 1 liter or so. The first catalytic converter 28 will accordingly have a volume of approximately 2.0 liters when thus configured in the manner as illustrated. Since, however, the illustrated configuration is the same as the case in which the $O_2$ sensor is installed downstream of a single catalytic converter of 1.0 liter capacity, the sensor output switching interval will be shorter than the case in which the sensor is positioned downstream of a catalytic converter of 2.0 liters volume. When the minute air/fuel ratio control (explained later) is conducted within a catalyst window defined by the outputs of the $O_2$ sensor 56 thus positioned, control accuracy will therefore be enhanced. The minute air/fuel ratio control is hereinafter referred to as "MID $O_2$ control".

The air/fuel ratio sensor 54 is followed by a filter 58 and the $O_2$ sensor 56 is followed by a second filter 60. The outputs of the sensors and filters are sent to the control unit 34.

Figure 6:
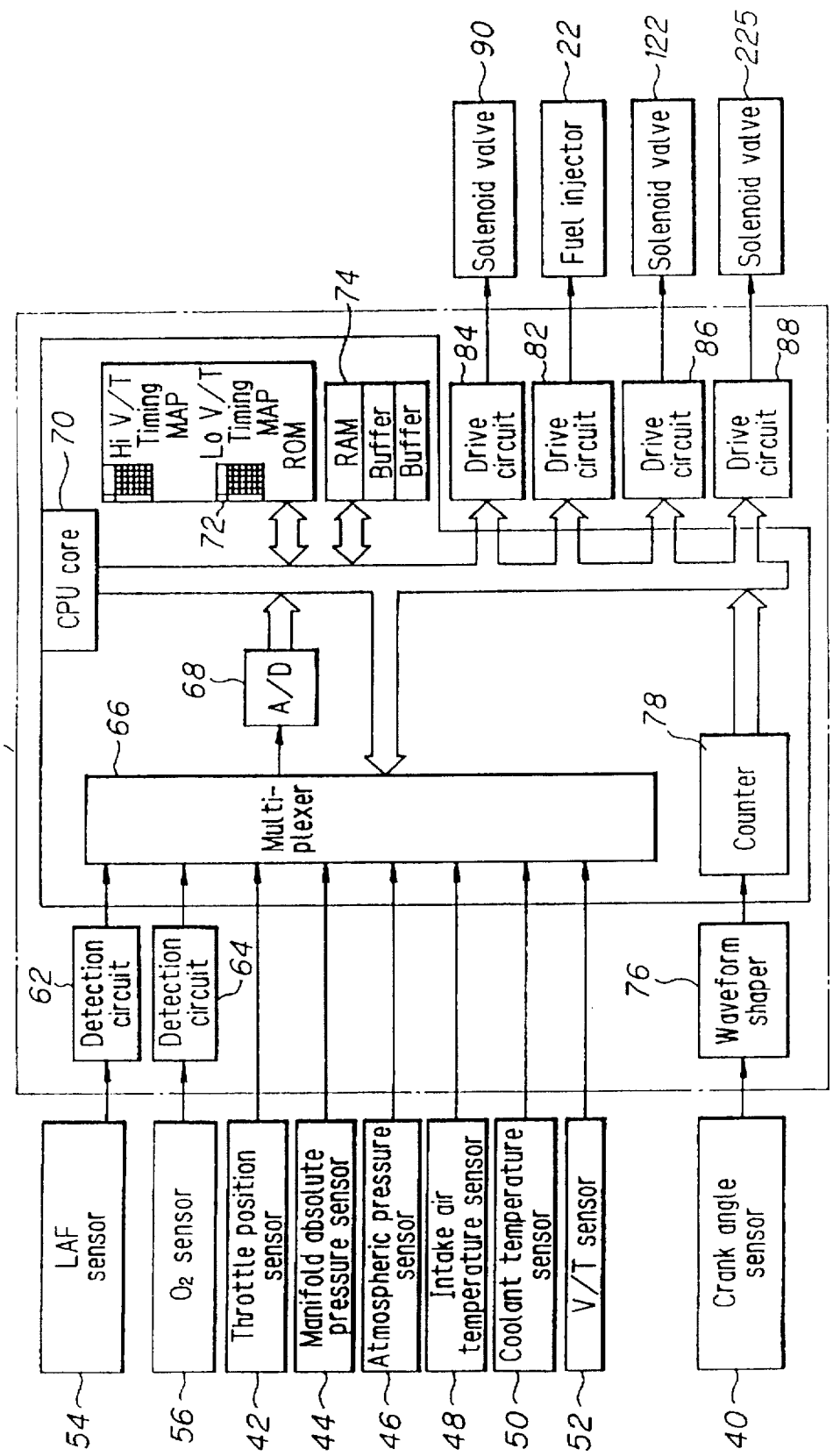
FIG. 6 is a block diagram showing the details of the control unit illustrated in FIG. 1.
Figure 7:
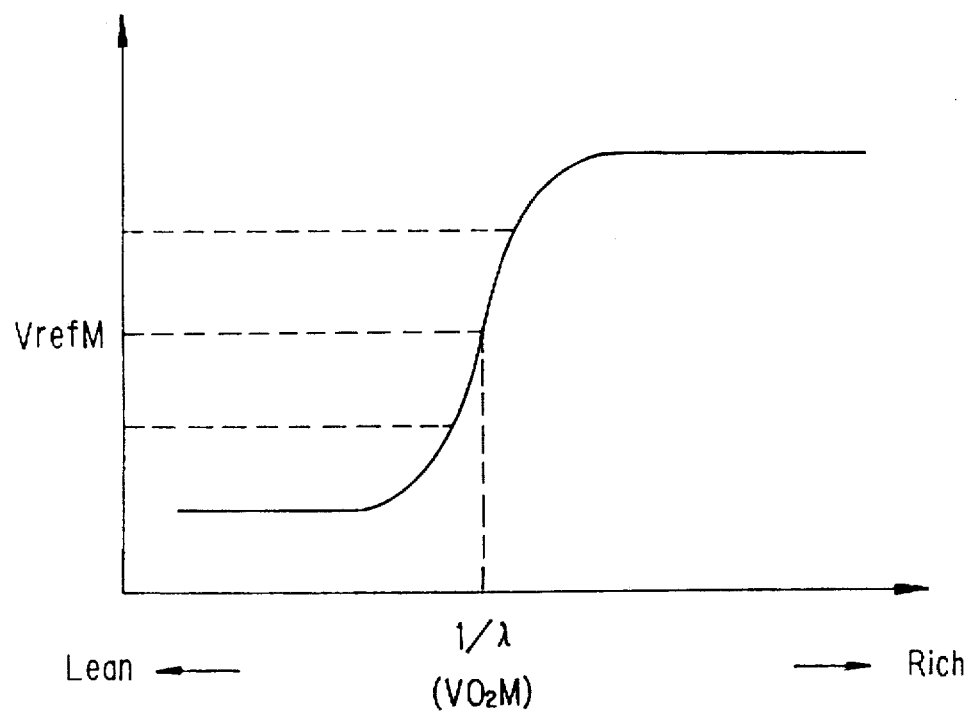
FIG. 7 is a graph showing the output of the $O_2$ sensor illustrated in FIG. 1.

Details of the control unit 34 are shown in the block diagram of FIG. 6. The output of the air/fuel ratio sensor 54 is received by a first detection circuit 62, where it is subjected to appropriate linearization processing for producing an output characterized in that it varies linearly with the oxygen concentration of the exhaust gas over a broad range extending from the lean side to the rich side. (The air/fuel ratio sensor is denoted as "LAF sensor" in the figure and will be so referred to in the remainder of this specification.) The output of the $O_2$ sensor is input to a second detection circuit 64 which generates a switching signal indicating that the air/fuel ratio in the exhaust gas emitted from the engine 10 is rich or lean with respect the stoichiometric air/fuel ratio (=lambda=1), as shown in FIG. 7.

Figure 47:
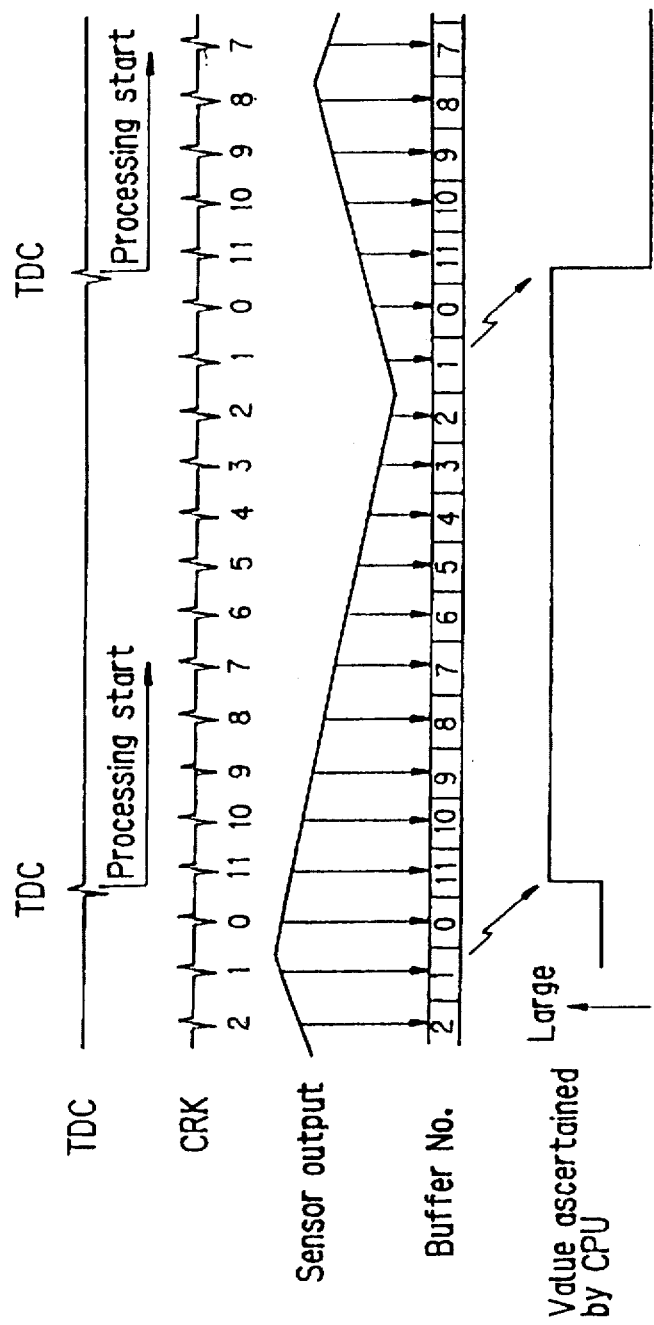
FIG. 47 is a timing chart showing the sampling of the air/fuel ratio sensor in the system.

The output of the first detection circuit 62 is forwarded through a multiplexer 66 and an A/D converter 68 to a CPU (central processing unit). The CPU has a CPU core 70, a ROM (read-only memory) 72 and a RAM (random access memory) 74, and the output of the first detection circuit 62 is A/D-converted once every prescribed crank angle (e.g., 15 degrees) and stored in buffers of the RAM 74. As shown in FIG. 47 to be discussed later, the RAM 74 has 12 buffers numbered 0 to 11 and the A/D-converted outputs from the detection circuit 62 are sequentially stored in the 12 buffers. Similarly, the output of the second detection circuit 64 and the analog outputs of the throttle position sensor 42, etc., are input to the CPU through the multiplexer 66 and the A/D converter 68 and stored in the RAM 74.

The output of the crank angle sensor 40 is shaped by a waveform shaper 76 and has its output value counted by a counter 78. The result of the count is input to the CPU. In accordance with commands stored in the ROM 72, the CPU core 70 computes a manipulated variable in the manner described later and drives the fuel injectors 22 of the respective cylinders via a drive circuit 82. Operating via drive circuits 84, 86 and 88, the CPU core 70 also drives a solenoid valve (EACV) 90 (for opening and closing the bypass 32 to regulate the amount of secondary air), the solenoid valve 122 for controlling the aforesaid exhaust gas recirculation, and the solenoid valve 225 for controlling the aforesaid canister purge. (The lift sensor 123, flow meter 226, and HC concentration sensor 227 are omitted from FIG. 6.)

Figure 8:
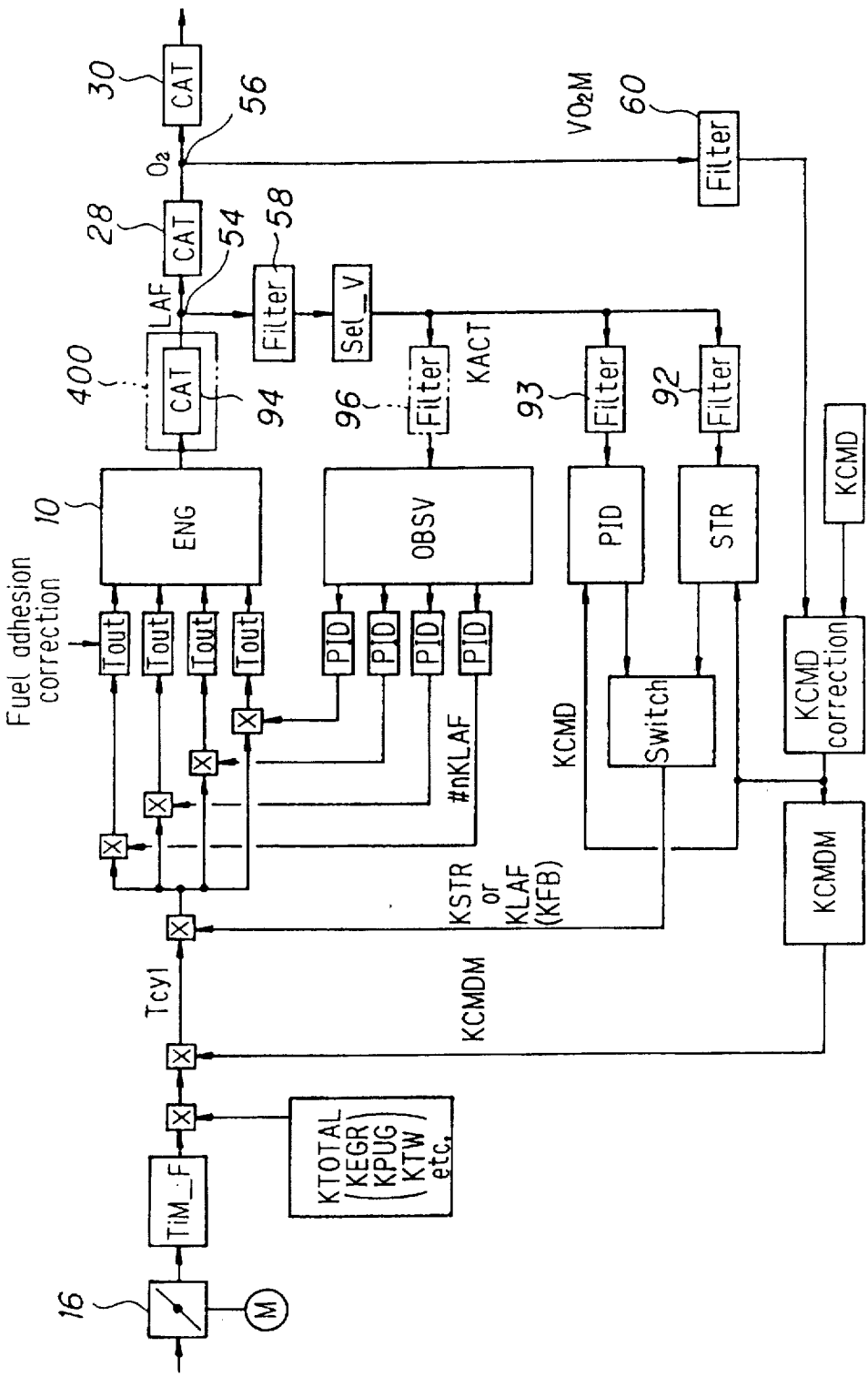
FIG. 8 is a block diagram showing the configuration of the system according to the invention.

FIG. 8 is a block diagram showing the operation of the fuel metering control according to the embodiment.

As illustrated, the system is provided with an observer (depicted as "OBSV" in the figure) that estimates the air/fuel ratios at the individual cylinders from the output of the single LAF sensor 54 installed at the exhaust system of the engine 10, and an adaptive controller (Self Tuning Regulator; shown as "STR" in the figure) that receives the output of the LAF sensor 54 through a filter 92.

The output of the $O_2$ sensor 56, named "$VO_2M$" is input to a desired air/fuel ratio correction block (shown as "KCMD correction" in the figure) where a desired air/fuel ratio correction coefficient named "KCMDM" is determined in accordance with an error between the $O_2$ sensor output $VO_2M$" and a desired value (VrefM in FIG. 7). On the other hand, the basic quantity of fuel injection TiM-F is determined on the basis of the change in the effective opening area of the throttle valve 16 in the manner explained later. The basic quantity of fuel injection TiM-F is multiplied by the desired air/fuel ratio correction coefficient KCMDM and another correction coefficient KTOTAL (the product of other correction coefficients including correction coefficients for EGR and canister purging) to determine the quantity of fuel injection assumed to be required by the engine (called this as "the required quantity of fuel injection Tcyl).

On the other hand, the corrected desired air/fuel ratio KCMD is input to the adaptive controller STR and a PID controller (shown as "PID" in the figure) which respectively determine feedback correction coefficients named KSTR or KLAF in response to an error from the LAF sensor output. Either of the feedback correction coefficients is selected through a switch in response to the operating conditions of the engine and is multiplied by the required quantity of fuel injection Tcyl to determine the output quantity of fuel injection named Tout. The output quantity of fuel injection is then subject to fuel adhesion correction and the corrected quantity is finally supplied to the engine 10.

Thus, the air/fuel ratio is feedback controlled to the desired air/fuel ratio on the basis of the LAF sensor output, and the aforesaid $MIDO_2$ control is implemented at or about the desired air/fuel ratio, i.e., within the catalyst window. The catalyst functions to store $O_2$ from the exhaust gas of a relatively lean mixture. When the catalyst is saturated with $O_2$, the purification efficiency drops. Therefore, it is necessary to provide exhaust gas of a relatively rich mixture so as to relieve of the catalyst to relieve the stored $O_2$ and upon the completion of the stored $O_2$ relief, the exhaust gas of a relatively lean mixture is newly provided. By repeating this, it is possible to maximize the purification efficiency. The $MIDO_2$ control aims to achieve this.

In order to further improve the purification efficiency in the $MIDO_2$ control, it is necessary to bring the air/fuel ratio to the catalyst in a shorter time after the switching of the $O_2$ sensor output. In other words, it is necessary to bring the detected air/fuel ratio (hereinafter known as "KACT") to a desired air/fuel ratio KCMD in a shorter time. If the quantity of fuel injection determined in the feedforward system, i.e., TiM-F, is merely multiplied by the desired air/fuel ratio feedback correction coefficient KCMDM, the desired air/ fuel ratio will become a smoothed value of the detected air/fuel ratio KACT, due to engine response delay.

The system disclosed, accordingly, in order to solve the problem, is configured such that the response of the detected air/fuel ratio KACT is dynamically ensured. More specifically, the quantity of fuel injection is multiplied by the correction coefficient KSTR (output of the adaptive controller) that ensures the desired behavior of the desired air/fuel ratio KCMD. With the arrangement, it becomes possible to allow the detected air/fuel ratio KACT to immediately converge to the desired air/fuel ratio KCMD and to enhance the catalyst purification (conversion) efficiency.

It should be noted that the calculation is facilitated by representing, in fact, the desired value KCMD and the detected value KACT as an equivalence ratio, namely, as Mst/M=1/lambda (Mst: stoichiometric air/fuel ratio, M =A/F (A: air mass flow rate, F: fuel mass flow rate, and lambda=excess air factor).

Here, explanation will be given of the filters.

The configuration illustrated is constituted as a multi-imposed feedback control system where a plurality of feedback loops are provided in parallel all using a common output from the single LAF sensor 54. More precisely, the system is configured such that the multi-imposed or plural feedback loops are switched. Therefore, the frequency characteristics of the filters are determined in accordance with the nature of the feedback loops.

Specifically, it takes 400 ms (millisecond) for the LAF sensor to obtain a 100% response. Here, the time to obtain the 100% response means a time until the LAF sensor output (that varies with first-order lag) becomes flat when a step input of air-fuel mixture is given. More precisely, a time until the sensor output becomes close to the stoichiometric air/fuel ratio (lambda=1) when inputting a stoichmetric mixture after having inputted a rich mixture (lambda=1.2). The time is almost the same as the so-called settling time. The sensor output closes near, but does not equal to the desired value, due to a steady-state error.

When left as they are, the sensor outputs include high frequency noise, and the control performance will degrade. The inventors have found, through experiments, that when the sensor outputs are passed through a low-pass filter whose cutoff frequency is 500 Hz, high frequency noise can be removed without substantially degrading response characteristics. When lowering the cutout frequency of a filter to 4 Hz, high frequency noise could further be reduced to a considerable extent and the time required for the 100% response became stable. However, the response characteristics of the filter in that case were more delayed than the case where the sensor output was filtered or was passed through a filter of 500 Hz cutout frequency, and took 400 ms or more until the 100% response had been obtained.

In view of the above, the filter 58 is determined to be a low-pass filter having a cutout frequency of 500 Hz, and the sensor output passed to the filter is immediately input to the observer. The observer does not operate to converge the detected air/fuel ratio KACT to the desired air/fuel ratio KCMD. Rather, the system is configured such that the air/fuel ratios in the individual cylinders are estimated by the observer, while the variance between the individual cylinder air/fuel ratios are absorbed by the PID controller. As a result, even when the sensor response time is not stable, that will not affect the air/fuel detection. Rather, shorter response time will enhance control performance.

On the other hand, the filter 92 (only shown in FIG. 8) placed before the adaptive controller STR should be a low-pass filter having a 4 Hz cutout frequency. This is because, since the dead-beat controller such as the STR operates to faithfully compensate the air/fuel ratio detection delay, any change in noise or response time in air/fuel detection would affect control performance. For that reason, the low-pass filter 92 is assigned with the cutout frequency of 4 Hz. In addition, the filter 93 placed before the input to the PID controller is to be a filter whose cutout frequency is equal to or greater than that of the filter 92, specifically 200 Hz, taking response time into account.

Moreover, the filter 60 connected to the $O_2$ sensor 56 is determined to be a low-pass filter whose cutout frequency is 1600 Hz, since the response of the $O_2$ sensor is much greater than that of the LAF sensor.

The operation of the system according to the invention will now be explained with reference to the block diagram of FIG. 8.

First, the basic quantity of fuel injection TiM-F is determined or calculated.

As mentioned before, the basic quantity of fuel injection TiM-F is optimally determined in all engine operating conditions including engine transients, on the basis of the change in the effective throttle opening area.

Figure 9:
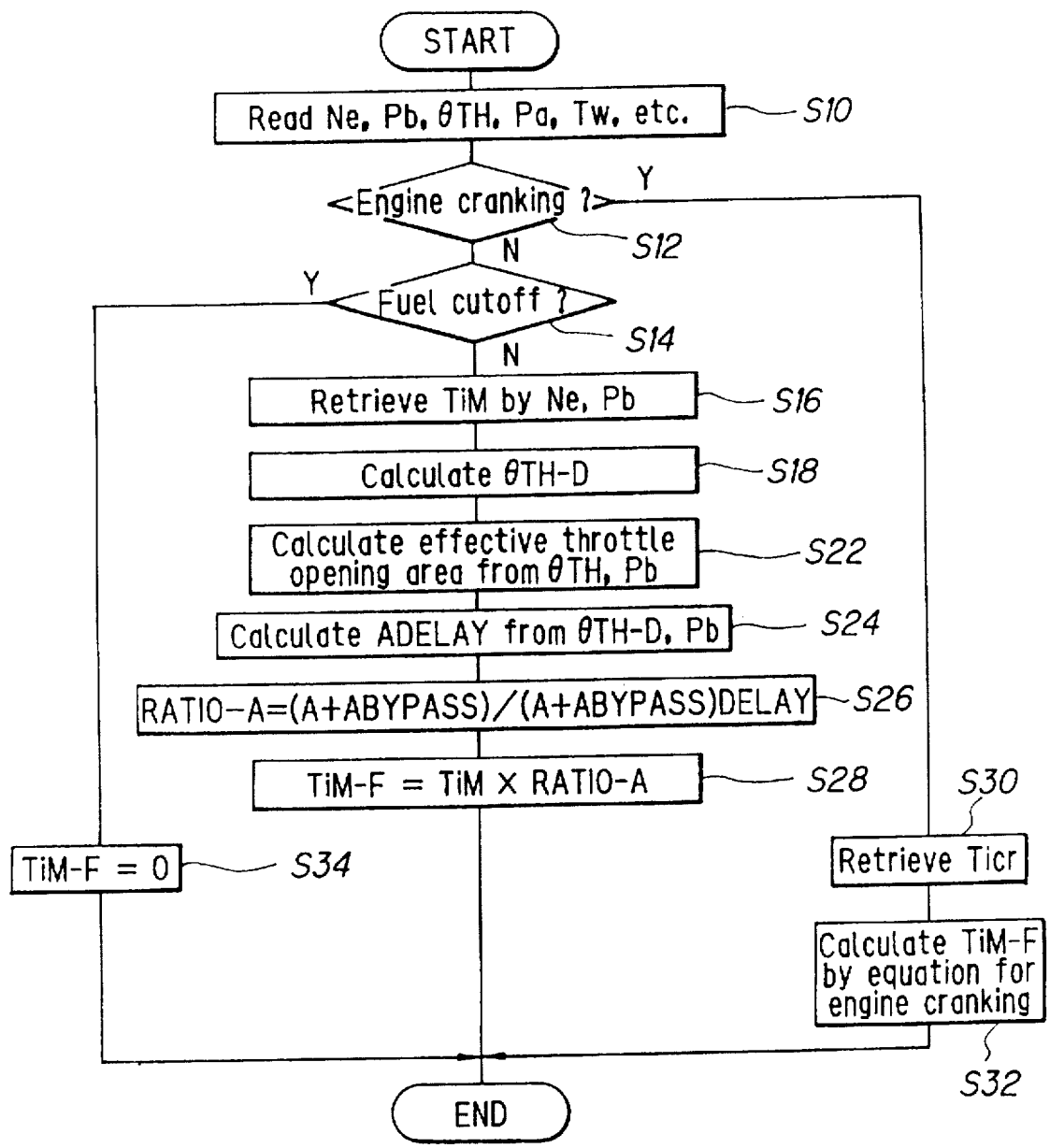
FIG. 9 is a flowchart showing the determination or calculation of the basic quantity of fuel injection TiM-F illustrated in FIG. 8.
Figure 10:
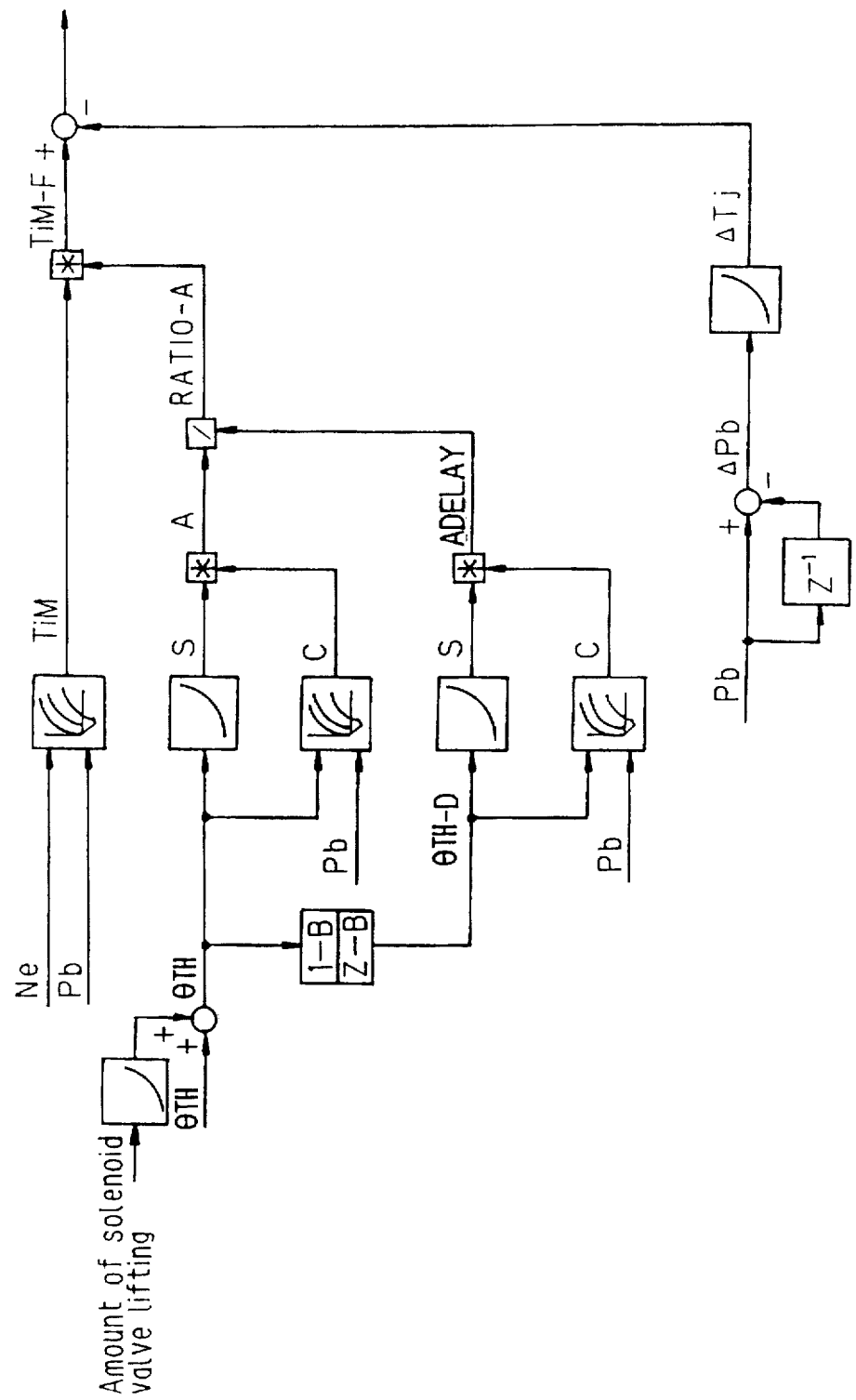
FIG. 10 is a block diagram showing the determination or calculation of the basic quantity of fuel injection quantity TiM-F referred to in the calculation of FIG. 9.

FIG. 9 is a flowchart for determining or calculating the basic quantity of fuel injection TiM-F, and FIG. 10 is a block diagram explaining the operation shown in FIG. 9. Before entering into an explanation of the figures, however, estimation of the quantity of throttle-past air and the quantity of cylinder-intake air using a fluid dynamic model on which the invention is based, will first be explained. Since the method was fully described in Japanese Laid-Open Patent Application Hei 6(1994)-197,238 (filed in the United States on Jul. 27, 1995 under the number of 08/507,999) proposed by the assignee, the explanation will be made in brief.

Figure 11:
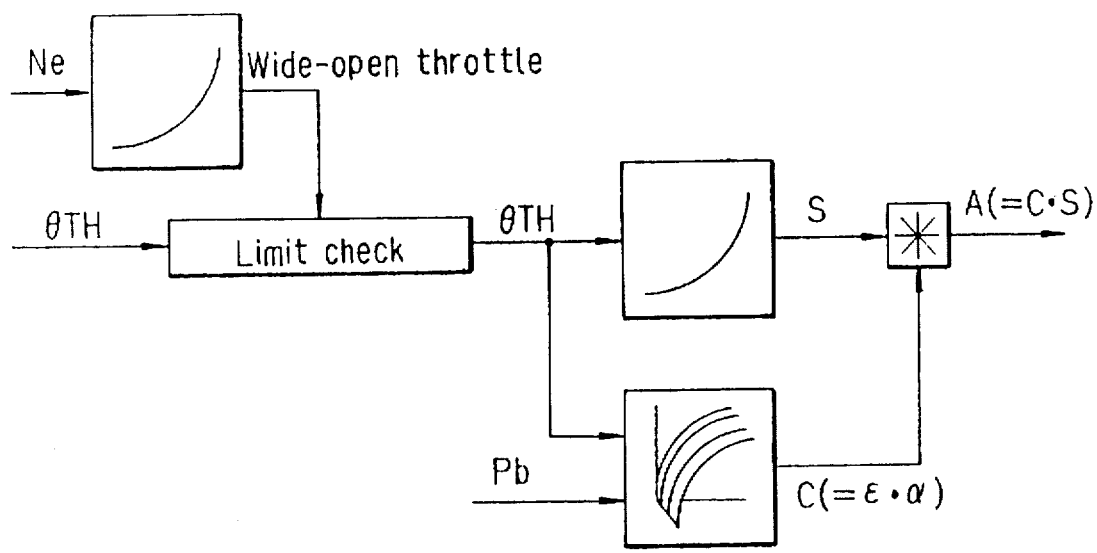
FIG. 11 is a block diagram showing the calculation of an effective throttle opening area and its first-order lag value used in the calculation referred to in the calculation of FIG. 9.
Figure 12:
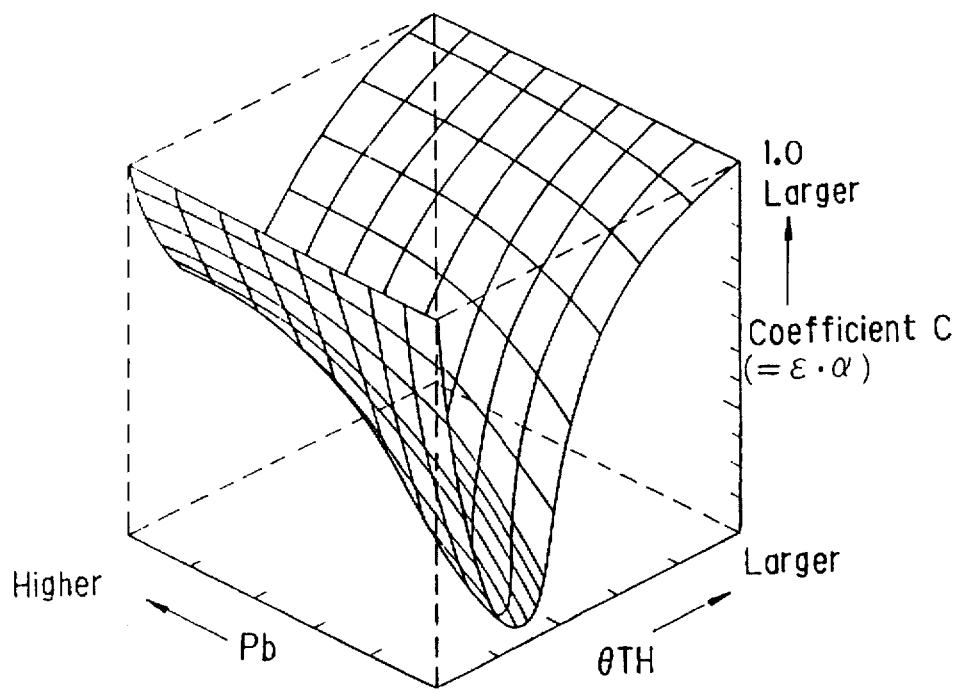
FIG. 12 is a graph showing the characteristics of mapped data of a coefficient shown in FIG. 11.

Specifically, on the basis of the detected throttle opening θTH, the throttle's projection area S (formed on a plane perpendicular to the longitudinal direction of the air intake pipe 12 when the throttle valve 16 is assumed to be projected in that direction) is determined in accordance with a predetermined characteristic, as illustrated in the block diagram of FIG. 11. At the same time, the discharge coefficient C which is the product of the flow rate coefficient α and gas expansion factor epsilon, is retrieved from mapped data whose characteristic is illustrated in FIG. 12 using the throttle opening θTH and manifold pressure Pb as address data, and the throttle projection area S is multiplied by the coefficient C retrieved to obtain the effective throttle opening area A. Since the throttle valve does not function as an orifice in its wide-open (full-throttling) state, the full-load opening areas are predetermined empirically as limited values with respect to engine speeds. And when the detected throttle opening is found to exceed the limit value concerned, the detected value is restricted to the limit value. The value will further be subject to atmospheric correction (explanation omitted).

Next, the quantity of chamber-filling air, referred hereinafter to as "Gb", is calculated by using Eq. 1, which is based on the ideal gas law. The term "chamber" is used here to mean not only the part corresponding to the so-called surge tank but to all portions extending from immediately downstream of the throttle to immediately before the cylinder intake port:

$$Gb(k) = \frac{V}{R \cdot T} \cdot P(k) \qquad \text{Eq. 1}$$

where:
V: Chamber volume
T: Air temperature
R: Gas constant
P: Chamber pressure

Then, the quantity of chamber-filling air at the current control cycle delta Gb(k) can be obtained from the pressure change in the chamber delta P using Eq. 2.

It should be noted that "k" is used to mean a discrete variable throughout the specification and is the sample number in the discrete system, more precisely the control or calculation cycle (program loop), or more precisely the current control or calculation cycle (current program loop). "k-n" therefore means the control cycle at a time n cycles earlier in the discrete control system. The appending of the suffix (k) is omitted for most values at the current control cycle in the specification:

$$\Delta Gb(k) = Gb(k) - Gb(k-1) = \frac{V}{R \cdot T} \cdot (P(k) - P(k-1)) \qquad \text{Eq. 2}$$
$$= \frac{V}{R \cdot T} \cdot \Delta P(k)$$

When it is assumed that the quantity of chamber-filling air delta Gb(k) at the current control cycle has not been, as a matter of fact, inducted into the cylinder, then the quantity of cylinder-intake air Gc per time unit delta T can be expressed as Eq. 3:

$$Gc = Gth \cdot \Delta T - \Delta Gb \qquad \text{Eq. 3}$$

Figure 13:
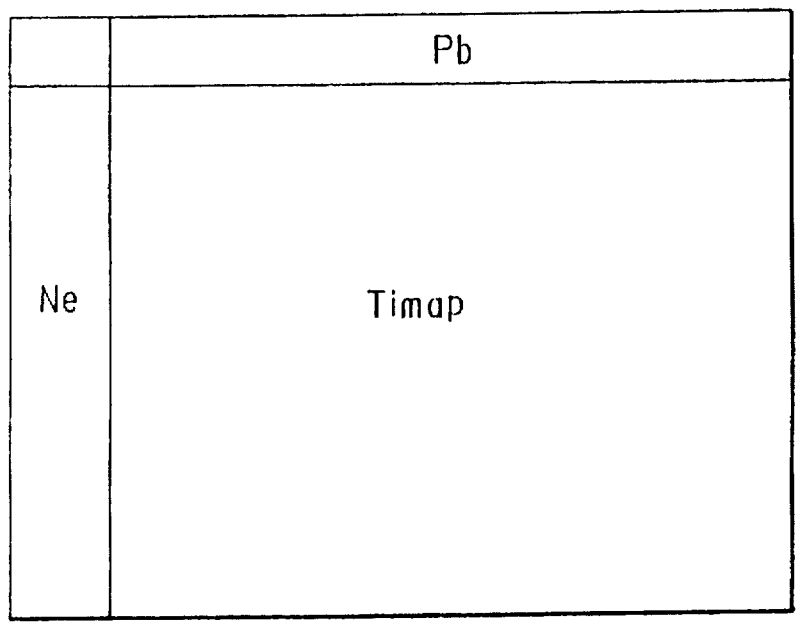
FIG. 13 is a view explaining the characteristics of mapped data of the quantity of fuel injection under the steady-state engine operating condition referred to in the calculation of FIG. 9.
Figure 14:
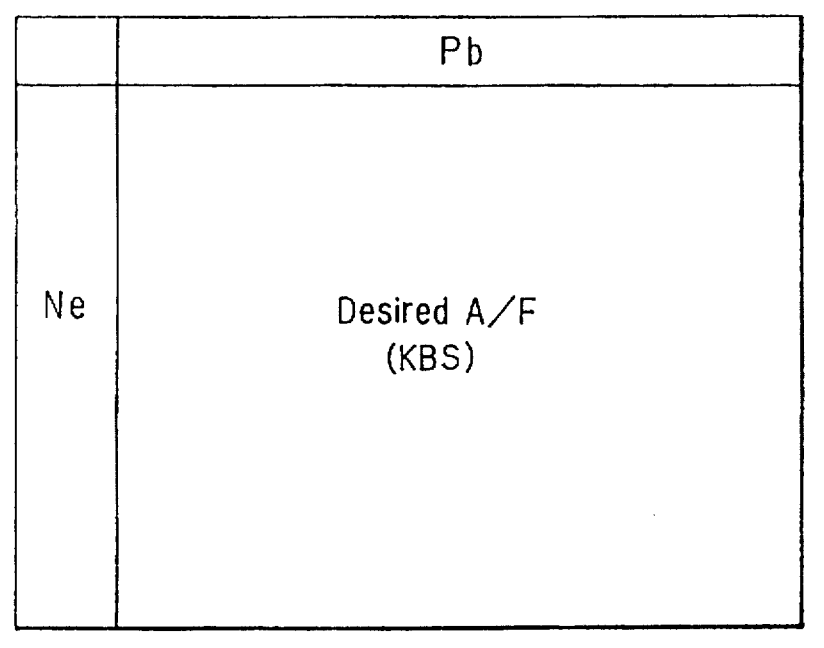

On the other hand, the quantity of fuel injection under the steady-state engine operating condition Timap is prepared in advance in accordance with the so-called speed density method and stored in the ROM 72 as mapped data (whose characteristics are illustrated in FIG. 13) with respect to engine speed Ne and manifold pressure Pb. Since the quantity of fuel injection Timap is corrected in the mapped data by a desired air/fuel ratio which in turn is determined in accordance with the engine speed Ne and the manifold pressure Pb, the desired air/fuel ratio, more precisely its base value KBS, is therefore prepared in advance and stored as mapped data with respect to the same parameters as shown in FIG. 14. Since, however, the correction of the value Timap with the desired air/fuel ratio relates to the $MIDO_2$ control, the correction is not conducted here. The correction with the desired air/fuel ratio as well as the $MIDO_2$ control will be explained later. The quantity of fuel injection Timap is determined in terms of the opening period of the fuel injector 22.

Here, when contemplating the relationship between the quantity of fuel injection Timap retrieved from the mapped data and the quantity of throttle-past air Gth, the quantity of fuel injection Timap retrieved from the mapped data, here referred to as Timap1, will be expressed as Equation 4 at a certain aspect under the steady-state engine operating condition defined by engine speed Ne1 and manifold pressure Pb1:

$$\text{Timap1} = \text{MAPPED DATA (Ne1, Pb1)} \qquad \text{Eq. 4}$$

As described in the aforesaid assignee's earlier application (6-197,238), it has been found that the quantity of throttle-past air Gth under the transient engine operating condition can be determined from that under the steady-state engine operating condition in response to the change in effective throttle opening area. More specifically, it has been found that the quantity of throttle-past air Gc can be determined using a ratio between the effective throttle opening area under the steady-state engine operating condition and that under the transient engine operating condition.

Figure 15:
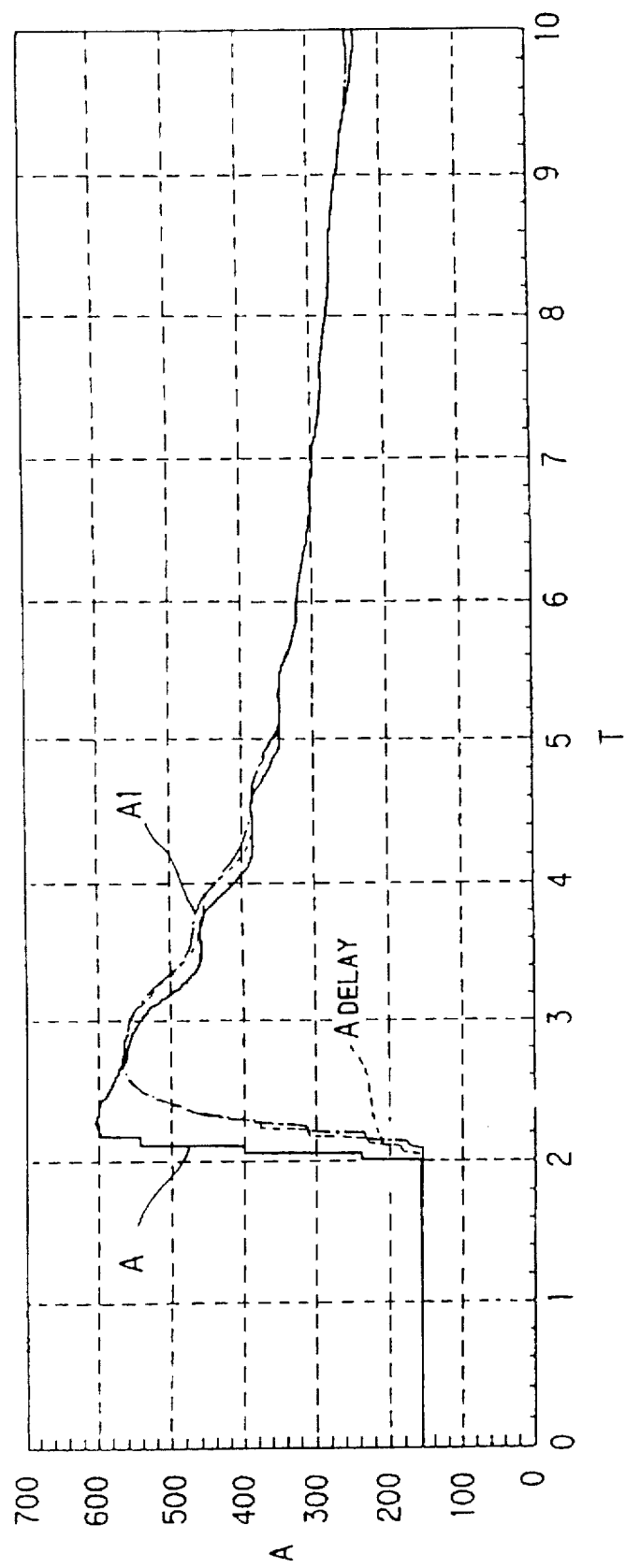
FIG. 15 is a graph showing the result of simulation referred to in the calculation of FIG. 9.

Furthermore, when naming the current effective throttle opening area as A (that may be the area under the transient engine operating condition) and the effective throttle opening area under the steady-state engine operating condition as A1, it has been considered that the value A1 can be determined as the first-order lag of A. This has been confirmed through simulation on computer, as illustrated in FIG. 15. When naming A's first-order lag value as ADELAY, it can be confirmed from the figure that the values A1 and ADELAY are almost the same. Accordingly, it is concluded that the quantity of throttle-past air Gth can be determined on the basis of the ratio A/A's first-order lag, i.e., A/ADELAY, when approximating the model by using the concept of the fluid dynamic model.

Figure 16:
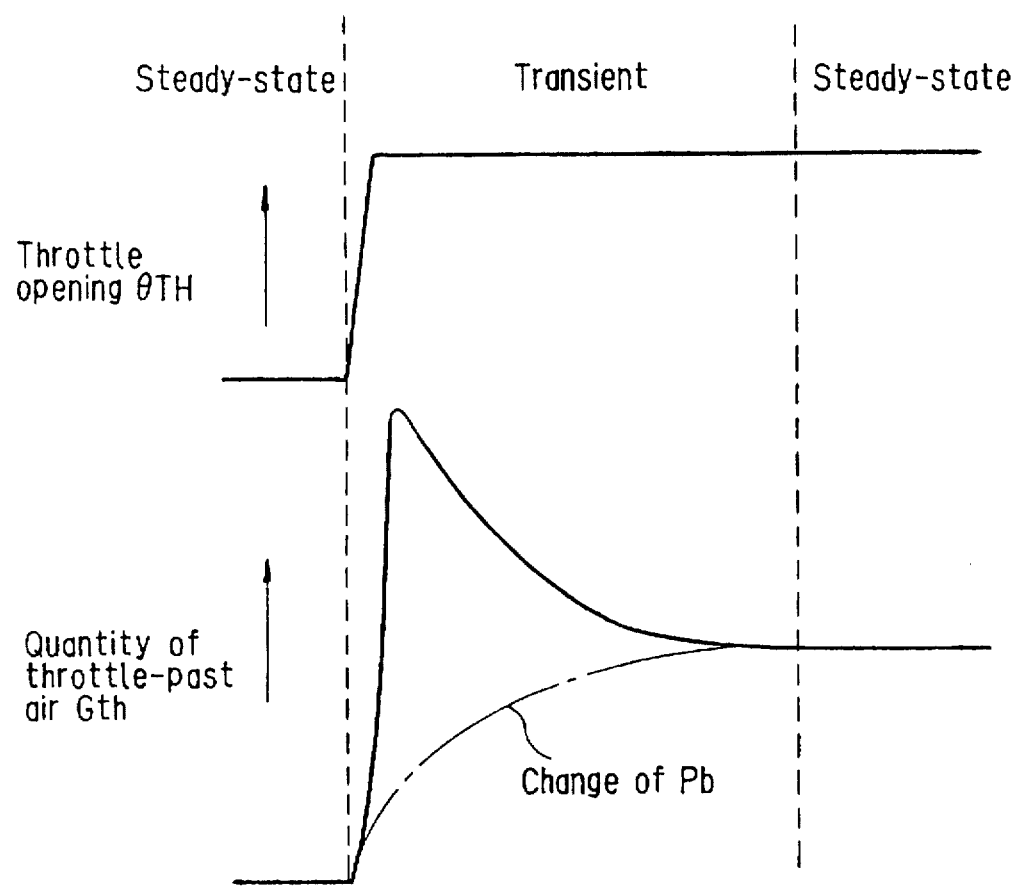
FIG. 16 is a timing chart explaining the transient engine operating condition referred to in the calculation of FIG. 9.

As illustrated in FIG. 16, under the transient engine operating condition, when the throttle valve is opened, a large quantity of air passes the throttle valve all at once due to the large pressure difference across the throttle valve and then the quantity of air decreases gradually to that under the steady-state engine operating condition as was mentioned before with reference to the bottom of FIG. 16. It has been considered that the ratio A/ADELAY can describe the quantity of throttle-past air Gth under such an engine transient operating condition. Under the steady-state engine operating condition, the ratio becomes 1 as will be understood from the bottom of FIG. 17. The ratio is hereinafter referred to as "RATIO-A".

Figure 17:
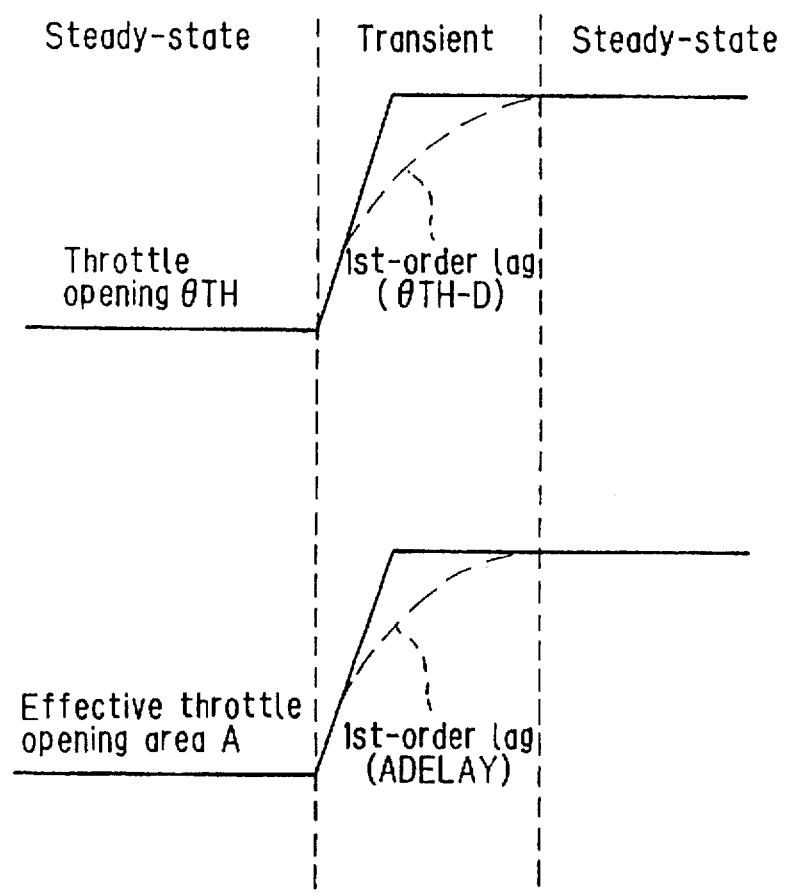
FIG. 17 is a timing chart explaining the effective throttle opening area's first order lag value.

Furthermore, when viewing the relationship between the effective throttle opening area and the throttle opening θTH, since the effective throttle opening area depends greatly on the throttle opening, it can be considered that the effective throttle opening area will vary almost faithfully following the change in the throttle opening, as illustrated in FIG. 17. If this is true, it can be said that the aforesaid throttle opening's first-order lag value will nearly correspond, in the sense of phenomenon, to the effective throttle opening area's first-order lag value.

In view of the above, it is arranged as illustrated in FIG. 10 that the effective throttle opening area's first-order lag value ADELAY is calculated primarily from the first-order of the throttle opening. In the figure, (1-B)/(z-B) is a transfer function of the discrete control system and means the value of the first-order lag.

As illustrated, more specifically, the throttle's projection area S is determined from the throttle opening θTH in accordance with a predetermined characteristic and the discharge coefficient C is determined from the throttle opening's first-order lag value θTH-D and the manifold pressure Pb in accordance with a characteristic similar to that shown in FIG. 12. Then the product of the values is obtained to determine the effective throttle opening area's first-order lag value ADELAY. Furthermore, in order to solve the reflection lag of the amount of intake air corresponding to the current quantity of chamber-filling air delta Gb, the first-order lag value of the value delta Pb (Pb's first order lag) is used to determine delta Ti (that corresponds to delta Gb).

The configuration was further reviewed and it has then been found that the values TiM-F and delta Ti (each corresponding to Gth and Gb) need not be determined separately. Instead, it has been found that TiM-F (corresponding to Gth) can be determined such that it includes delta Ti (corresponding to delta Gb). Specifically, the quantity of cylinder-intake air Gc can be determined solely from the throttle-past air Gth, by using a transfer function which includes that of delta Ti, when calculating ADELAY. This can make the configuration simpler and decreases the volume of calculation.

Figure 18:
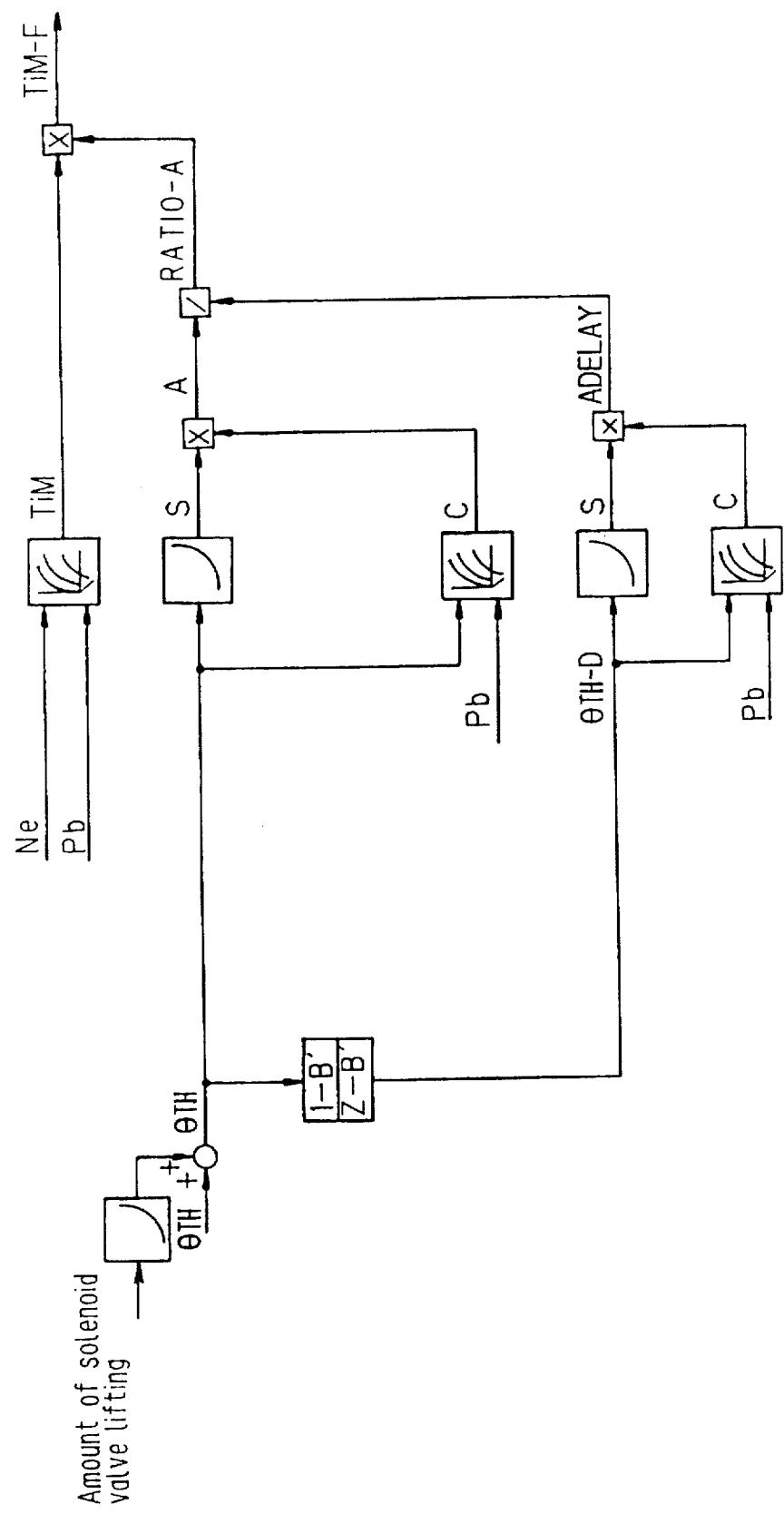
FIG. 18 is a view, similar to FIG. 10 and showing the calculation of FIG. 9.

More precisely, the quantity of cylinder-intake air Gc per unit time delta T in Eq. 1 can be expressed as Eq. 5, that is equivalent to Eqs. 6 and 7. Rewriting Eqs. 6 and 7 in terms of transfer function yields Eq. 8. Thus, the value Gc can be obtained from the first-order lag value of the quantity of throttle-past air Gth, as will be apparent from Eq. 8. This is illustrated in a block diagram of FIG. 18. It should be noted in FIG. 18 that, since the transfer function in the figure includes that of delta Ti and is different from that in FIG. 10, it has a symbol added """ as (1-B')/(z-B').

$$Gc = Gth(k) - Gb(k-1) \qquad \text{Eq. 5}$$

$$Gc = \alpha \cdot Gth(k) \beta \cdot Gb(k-1) \qquad \text{Eq. 6}$$

$$Gb = (1-\alpha) \cdot Gth(k) + (1-\beta) \cdot Gb(k-1) \qquad \text{Eq. 7}$$

$$Gc(z) = \frac{\alpha \cdot z - (\alpha - \beta)}{z - (1-\beta)} Gth(z) \qquad \text{Eq. 8}$$

In conclusion, the basic quantity of fuel injection TiM-F is determined or calculated as follows:

TiM-F = the quantity of fuel injection TiM×(actual or current effective throttle opening area/ effective throttle opening area obtained based on manifold pressure Pb and the throttle opening's first-order lag value θTH-D=TiM×RATIO-A Based on the above, the operation of the system will be explained with reference to the flowchart of FIG. 9.

The program begins at S10 in which the detected engine speed Ne, manifold pressure Pb, throttle opening θTH atmospheric pressure Pa, engine coolant water temperature Tw or the like are read in. The throttle opening has been subject to calibration (learning control) in the fully closed state at engine idling and the value detected based on the calibration is used here. The program then proceeds to S12 in which it is checked whether the engine is cranking. If not, the program advances to S14 in which it is checked whether fuel cutoff is in progress and if not, to S16 in which the quantity of fuel injection TiM (equal to the quantity of fuel injection Timap under the steady-state engine operating condition) is retrieved from the mapped data (whose characteristic is shown in FIG. 13 and stored in the ROM 72) using the engine speed Ne and manifold pressure Pb read in as address data. Although the quantity of fuel injection TiM may then be subject to atmospheric pressure correction or the like, the correction itself is however not the gist of the invention and no explanation will here be made.

The program then proceeds to S18 in which the throttle opening's first-order lag value θTH-D is calculated, to S22 in which the current or actual effective throttle opening area A is calculated using the throttle opening θTH and the manifold pressure Pb, and to S24 in which the effective throttle opening area's first-order lag value ADELAY is calculated using the values θTH-D and Pb. The program then moves to S26 in which the value RATIO-A is calculated as follows:

RATIO-A=(A+ABYPASS)/(A+ABYPASS)DELAY

Here, ABYPASS indicates a value corresponding to the quantity of air bypassing the throttle valve 16 such as that which flows in the secondary path 32 in response to the amount of lifting of the solenoid valve 74 and then inducted by the cylinder (illustrated as "Amount of solenoid valve lifting" in FIG. 10). Since it is necessary to take the quantity of throttle-bypass air into account to accurately determine the quantity of fuel injection, the quantity of throttle-bypass air is determined in advance in terms of the effective throttle opening area (named ABYPASS) to be added to the effective throttle opening area A as A+ADELAY. A first-order lag value of the sum (referred to as "(A+ABYPASS) DELAY") is calculated, and a ratio (i.e., RATIO-A) between the sum A+ABYPASS and the first-order lag thereof (A+ABYPASS) DELAY is then calculated.

Since the value ABYPASS is added both to the numerator and denominator in the equation shown in step S26, even if there happens to be an error in measuring the quantity of throttle-bypass air, the determination of the quantity of fuel injection will not be seriously affected.

The program then proceeds to S28 in which the quantity of fuel injection TiM is multiplied by the ratio RATIO-A to determine the quantity of fuel injection TiM-F corresponding to the quantity of throttle-past air Gth.

When S12 finds that the engine is being cranked, the program passes to S30 in which the quantity of fuel injection Ticr at cranking is retrieved from a table (not shown) using the engine coolant water temperature Tw as an address datum, to S32 in which the basic quantity of fuel injection TiM-F is determined in accordance with an equation for engine cranking (explanation omitted) using the value Ticr, while when S14 finds that the fuel cutoff is in progress, the program goes to S34 in which the basic quantity of fuel injection TiM-F is set to be zero.

With the arrangement, thus, it becomes possible to entirely describe the conditions from the steady-state engine operating condition to the transient engine operating condition by a simple algorithm. It also becomes possible to ensure the quantity of fuel injection under the steady-state engine operating condition to a considerable extent by mapped data retrieval, and the quantity of fuel injection can therefore be determined optimally without conducting complicated calculations. Further, since the equations are not switched between the steady-state engine operating condition and the transient engine operating condition, and since the equations can describe the entire range of engine operating conditions, control discontinuity, which would otherwise occur in the proximity of switching if the equations were switched between the steady-state and transient engine operating condition, does not happen. Furthermore, since the behavior of air flow is properly described, the arrangement can enhance the convergence and accuracy of the control.

Again returning to FIG. 8, the aforesaid correction coefficient KTOTAL (a general name of various correction coefficients) including the EGR correction coefficient KEGR and canister purge correction coefficient KPUG is determined or calculated.

The determination of the EGR correction coefficient will first be explained.

Figure 19:
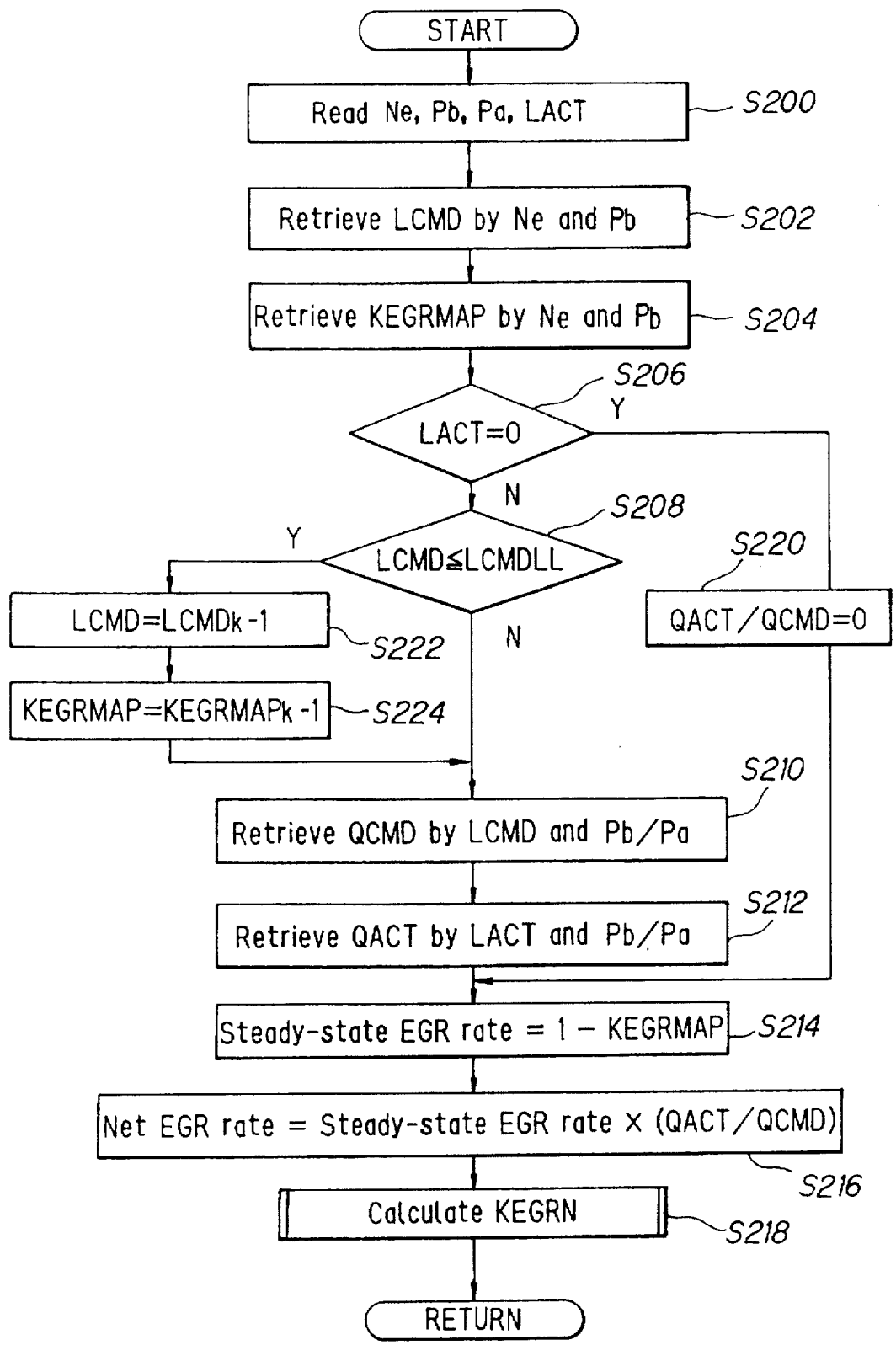
FIG. 19 is a flowchart showing estimation of the EGR rate in the calculation of the EGR correction coefficient referred to in the explanation of the configuration illustrated in FIG. 8.

FIG. 19 is a flowchart showing the operation of the EGR rate estimation system according to the invention.

Before starting the explanation of the flowchart, however, the EGR rate estimation according to the invention will be briefly described with reference to FIG. 20, etc.

Viewing the EGR control valve 122 alone, the amount or flow rate of exhaust gas passing therethrough will be determined from its opening area (the amount of lifting) and the ratio between the upstream pressure and downstream pressure at the valve. In other words, the amount or flow rate of the mass of exhaust gas passing through the valve will be determined from the flow rate characteristics of the valve, i.e., determined from the valve design specification.

Figure 20:
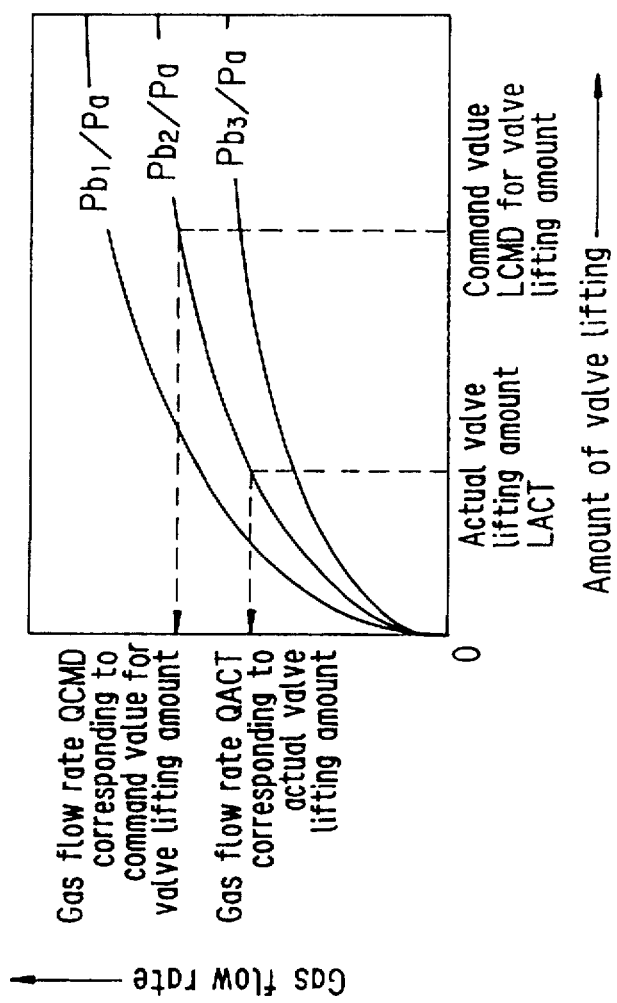
FIG. 20 is an explanatory view showing the flow rate characteristics of the EGR control valve determined by the amount of valve lifting and the ratio between upstream pressure (manifold absolute pressure) and downstream pressure (atmospheric pressure)

Viewing therefore the EGR control valve 122 when mounted on the engine, it will be possible to estimate the exhaust gas recirculation rate to a fair extent by detecting the amount of EGR control valve lifting and the ratio between the manifold pressure Pb (negative pressure) in the intake pipe 12 and the atmospheric pressure Pa, as illustrated in FIG. 20. (Although, in practice, the exhaust gas flow rate characteristics change slightly with exhaust manifold pressure and exhaust gas temperature, the change can be absorbed by the ratio between the gas flow rates as explained later.) The invention is based on this concept and estimates the EGR rate on the basis of the flow rate characteristics of the valve.

It should be noted here that, although the valve opening area is detected through the valve lifting amount, this is because the EGR control valve 122 used here has a structure whose amount of lifting corresponds to the opening area. When another valve such as a linear solenoid is used, therefore, the valve opening area should be detected in a different manner.

Figure 21:
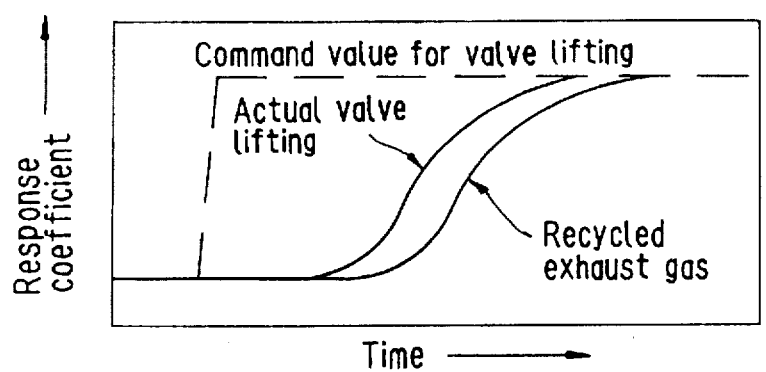
FIG. 21 is a timing chart showing the operation of actual valve lifting to the command valve lifting.

The EGR rate will be classified into two kinds of rates, i.e., one under a steady-state and another under a transient state. Here, the steady-state is a condition in which the EGR operation is stable and the transient state is a condition in which the EGR operation is being started or terminated so that the EGR operation is unstable. The EGR rate under a steady-state is considered to be a value where the amount of actual valve lifting is equal to the command value for the valve lifting amount. On the other hand, the transient state is considered to be a condition in which the amount of actual valve lifting is not equal to the command value, as illustrated in FIG. 21, so that the EGR rate deviates from the EGR rate under a steady-state (hereinafter referred to as "steady-state EGR rate) by an amount equal to the exhaust gas flow rate corresponding to the discrepancy in the actual amount and the command value, as illustrated in FIG. 20. (In the figure, the upstream pressure is indicated by the manifold pressure Pb and the downstream pressure by the atmospheric pressure Pa)

Specifically, under a steady-state:
command value=actual valve lifting amount, and
gas flow rate corresponding to actual valve lifting amount/ gas flow rate corresponding to command value=1.0

Whereas under a transient,
command value # actual valve lifting amount, and
gas flow rate corresponding to actual valve lifting amount/gas flow rate corresponding to command value #1.0

As a result, it can be concluded that:
net EGR rate=(steady-state EGR rate)×ratio between gas flow rates).

In order to distinguish the EGR rate at a steady-state, the EGR rate is sometimes referred to as the "net" EGR rate.

Thus, it is considered to be possible to estimate the exhaust gas recirculation rate by multiplying the steady-state EGR rate by the ratio between the gas flow rates corresponding to the actual valve lifting amount and the command value.

More precisely, it is considered that:
net EGR rate=(steady-state EGR rate)×{(gas flow rate QACT determined by actual valve lifting amount and the ratio between upstream pressure and downstream pressure of the valve)/ (gas flow rate QCMD determined by command value and the ratio between upstream pressure and downstream pressure of the valve)}

Here, the steady-state EGR rate is calculated by determining a correction coefficient under a steady-state and subtracting the same from 1.0. Namely, calling the correction coefficient under a steady-state as KEGRMAP, the steady-state EGR rate can be calculated as follows.

Figures 22, 23:
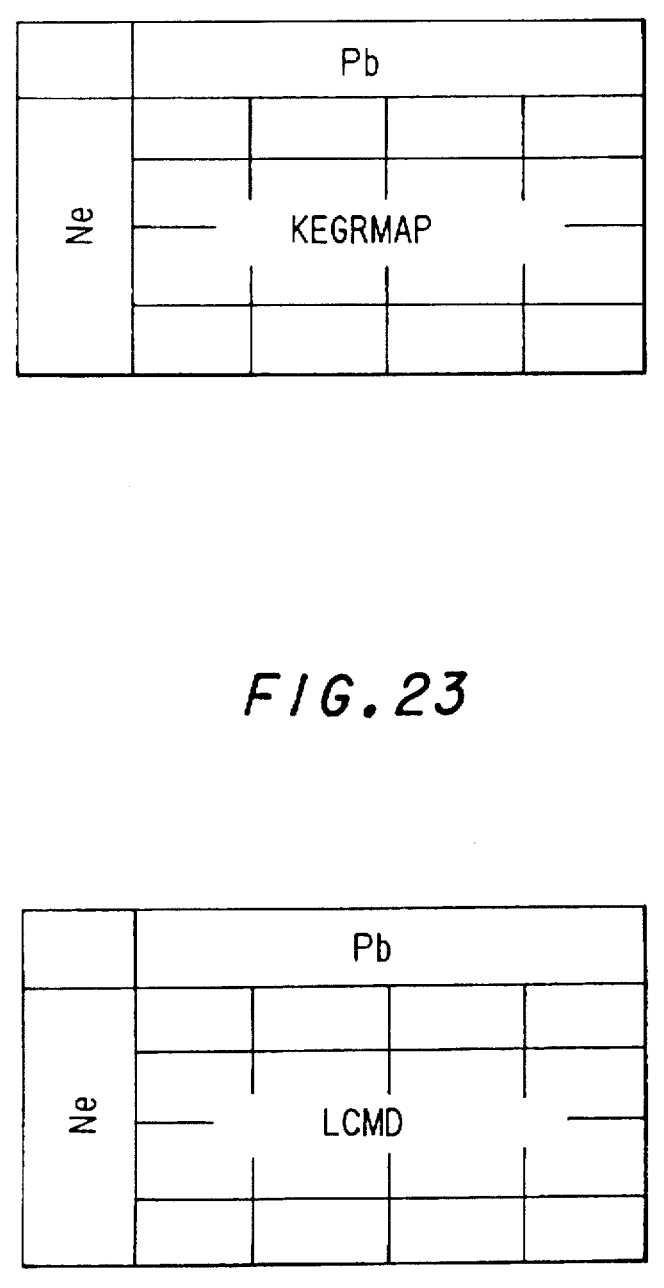

EGR rate under steady-state=(1−KEGRMAP) The steady-state EGR rate and the correction coefficient under a steady-state are sometimes referred to as the "basic EGR rate" and "basic correction coefficient", respectively. And as mentioned before, in order to distinguish from the EGR rate under a steady state, the EGR rate is sometimes referred to as the "net EGR rate". The correction coefficient under a steady-state KEGRMAP has been determined through experiments beforehand with respect to the engine speed Ne and the manifold pressure Pb and is prepared as mapped data as illustrated in FIG. 22 such that the value can be retrieved based on the parameters.

Here, the EGR (exhaust gas recirculation rate) is again explained.

The EGR rate is used in various manners in references such as:
1) the mass of recirculated exhaust gas/the mass of intake air and fuel;
2) the volume of recirculated exhaust gas/the volume of intake air and fuel;
3) the mass of recirculated exhaust gas/the mass of intake air and the recirculated exhaust gas.

The EGR rate is used in the specification mainly under the definition of 3). More concretely, the steady-state EGR rate is obtained by (1- coefficient KEGRMAP). The coefficient KEGRMAP is specifically determined as a value indicative of:

fuel injection amount under EGR operation/fuel injection amount under no EGR operation More specifically, the exhaust gas recirculation rate is determined by multiplying the basic EGR rate (the steady-state EGR rate) by the ratio between the gas flow rates as just mentioned before. As will be apparent from the description, since the EGR rate is determined as a value relative to the basic EGR rate, the EGR rate estimation system according to the invention will be applied to any EGR rate defined in 1) to 3) when the basic EGR rate is determined in the same manner.

The EGR control is conducted by determining a command value of the EGR control valve lifting amount on the basis of the engine speed, manifold pressure, etc., as illustrated in FIG. 21, and the actual behavior of the EGR control valve lags behind the time that the command value is issued. Namely, there is a response delay between the actual valve lifting and issuing the command value to do so. Moreover, it takes additional time for the exhaust gas passing through the valve to enter the combustion chamber.

The assignee therefore proposed, in Japanese Patent Application Hei 6(1994)-100,557 (filed in the United States on Apr. 13, 1995 under the number of application Ser. No. 08/421,191), the technique to determine the net EGR rate using the aforesaid equation, i.e., net EGR rate=(steady-state EGR rate)×{(gas flow rate QACT determined by actual valve lifting amount and the ratio between upstream pressure and downstream pressure of the valve)/ (gas flow rate QCMD determined by command value and the ratio between upstream pressure and downstream pressure of the valve)}

In the technique, the delay of the exhaust gas behavior was assumed to be a first-order lag. When thinking of the dead time, it can be considered that the exhaust gas passing through the valve is assumed to remain for a while in a space (chamber) before the combustion chamber and after a pause, i.e., the dead time, enters the combustion chamber at one time. Therefore, the net EGR rate is consecutively estimated and is stored in the memory each time the program is activated. And among the stored net EGR rates, one estimated at a previous control cycle corresponding to the delay time is selected and is deemed to be the true net EGR rate.

Now the operation of the system will be explained with reference to the flowchart of FIG. 19. The program is activated at every TDC.

The program begins at S200 in which the engine speed Ne, the manifold pressure Pb, the atmospheric pressure Pa, and the actual valve lifting amount named LACT (the output of the sensor 123) are read, and proceeds to S202 in which the command value for valve lifting amount LCMD is retrieved from mapped data using the engine speed Ne and the manifold pressure Pb as address data. Like the aforesaid correction coefficient, the mapped data for the command value LCMD is predetermined with respect to the same parameters as illustrated in FIG. 23. The program then moves to S204 in which the basic EGR rate correction coefficient KEGRMAP is retrieved from the mapped data at least using the engine speed Ne and the manifold pressure Pb as illustrated in FIG. 22.

The program then advances to S206 in which it is confirmed that the actual valve lifting amount LACT is not zero, namely it is confirmed that the EGR control valve 122 is opened, and to S208 in which the retrieved command value LCMD is compared with a predetermined lower limit LCMDLL (a least value) to determine whether the retrieved command value is less than the lower limit. When S208 finds that the retrieved command value is not less than the lower limit, the program proceeds to S210 in which the ratio Pb/Pa between the manifold pressure Pb and the atmospheric pressure Pa is calculated and using the calculated ratio and the retrieved command value LCMD, the gas flow rate QCMD corresponding thereto is retrieved from mapped data which has been prepared in advance on the basis of the characteristics illustrated in FIG. 20. The gas flow rate is that mentioned in the equation as "gas flow rate QCMD determined by the command value and the ratio between upstream pressure and downstream pressure of the valve".

The program then goes to S212 in which the gas flow rate QACT is retrieved from mapped data (whose characteristic is similar to that shown in FIG. 20) prepared in advance. This corresponds to the term in the equation "gas flow rate QACT determined by actual valve lifting amount and the ratio between upstream pressure and downstream pressure of the valve". The program then proceeds to S214 in which the retrieved EGR rate correction coefficient KEGRMAP is subtracted from 1.0 and the difference resulting therefrom is deemed as the steady-state EGR rate (basic EGR rate or steady-state EGR rate). The steady-state EGR rate means the EGR rate under which EGR operation is in a stable state, i.e., the EGR operation is not under a transient condition, such as when the operation is being started or terminated.

The program then moves to S216 in which the net exhaust gas recirculation rate is calculated by multiplying the steady-state EGR rate by the ratio QACT/QCMD, and to S218 in which a fuel injection correction coefficient KEGRN is calculated.

Figure 24:
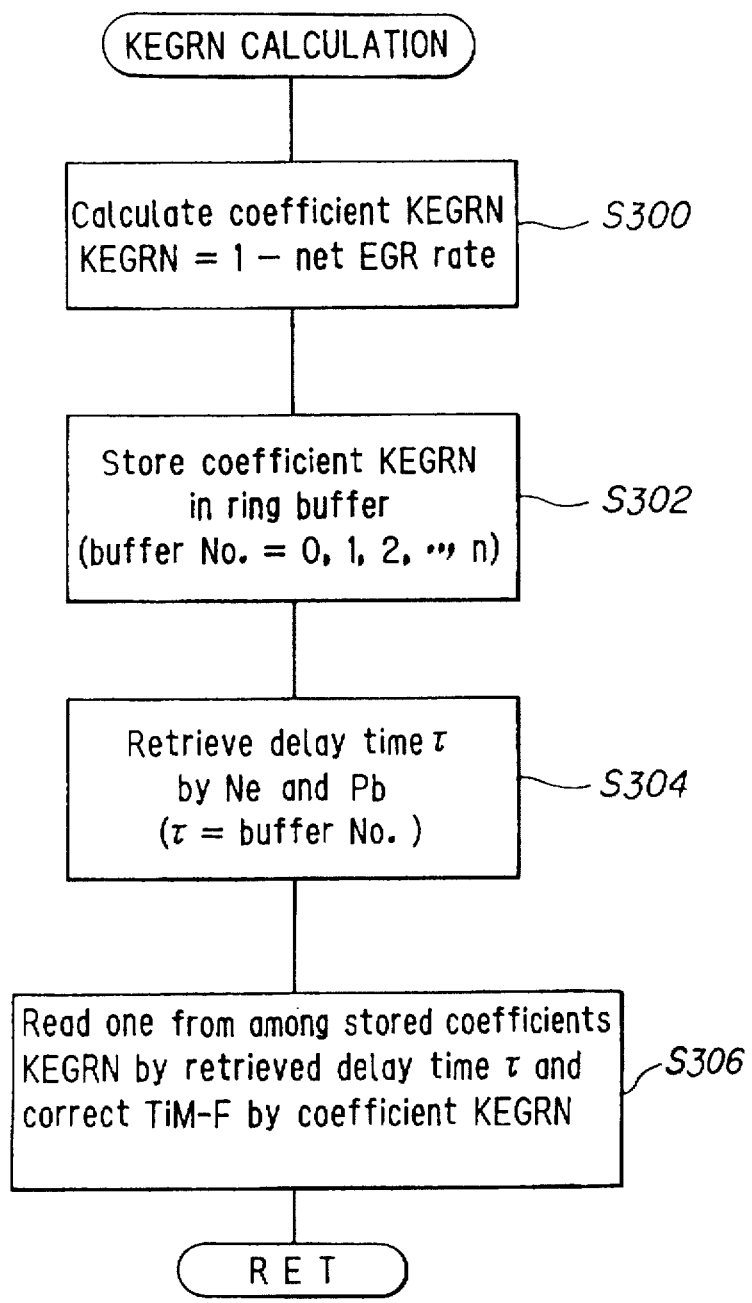
FIG. 24 is a flowchart showing the subroutine of the flowchart of FIG. 19 for calculating a coefficient KEGRN.

FIG. 24 is a flowchart showing the subroutine for calculating the coefficient KEGRN.

In S300 in the flowchart, the net EGR rate (that obtained at S216 of FIG. 19) is subtracted from 1.0 and the difference resulting therefrom is deemed to be the fuel injection correction coefficient KEGRN. The program then proceeds to S302 in which the calculated coefficient KEGRN is stored in a ring buffer prepared in the ROM 74. FIG. 25 shows the configuration of the ring buffer. As illustrated, the ring buffer has n addresses which are numbered from 1 to n and are so identified. Each time the programs of the flowcharts of FIGS. 19 and 24 are activated at respective TDC positions and the fuel injection correction coefficient KEGRN is calculated, the calculated coefficient KEGRN is consecutively stored in the ring buffer from the top.

In the flowchart of FIG. 24, the program then proceeds to S304 in which the delay time τ is retrieved from mapped data using the engine speed Ne and the engine load such as the manifold pressure Pb as address data. FIG. 26 shows the characteristics of the mapped data. Namely, the delay time τ indicates a dead time during which the gas passing through the valve remains in the space before the combustion chamber. Since the dead time varies with engine operating conditions including the engine speed and the engine load, the delay time is set to vary with the parameters. Here, the delay time τ is set as the ring buffer number.

Figure 27:
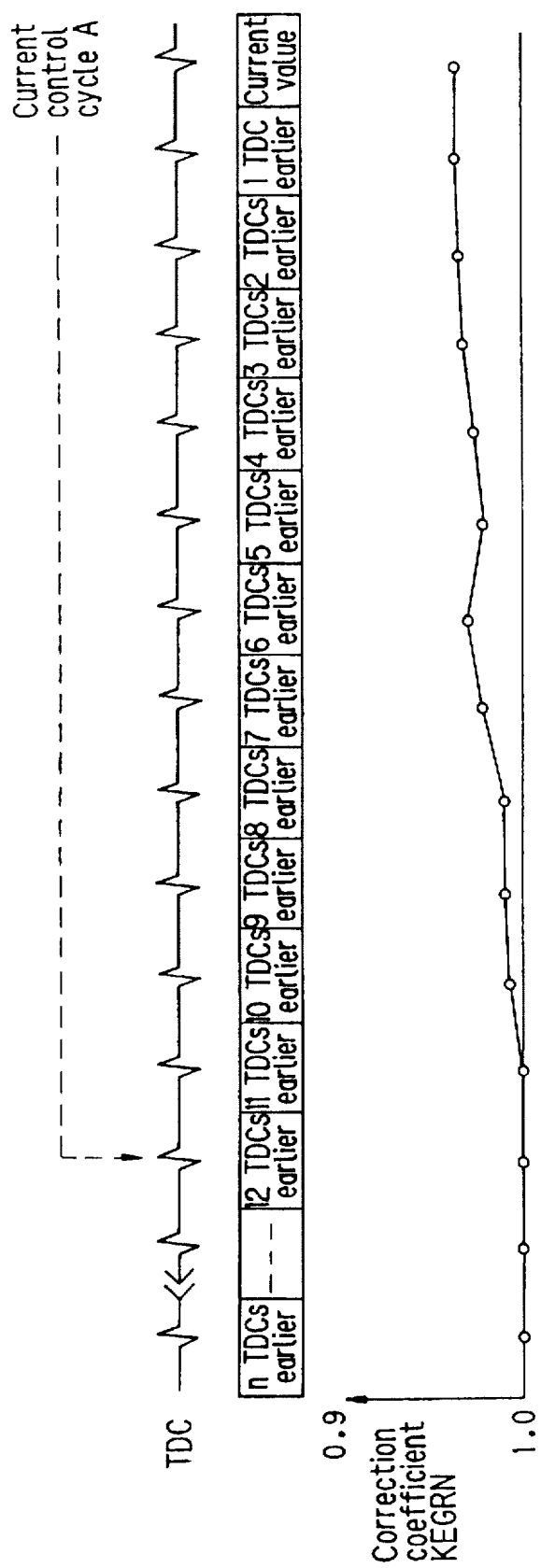
FIG. 27 is a timing chart showing a delay in actual valve lifting to a command value and another delay until exhaust gas has entered the combustion chamber of the engine.

The program then moves to S306 in which one from among the stored fuel injection correction coefficients KEGRN corresponding to the retrieved delay time τ (ring buffer number) is read and is determined to be the correction coefficient KEGRN at the current control cycle. Explaining this in reference to FIG. 27, when the current control cycle (or period) is at A, the coefficient calculated 12 control cycles earlier is, for example, selected as the coefficient to be used in the current control cycle.

Viewing this from the EGR control valve operation, the correction coefficient KEGRN corresponding to the EGR rate calculated 12 control cycles earlier, was 1.0 and this means that the EGR control valve was closed. The value KEGRN then decreases gradually as 0.99, 0.98 . . . i.e., the EGR control valve was gradually driven in the opening direction and reaches the current position at the point A. In this example, it is assumed that the EGR gas has not entered the combustion chamber at the time A so that no correction is made to decrease the quantity of fuel injection. When making the correction, on the other hand, the basic quantity of fuel injection TiM-F is multiplied by the correction coefficient KEGRN to decrease the same.

Again returning to FIG. 19, when S206 finds that the actual valve lifting amount LACT is zero, this means that no EGR operation is carried out. However, as the correction coefficient KEGRN at this time will be a candidate at the selection in a later control cycle, the program proceeds to S214 and on to calculate the net EGR rate and the correction coefficient KEGRN. In such a case, specifically, the net EGR rate is calculated as 0 at S216 and the fuel injection correction coefficient KEGRN is calculated as 1.0 at S300 in FIG. 24.

When it is found in S208 that the command value for valve lifting amount LCMD is less than the lower limit LCMDLL, the program proceeds to S222 in which the command value LCMDk−1 from the last control cycle k-1 is used.

This is because, when the command value for valve lifting amount LCMD is made zero in order to terminate the EGR operation, the actual valve lifting amount LACT does not immediately become zero due to the delay in valve response. Therefore, when the command value LCMD is less than the lower limit, the previous value LCMDk−1 is kept until S206 finds that the actual valve lifting amount LACT has become zero.

Moreover, when the command value LCMD is less than the lower limit LCMDLL, the command value may occasionally be zero. If this happens, the gas flow rate QCMD retrieved at S210 becomes zero and as a result, division by zero would occur at the calculation in step S216, making the calculation impossible. Since, however, the previous value is kept in S222, the calculation can be successfully carried out in S216.

The program then proceeds to S224 in which the basic correction coefficient KEGRMAPk−1 retrieved at the last control cycle is again used in the current control cycle. This is because, under such engine operating conditions that the command value LCMD retrieved in S202 is found to be less than the lower limit LCMDLL, the basic EGR rate correction coefficient KEGRMAP retrieved in step S14 will be 1.0 based on the characteristics of the mapped data. As a result, there is the possibility that the steady-state EGR rate is determined to be 0 in S204. The keeping of the last value in S224 aims to avoid this.

As stated above, the net EGR rate is consecutively estimated on the basis of the engine speed and engine load such as manifold pressure and based thereon the coefficient is consecutively calculated and stored at every control cycle. And the delay time during which exhaust gas passed through the valve, but which remains before the combustion chamber is determined from the same parameters, and one from among the stored coefficients calculated at an earlier control cycle corresponding to the delay time is selected as the coefficient in the current control cycle. This system decreases complicated calculations and greatly reduces calculation uncertainties, making configuration thereof simpler, and it can estimate the net EGR rate accurately and makes it possible to correct the fuel injection quantity with high accuracy.

It should be noted in the above that, it is alternatively possible to store the net EGR rate, instead of KEGRN, in the ring buffer. Further, the dead time may be a fixed value. Since these are described in detail in Japanese Patent Application Hei 6(1994)-294,014 (filed in the United States on Apr. 13, 1995 under the number of U.S. patent application Ser. No. 08/421,182), no further explanation will here be made.

Next, the determination of the canister purge correction coefficient KPUG (in response to the purge mass) will be explained.

The canister purging is conducted, in a program whose flowchart is not shown, such that a desired amount of canister purging is determined in response to the engine operating conditions such as engine speed and engine load in accordance with predetermined characteristics, and the aforesaid purge control valve 225 is regulated such that the desired amount of canister purging is achieved.

When the canister purging is in effect, the air/fuel ratio deviates to the rich side, since vapor gas having fuel is inducted in the air intake system. The deviation will be corrected in the feedback loop. However, since it is expected that the air/fuel ratio will deviate to the rich side at the time of canister purging, it is preferable to correct beforehand the fuel injection quantity by the amount (named KPUG) corresponding to the purging fuel mass such that the amount of correction in the feedback system decreases, thereby reducing calculation load in the feedback loop and enhancing stability against disturbance and improving tracking performance.

The correction will be made by calculating the quantity of fuel in the canister purged gas on the basis of the flow rate and HC concentration of the purged gas being inducted. Alternatively, it can be made by determining the correction coefficient KPUG corresponding to the purge mass from the difference of the LAF sensor output with respect to the desired air/fuel ratio. The latter method is used in the embodiment.

Figure 28:
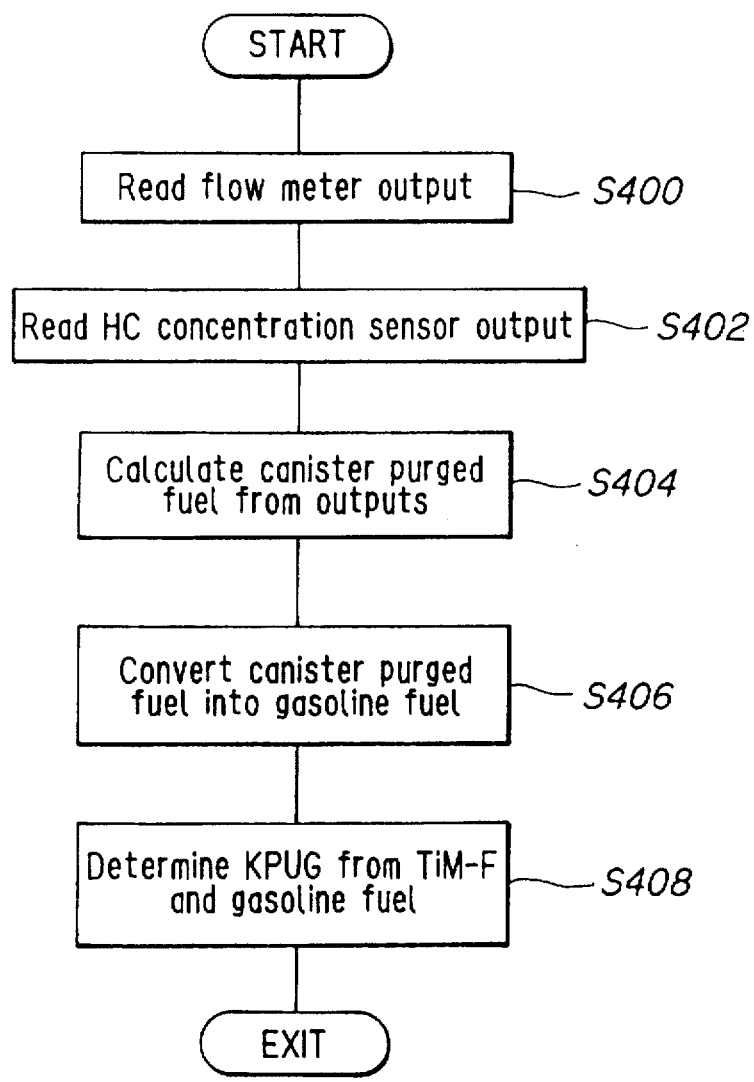
FIG. 28 is a flowchart showing the determination or calculation of the canister purge correction coefficient KPUG referred to in the explanation of the configuration illustrated in FIG. 8.

FIG. 28 is a flowchart showing the coefficient determination.

The program starts at S400 in which the flow rate of purged gas is detected from the output of the aforesaid flow meter 226 and proceeds to S402 in which the HC concentration is detected from the output of the aforesaid HC concentration sensor, to S404 in which the quantity (mass) of fuel being inducted through canister purging is determined, to S406 in which the determined quantity of fuel is converted into the quantity of gasoline fuel. Since most of the fuel component in the canister purged gas is butane, which is a light component of gasoline. Since the stoichiometric air/fuel ratio is different for butane and gasoline, the determined quantity is recalculated for the quantity of gasoline. The program then proceeds to S408 in which the basic quantity of fuel injection TiM-F obtained through map retrieval is multiplied by the desired air/fuel ratio to determine the amount of cylinder-inducted air Gc, and based on the value Gc and the converted quantity of gasoline fuel, the correction coefficient KPUG corresponding to purge mass is calculated. Needless to say, the correction coefficient KPUG will be 1.0 when the canister purging is not in effect.

It is alternatively possible in the above to preestablish the correction coefficient KPUG, at 0.95 for example, in response to the desired amount of canister purging determined in the engine operating conditions and to regulate the purge control valve 225 in response to the correction coefficient.

It is alternatively possible in the above to determine the correction coefficient KPUG from an error between the detected air/fuel ratio and the desired air/fuel ratio.

It is alternatively possible in the above to preestablish the amount of cylinder-intake air Gc as mapped data to be retrieved by engine speed and engine load.

It is alternatively possible in the above to subtract the converted quantity of fuel in terms of gasoline (S406) from the required quantity of fuel injection Tcyl.

The correction coefficient KTOTAL is a general name that is the product of the various correction coefficients including KEGR and KPUG. The value additionally includes a correction coefficient KTW for coolant temperature and a correction coefficient KTA for intake air temperature, etc. Since, however, the nature of these corrections are well known, detailed explanation will be omitted.

The basic quantity of fuel injection TiM-F is multiplied by the correction coefficient KTOTAL (=KEGR×KPUG×KTW×KTA...) thus obtained to correct the same.

Next, the desired air/fuel ratio KCMD and the desired air/fuel ratio correction coefficient KCMDM are determined or calculated.

Figure 29:
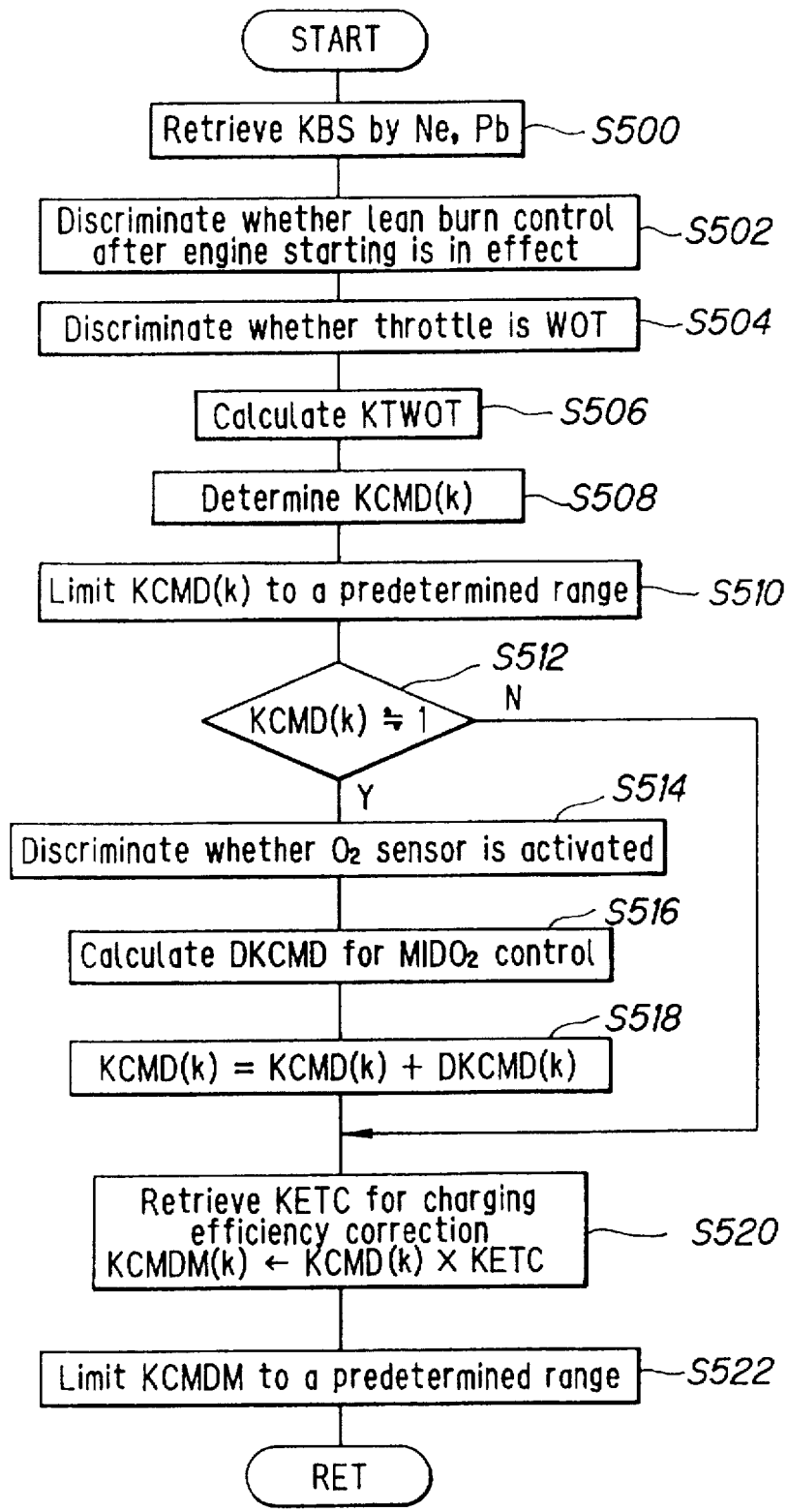
FIG. 29 is a flowchart showing the determination or calculation of the desired air/fuel ratio or the desired air/fuel ratio correction coefficient referred to in the explanation of the configuration illustrated in FIG. 8.

FIG. 29 is a flowchart showing the determinations.

The program begins at S500 in which the aforesaid base value KBS is determined. This is done by retrieving the mapped data (whose characteristics are shown in FIG. 14) by the detected engine speed Ne and the manifold pressure Pb. The mapped data includes a base value at engine idling. When the fuel metering control includes the lean burn control, i.e. a lean mixture is supplied at a low engine load to improve fuel economy, the mapped data will include that for lean burn control.

The program then proceeds to S502 in which it is discriminated, by referring to a timer value, whether a lean burn control after engine starting is in effect to determine a lean correction coefficient. The system according to the invention is equipped with the variable timing mechanism 300 that allows the lean burn control after engine starting in which the desired air/fuel ratio is set to be leaner than the stoichiometric air/fuel ratio for a predetermined period after engine starting, while one intake valve is kept at rest in the period. The supplying of a rich mixture for a period after engine starting during which the catalyst remains inactivated would disadvantageously increase emission of HC in the exhaust gas. The lean burn control after engine starting can however avoid this problem.

In an engine without the variable valve timing mechanism, when a desired air/fuel ratio is set to be leaner, combustion becomes unstable and misfire may sometimes occur. The engine 10 with the mechanism illustrated in FIG. 1 is able to keep one of two intake valves at rest, which generates an air eddy of intake air called "swirl" that stabilizes combustion even just after engine 25 starting, making it possible to set a lean desired air/fuel ratio for that period. Therefore, the timer value counting the period is read in S502 to discriminate whether it is in the lean burn control period after engine starting and to determine the lean correction coefficient. When the result of the step is affirmative, the coefficient is determined to be 0.89, whereas when the result is negative, it is determined to be 1.0, for example.

The program then proceeds to S504 in which it is discriminated whether the throttle opening is full-throttle (WOT) and calculates a full-throttle enrichment correction coefficient, to S506 in which it is discriminated whether the coolant temperature Tw is high and calculates an augmentative correction coefficient KTWOT. The value KTWOT includes a correction coefficient for protecting the engine at high coolant temperature.

The program then proceeds to S508 in which the base value KBS is multiplied by the correction coefficients to correct the same and determines the desired air/fuel ratio KCMD. This is determined by first setting a window (the aforesaid catalyst window) named DKCMD-OFFSET for the minute air/fuel ratio control (the aforesaid MIDO$_2$ control) within a range in which the outputs of the O$_2$ sensor 56 have a linear characteristic in the neighborhood of the stoichiometric value, as illustrated by dashed lines in the ordinate of the graph shown in FIG. 7, and then by adding the value DKCMD-OFFSET to the base value KBS. More precisely, the desired air/fuel ratio KCMD is determined as follows:

KCMD=KBS+DKCMD-OFFSET

The program then goes to S510 in which the desired air/fuel ratio KCMD(k) is limited to a predetermined range, and to S512 in which it is discriminated whether the calculated desired air/fuel ratio KCMD(k) is 1.0 or thereabout. When the result is affirmative, the program goes to S514 in which it is discriminated whether the O$_2$ sensor 56 is activated. This is conducted in a subroutine not shown by detecting the change in output voltage named VO$_2$M of the O$_2$ sensor 56. The program then moves to S516 to calculate a value DKCMD for MIDO$_2$ control. This calculation means to make the desired air/fuel ratio variable for the LAF sensor 54 upstream of the O$_2$ sensor 56 provided downstream of the first catalytic converter 28 (in the case of the configuration illustrated in FIG. 5, downstream of the first catalyst bed). More specifically, this is done by calculating the value from an error between a predetermined reference voltage VrefM and the O$_2$ sensor output voltage VO$_2$M using PID control, as illustrated in FIG. 7. The reference voltage VrefM is determined in response to the atmospheric pressure Pa, the coolant temperature Tw and the exhaust gas volume (which may be determined in response to the engine speed Ne and the manifold pressure Pb).

Here, the aforesaid value DKCMD-OFFSET for window setting are offset values necessary for the first and second catalysts 28, 30 to maintain optimum purification efficiency. Since the offset values are different depending on the property or characteristics of a catalyst, the values are determined taking the property of the first catalytic converter 28 into account. In addition, since the values vary as the catalyst becomes aged, the values are updated through a learning control by obtaining weighted averages using the value DKCM calculated periodically. More specifically, the values are calculated as follows:

DKCMD-OFFSET(k)=W×DKCMD+(1-W)×DKCMD-OFFSET(k-1)

Here, W means a weight.

Thus, by obtaining a learning control value through the calculation of the weighted average between DKCMD calculated at the current cycle and DKCMD-OFFSET calculated at the cycle one time earlier, it is possible to conduct feedback control such that the desired air/fuel ratio converges to the air/fuel ratio that makes the purification efficiency maximum, without being affected by aging of the catalyst. This learning control may be conducted in respective engine operating conditions defined by the engine speed Ne and the manifold pressure Pb, etc.

Figure 30:
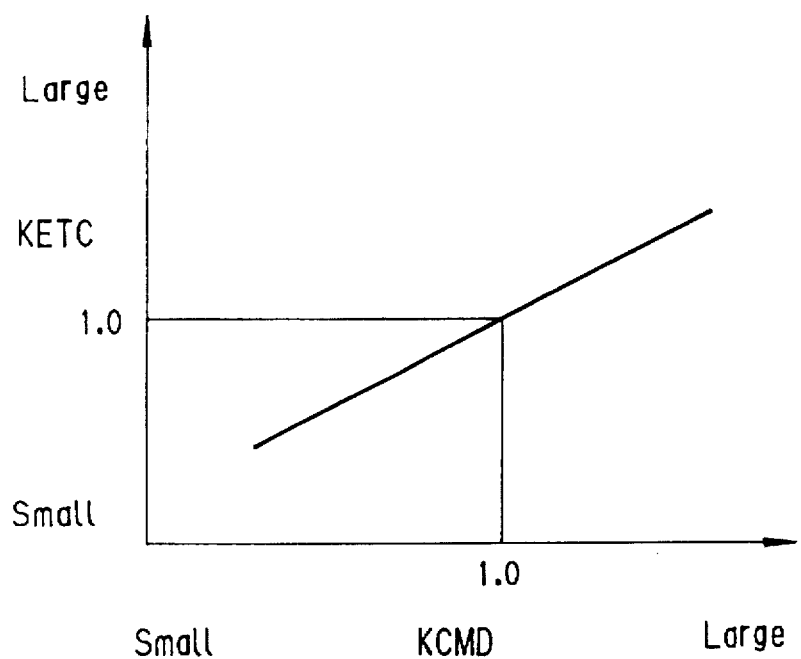
FIG. 30 is a graph showing the correction for charging efficiency referred to in the flowchart of FIG. 29.

The program then goes to S518 in which the calculated value DKCMD(k) is added to the desired air/fuel ratio to update it, to S520 in which a table (whose characteristic is shown in FIG. 30) is looked up using the updated desired air/fuel ratio KCMD(k) as address data to retrieve a correction coefficient KETC. Since the charging efficiency of intake air varies with evaporation heat, this is done for compensating it. More specifically, the desired air/fuel ratio KCMD(k) is multiplied by the correction coefficient KETC as illustrated to determine the aforesaid desired air/fuel ratio correction coefficient KCMDM(k).

In other words, the desired air/fuel ratio is expressed, in fact, by the equivalence ratio and the desired air/fuel ratio correction coefficient is determined by making the charging efficiency correction thereto. When the result at S512 is negative, since this means that the desired air/fuel ratio KCMD(k) deviates greatly from the stoichiometric air/fuel ratio such as in lean burning control, the program jumps to S520 since it is not necessary to conduct the MIDO$_2$ control. The program finally proceeds to S522 in which the desired air/fuel ratio correction coefficient KCMDM(k) is limited to a predetermined range.

Again returning to the FIG. 8 block diagram, the basic quantity of fuel injection TiM-F is multiplied by the desired air/fuel ratio correction coefficient KCMDM and the other correction coefficient KTOTAL to determine the required quantity of fuel injection Tcyl.

Next, the feedback correction coefficients such as KSTR are calculated or determined.

Before entering the explanation of the calculation, sampling of the LAF sensor outputs and the observer will be explained. The sampling block is illustrated as "Sel-V" in FIG. 8.

The sampling blocks and the observer will now be explained.

Figure 31:
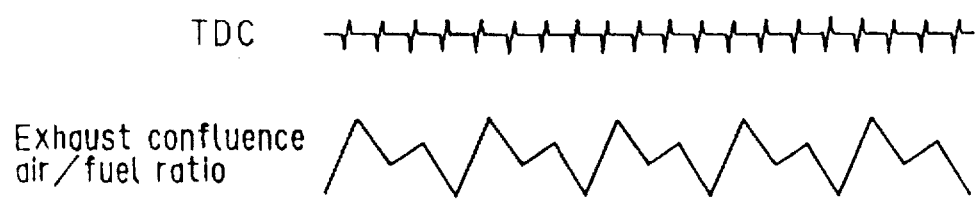
FIG. 31 is an explanatory view showing the relationship between the air/fuel ratio at the confluence point of the exhaust system of an engine relative to the TDC crank position.
Figure 32:
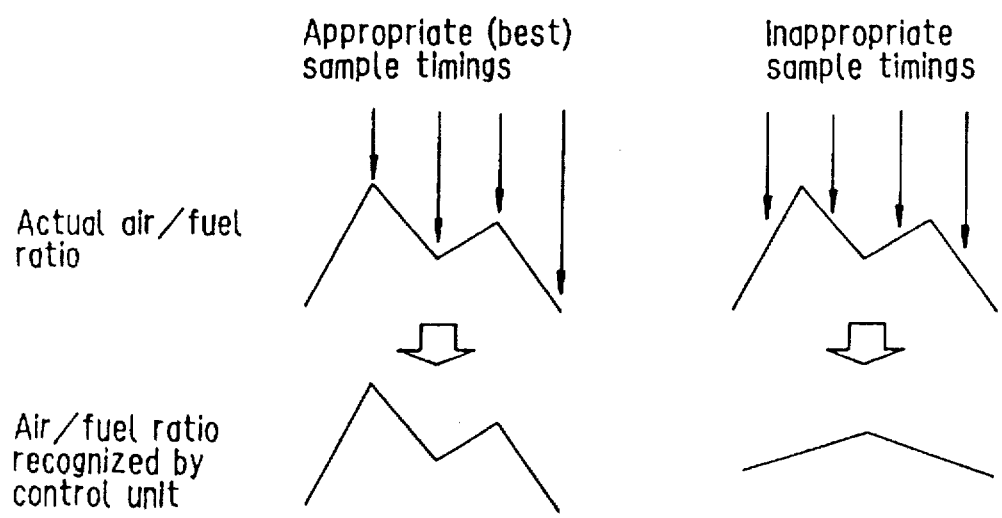
FIG. 32 is an explanatory view showing appropriate (best) sample timings of air/fuel ratio sensor outputs in contrast with inappropriate sample timings.

In an internal combustion engine, combusted gas is exhausted during the exhaust stroke at the individual cylinders. Thus, observation of the air/fuel ratio behavior at the exhaust system confluence point clearly shows that it varies synchronously with TDC. Sampling of the air/fuel ratio using the aforesaid LAF sensor 54 installed in the exhaust system therefore has to be conducted synchronously with TDC. Depending on the sampling timing of the control unit (ECU) 34 for processing the detection output, however, it may become impossible to ascertain the air/fuel ratio accurately. When the air/fuel ratio at the exhaust system confluence point varies with respect to TDC as shown in FIG. 31, for example, the air/fuel ratio ascertained by the control unit may, depending on the sampling timing, become a completely different value, as shown in FIG. 32. It is therefore preferable to sample at positions which enable the actual changes in the output of the air/fuel ratio sensor to be ascertained as accurately as possible.

In addition, the detected air/fuel ratio also varies depending on the time required for the exhaust gas to reach the sensor and on the sensor response time (detection delay). The time required for the exhaust gas to reach the sensor in turn varies with the exhaust gas pressure, exhaust gas volume and the like. Since sampling synchronously with TDC means that the sampling is based on crank angle, moreover, the effect of engine speed is unavoidable. From this, it will be understood that air/fuel ratio detection is highly dependent on the engine operating condition. In prior art disclosed in Japanese Laid-Open Patent Application Hei 1(1989)-313,644, therefore, the practice has been to discriminate the appropriateness of the detection once every prescribed crank angle. Since this requires a complex configuration and long computation time, however, it may not be able to keep up at high engine speeds and is further apt to encounter the problem that the sensor output has already passed its inflection point by the time that the decision to sample has been made.

Figure 33:
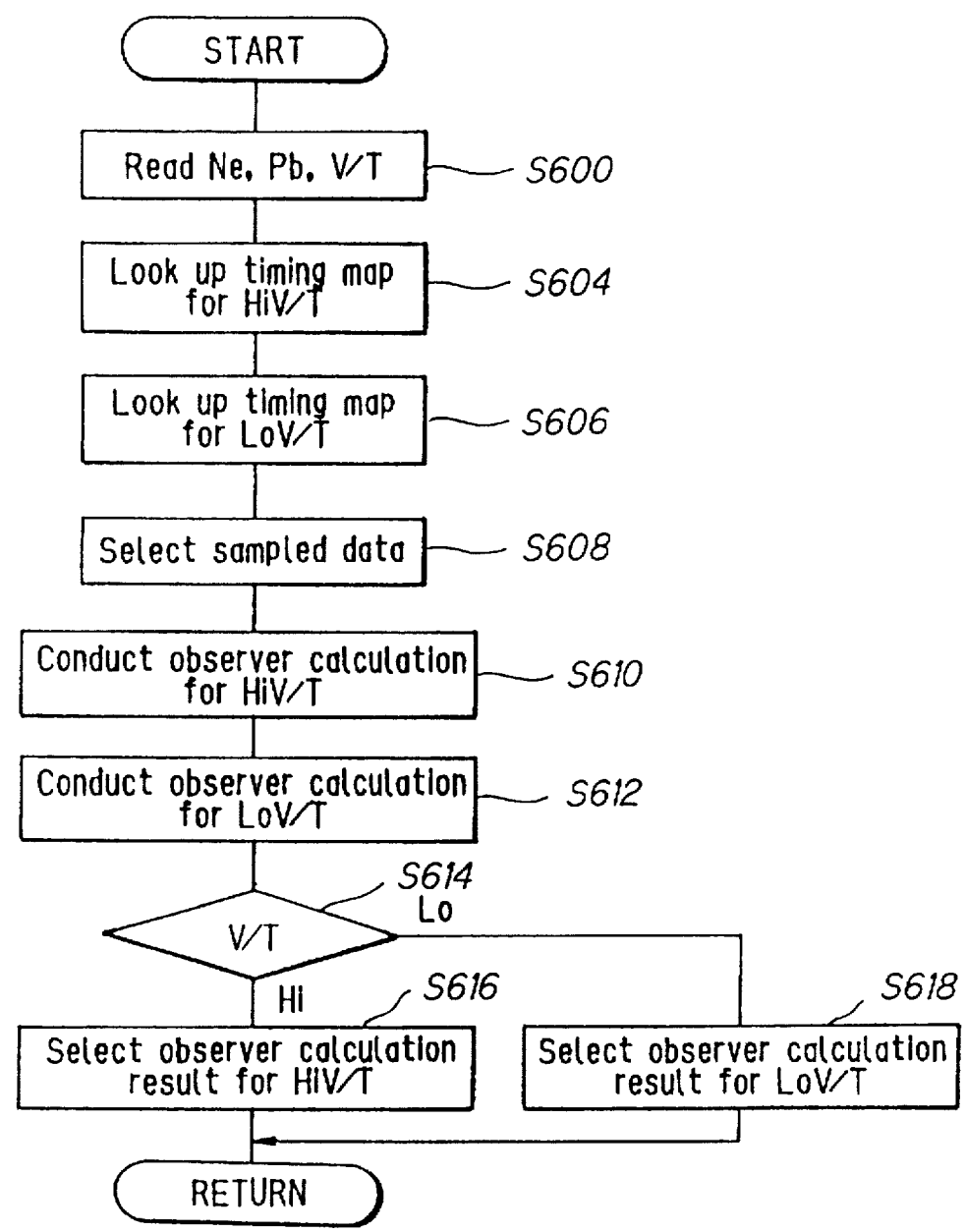
FIG. 33 is a flowchart showing the operation of the air/fuel ratio sampling conducted by the sampling block illustrated in FIG. 8.

FIG. 33 is a flowchart of the operations for sampling the LAF sensor. Since the accuracy of air/fuel ratio detection has a particularly close relationship with the estimation accuracy of the aforesaid observer, however, a brief explanation of the estimation of air/fuel ratio by the observer will be given before going into an explanation of this flowchart.

Figure 34:
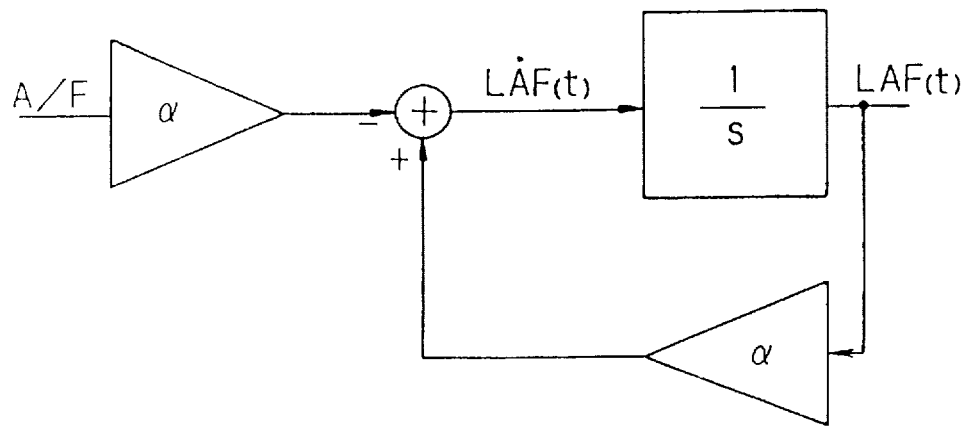
FIG. 34 is a block diagram showing a model which describes the behavior of detection of the air/fuel ratio referred to in the assignee's earlier application.

For high-accuracy separation and extraction of the air/fuel ratios of the individual cylinders from the output of a single LAF sensor, it is first necessary to accurately ascertain the detection response delay (lag time) of the LAF sensor. This delay was therefore modeled as a first-order delay system, to obtain the model shown in FIG. 34. Here, if we define LAF: LAF sensor output and A/F: input A/F, the state equation can be written as $$\dot{LAF}(t) = \alpha LAF(t) - \alpha A/F(t) \quad \text{Eq. 9}$$

Discretizing this for period Delta T, yields $$LAF(k+1) = \hat{\alpha} LAF(k) + (1-\hat{\alpha}) A/F(k) \quad \text{Eq. 10}$$

Here, $\hat{\alpha}$ is the correction coefficient and is defined as:

$$\hat{\alpha} = 1 + \alpha \Delta T + (\tfrac{1}{2}!)\alpha^2 \Delta T^2 + (\tfrac{1}{3}!)\alpha^3 \Delta T^3 + (\tfrac{1}{4}!)\alpha^4 \Delta T^4$$

Figure 35:
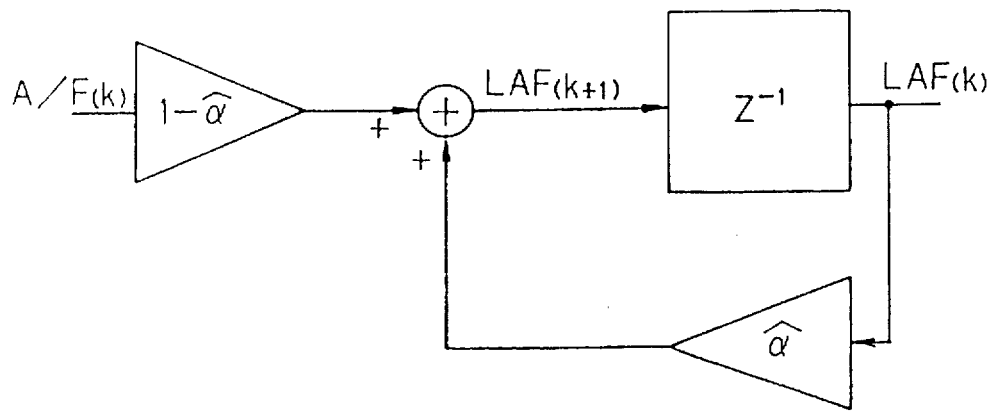
FIG. 35 is a block diagram which shows the model of FIG. 34 discretized in the discrete-time series for a period delta T.

Eq. 10 is represented as a block diagram in FIG. 35.

Therefore, Eq. 10 can be used to obtain the actual air/fuel ratio from the sensor output. That is to say, since Eq. 10 can be rewritten as Eq. 11, the value at time k-1 can be calculated back from the value at time k as shown by Eq. 12.

$$A/F(k) = \{LAF(k+1) - \hat{\alpha} LAF(k)\}/(1-\hat{\alpha}) \quad \text{Eq. 11}$$

$$A/F(k-1) = \{LAF(k) - \hat{\alpha} LAF(k-1)\}/(1-\hat{\alpha}) \quad \text{Eq. 12}$$

Figure 36:
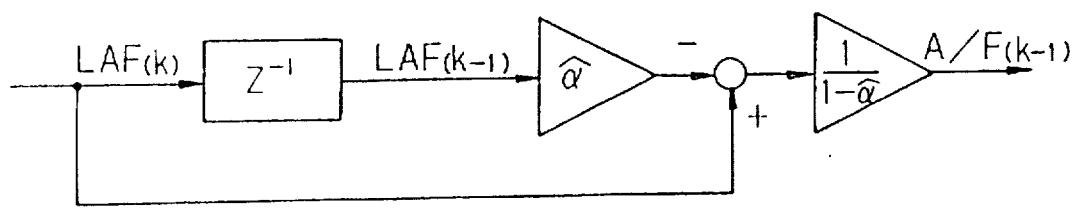
FIG. 36 is a block diagram showing a real-time air/fuel ratio estimator based on the model of FIG. 35.

Specifically, use of the Z transformation to express Eq. 10 as a transfer function gives Eq. 13 and a real-time estimate of the air/fuel ratio input in the preceding cycle can be obtained by multiplying the sensor output LAF of the current cycle by the reciprocal of this transfer function. FIG. 36 is a block diagram of the real-time A/F estimator.

$$t(z) = (1-\hat{\alpha})/(Z-\hat{\alpha}) \quad \text{Eq. 13}$$

The separation and extraction of the air/fuel ratios of the individual cylinders using the actual air/fuel ratio obtained in the foregoing manner will now be explained. As explained in an earlier application proposed by the assignee and filed in the United States Dec. 24, 1992 under the number of U.S. patent application Ser. No. 07/997,769, the air/fuel ratio at the exhaust system confluence point can be assumed to be an average weighted to reflect the time-based contribution of the air/fuel ratios of the individual cylinders. This makes it possible to express the air/fuel ratio at the confluence point at time k in the manner of Eq. 14. (As F (fuel) was selected as the controlled variable, the fuel/air ratio F/A is used here. For easier understanding, however, the air/fuel ratio will be used in the explanation so long as such usage does not lead to confusion. The term "air/fuel ratio" (or "fuel/air ratio") used herein is the actual value corrected for the response delay calculated according to Eq. 13.)

$$[F/A](k) = C_1[F/A\#_1] + C_2[F/A\#_3] + C_3[F/A\#_4] + C_4[F/A\#_2] \quad \text{Eq. 14}$$

$$[F/A](k+1) = C_1[F/A\#_3] + C_2[F/A\#_4] + C_3[F/A\#_2] + C_4[F/A\#_1]$$

$$[F/A](k+2) = C_1[F/A\#_4] + C_2[F/A\#_2] + C_3[F/A\#_1] + C_4[F/A\#_3]$$

Figure 37:
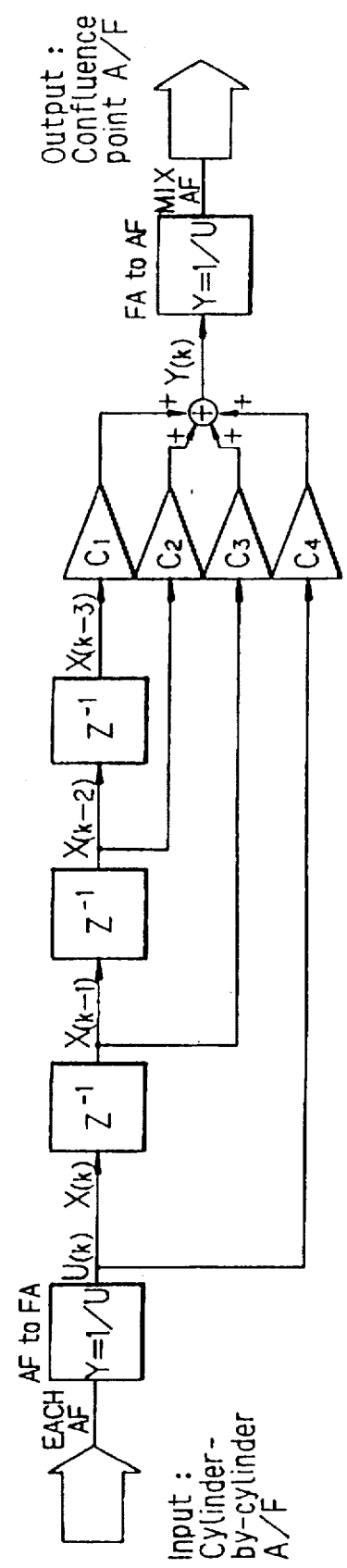
FIG. 37 is a block diagram showing a model which describes the behavior of the exhaust system of the engine referred to in the assignee's earlier application.

More specifically, the air/fuel ratio at the confluence point can be expressed as the sum of the products of the past firing histories of the respective cylinders and weighting coefficient Cn (for example, 40% for the cylinder that fired most recently, 30% for the one before that, and so on). This model can be represented as a block diagram as shown in FIG. 37.

Its state equation can be written as $$\begin{pmatrix} x(k-2) \\ x(k-1) \\ x(k) \end{pmatrix} = \begin{pmatrix} 0 & 1 & 0 \\ 0 & 0 & 1 \\ 0 & 0 & 0 \end{pmatrix} \begin{pmatrix} x(k-3) \\ x(k-2) \\ x(k-1) \end{pmatrix} + \begin{pmatrix} 0 \\ 0 \\ 1 \end{pmatrix} u(k) \quad \text{Eq. 15}$$

Further, when the air/fuel ratio at the confluence point is defined as y(k), the output equation can be written as $$y(k) = [c_1 c_2 c_3] \begin{pmatrix} x(k-3) \\ x(k-2) \\ x(k-1) \end{pmatrix} + c_4 u(k) \quad \text{Eq. 16}$$

Here:

$c_1:0.05, c_2:0.15, c_3:0.30, c_4:0.50$

Since u(k) in this equation cannot be observed, even when an observer is designed from the equation, it will still not be possible to observe x(k). Thus, when one defines x(k+1)=x(k-3) on the assumption of a stable operating state in which there is no abrupt change in the air/fuel ratio from that 4 TDCs earlier (i.e., from that of the same cylinder), Eq. 17 is obtained.

$$\begin{pmatrix} x(k-2) \\ x(k-1) \\ x(k) \\ x(k+1) \end{pmatrix} = \begin{pmatrix} 0 & 1 & 0 & 0 \\ 0 & 0 & 1 & 0 \\ 0 & 0 & 0 & 1 \\ 1 & 0 & 0 & 0 \end{pmatrix} \begin{pmatrix} x(k-3) \\ x(k-2) \\ x(k-1) \\ x(k) \end{pmatrix} \quad \text{Eq. 17}$$

$$y(k) = [c_1 c_2 c_3 c_4] \begin{pmatrix} x(k-3) \\ x(k-2) \\ x(k-1) \\ x(k) \end{pmatrix}$$

Figure 38:
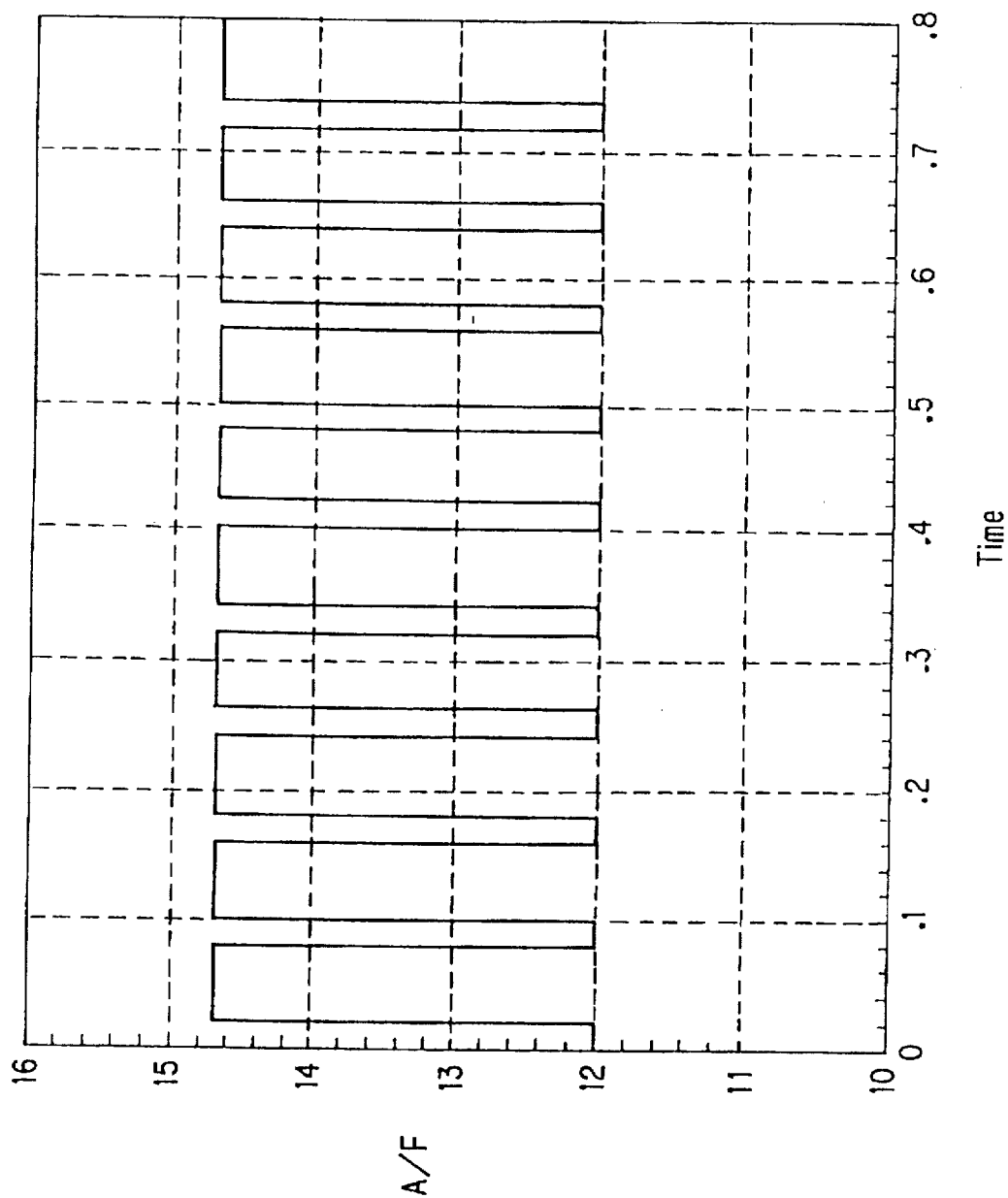
FIG. 38 is a graph showing the precondition of a simulation where fuel is assumed to be supplied to three cylinders of a four-cylinder engine so as to obtain an air/fuel ratio of 14.7:1, and to one cylinder.
Figure 39:
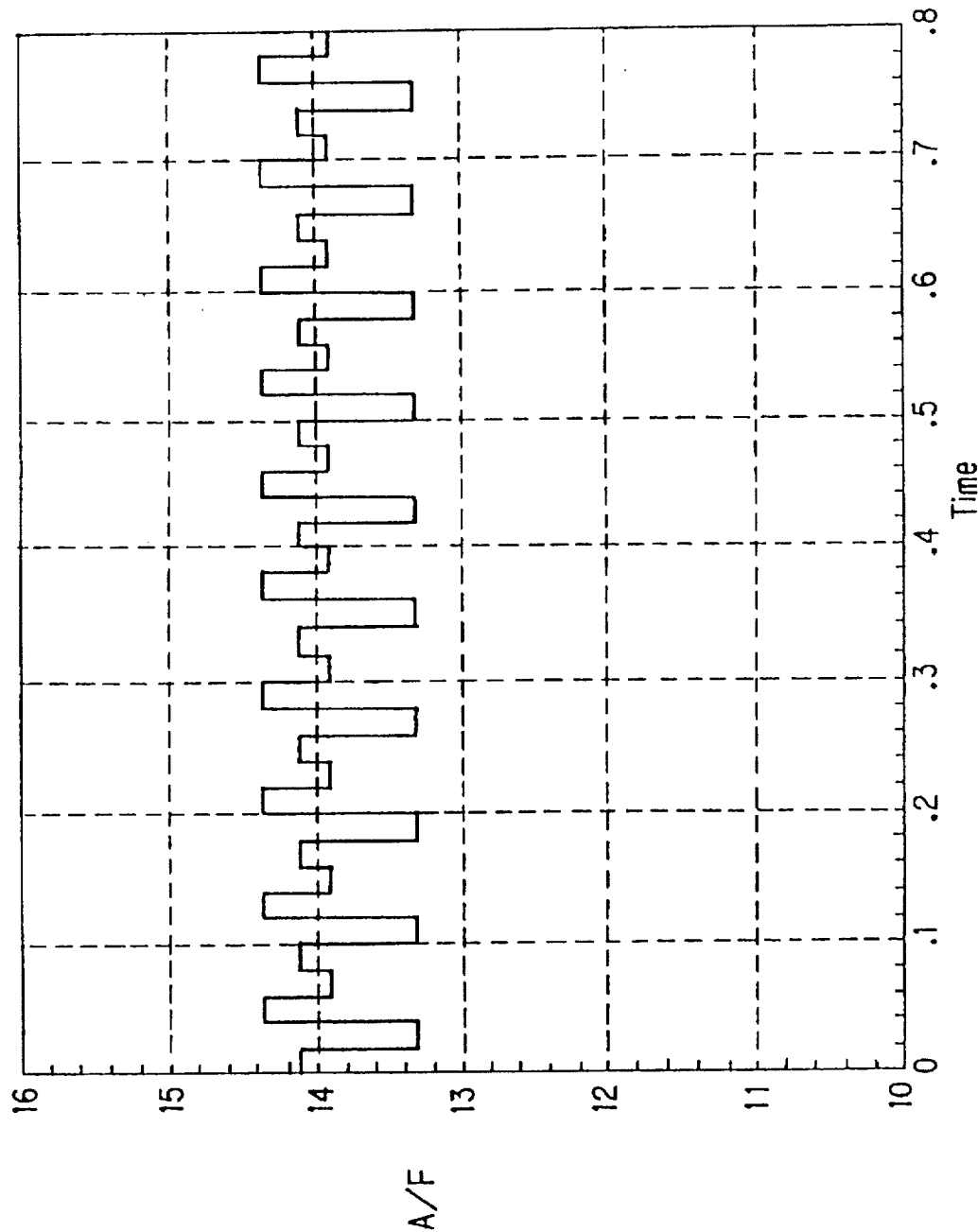
FIG. 39 is a graph showing the result of the simulation which shows the output of the exhaust system model and the air/fuel ratio at a confluence point when the fuel is supplied in the manner illustrated in FIG. 38.
Figure 40:
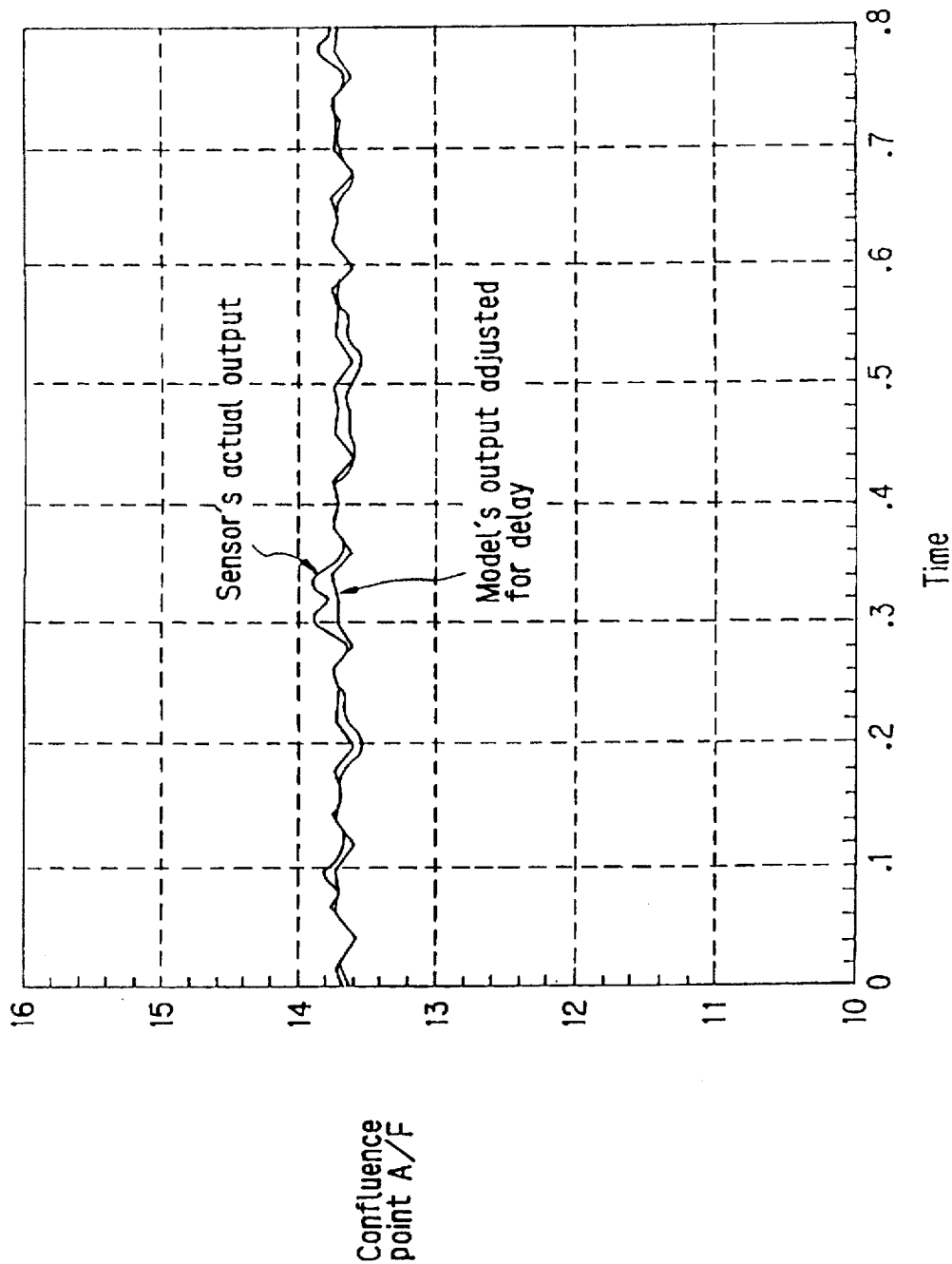
FIG. 40 is the result of the simulation which shows the output of the exhaust system model adjusted for sensor detection response delay (time lag) in contrast with the sensor's actual output.

The simulation results for the model obtained in the foregoing manner will now be given. FIG. 38 relates to the case where fuel is supplied to three cylinders of a four-cylinder internal combustion engine so as to obtain an air/fuel ratio of 14.7:1, and to one cylinder so as to obtain an air/fuel ratio of 12.0:1. FIG. 39 shows the air/fuel ratio at this time at the confluence point as obtained using the aforesaid model. While FIG. 39 shows that a stepped output is obtained, when the response delay of the LAF sensor is taken into account, the sensor output becomes the smoothed wave designated "Model's output adjusted for delay" in FIG. 40. The curve marked "Sensor's actual output" is based on the actually observed output of the LAF sensor under the same conditions. The close agreement of the model results with this verifies the validity of the model as a model of the exhaust system of a multiple cylinder internal combustion engine.

Thus, the problem comes down to one of an ordinary Kalman filter in which x(k) is observed in the state equation (Eq. 18) and the output equation. When the weighting parameters Q, R are determined as Eq. 19 and Riccati's equation is solved, the gain matrix K becomes as shown in Eq. 20.

$$\begin{cases} X(k+1) = AX(k) + Bu(k) \\ y(k) = CX(k) + Du(k) \end{cases} \quad \text{Eq. 18}$$

Here:

$$A = \begin{pmatrix} 0100 \\ 0010 \\ 0001 \\ 1000 \end{pmatrix} \quad C = [c_1 c_2 c_3 c_4] \quad B = D = [0]$$

$$X(k) = \begin{pmatrix} x(k-3) \\ x(k-2) \\ x(k-1) \\ x(k) \end{pmatrix}$$

$$Q = \begin{pmatrix} 1000 \\ 0100 \\ 0010 \\ 0001 \end{pmatrix} \quad R = [1] \quad \text{Eq. 19}$$

$$K = \begin{pmatrix} 0.0436 \\ 0.2822 \\ 1.8283 \\ -0.2822 \end{pmatrix} \quad \text{Eq. 20}$$

Obtaining A-KC from this gives Eq. 21.

$$A - KC = \begin{pmatrix} -0.0022 & 0.9935 & -0.0131 & -0.0218 \\ -0.0141 & -0.0423 & 0.9153 & -0.1411 \\ -0.0914 & -0.2742 & -0.5485 & 0.0858 \\ 1.0141 & 0.0423 & 0.0847 & 0.1411 \end{pmatrix} \quad \text{Eq. 21}$$

Figure 41:
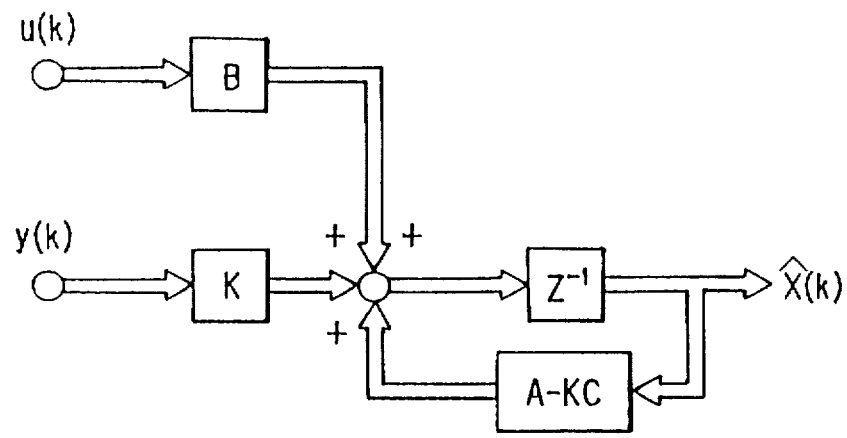
FIG. 41 is a block diagram showing the configuration of an ordinary observer.
Figure 42:
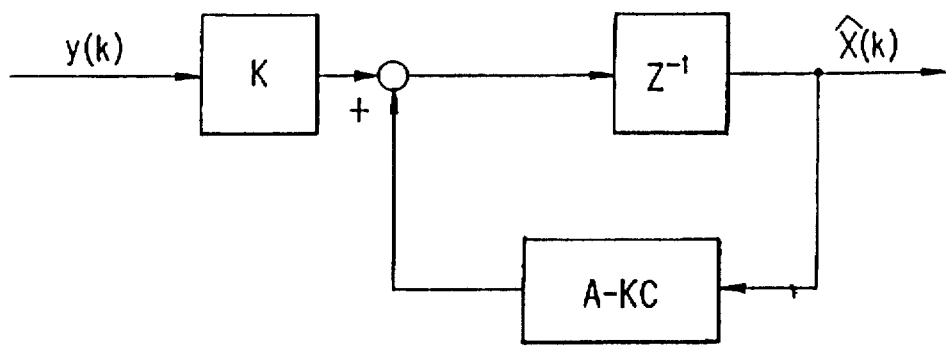
FIG. 42 is a block diagram which shows the configuration of the observer referred to in the assignee's earlier application.

FIG. 41 shows the configuration of an ordinary observer. Since there is no input u(k) in the present model, however, the configuration has only y(k) as an input, as shown in FIG. 42. This is expressed mathematically by Eq. 22.

$$\begin{cases} \hat{X}(k+1) = [A - KC]\hat{X}(k) + Ky(k) \\ \hat{x}(k) = [0001]\hat{X}(k) \end{cases} \quad \text{Eq. 22}$$

The system matrix of the observer whose input is y(k), namely of the Kalman filter, is $$S = \left( \begin{array}{c|c} A - KC & K \\ \hline 0001 & 0 \end{array} \right) \quad \text{Eq. 23}$$

In the present model, when the ratio of the element of the weighting parameter R in Riccati's equation to the element of Q is 1:1, the system matrix S of the Kalman filter is given as $$S = \begin{pmatrix} -0.0022 & 0.9935 & -0.0131 & -0.0218 & 0.0436 \\ -0.0141 & -0.0423 & 0.9153 & -0.1411 & 0.2822 \\ -0.0914 & -0.2742 & -0.5485 & 0.0858 & 1.8283 \\ 1.0141 & 0.0423 & 0.0847 & 0.1411 & -0.2822 \\ 0.0000 & 0.0000 & 0.0000 & 1.0000 & 0.0000 \end{pmatrix} \quad \text{Eq. 24}$$

Figure 43:
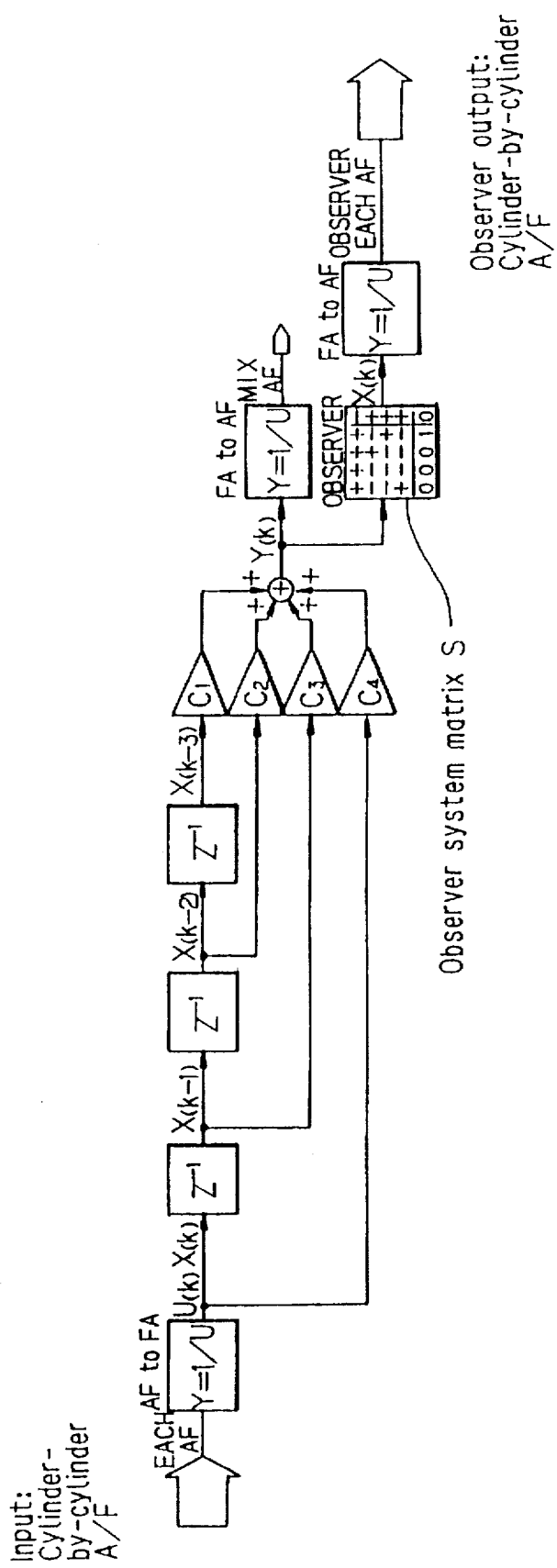
FIG. 43 is an explanatory block diagram showing the configuration achieved by combining the model of FIG. 37 and the observer of FIG. 42.

FIG. 43 shows the aforesaid model and observer combined. As the results of the simulation are shown in the earlier application, they are omitted here. It suffices to say that this enables precise estimation of the air/fuel ratios at the individual cylinders from the air/fuel ratio at the confluence point.

Figure 44:
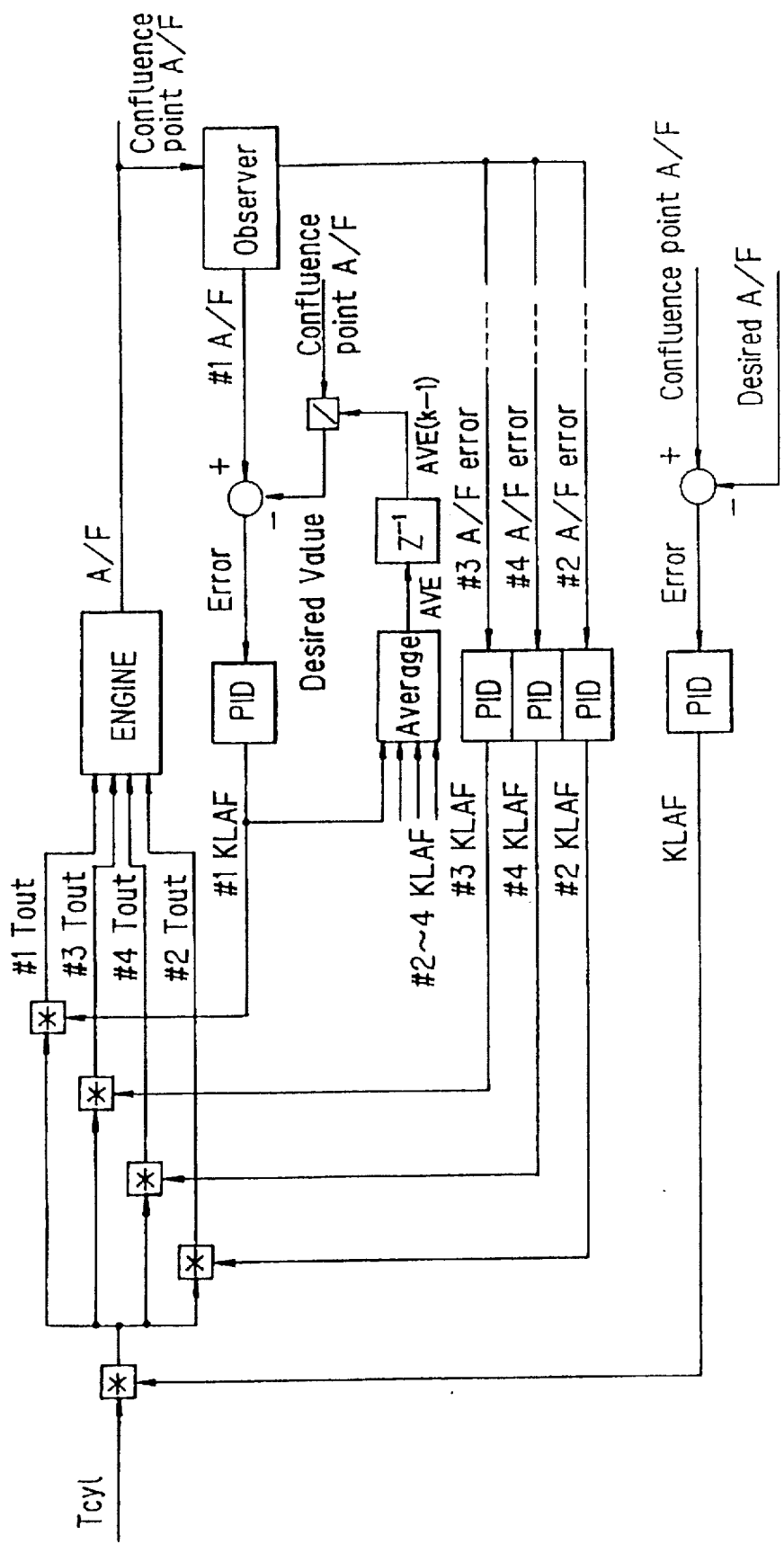
FIG. 44 is a block diagram showing the overall configuration of air/fuel ratio feedback loops in the system.

Since the observer is able to estimate the cylinder-by-cylinder air/fuel ratio from the air/fuel ratio at the confluence point, the air/fuel ratios of the individual cylinders can be separately controlled by PID control or the like. Specifically, as illustrated in FIG. 44, in which the feedback section of the observer of FIG. 35 is extracted and shown by itself, a confluence point feedback correction coefficient KLAF is calculated from the sensor output (confluence point air/fuel ratio) and the desired air/fuel ratio using the PID control law, and cylinder-by-cylinder feedback correction coefficients #nKLAF (n: cylinder concerned) are calculated from the observer's estimated air/fuel ratio #nA/F.

More specifically, the cylinder-by-cylinder feedback correction coefficients #nKLAF are obtained by using the PID law to eliminate the error between the observer's estimated air/fuel ratio #nA/F and the desired value obtained by dividing the confluence point air/fuel ratio by the average value of the cylinder-by-cylinder feedback correction coefficients #nKLAF calculated in the preceding cycle.

Owing to this convergence of the air/fuel ratios of the individual cylinders to the confluence point air/fuel ratio and convergence of the confluence point air/fuel ratio to the desired air/fuel ratio, the air/fuel ratios of all cylinders are converged to the desired is air/fuel ratio. The output quantity of fuel injection #nTout (n: cylinder concerned) is determined by the fuel injector opening period and can be calculated as $$\#nTout = Tcyl \times KCMD \times \#nKLAF \times KLAF.$$

Since the above is disclosed in a Japanese Patent Application Hei 5(1993)-251,138 corresponding to U.S. Patent No. 5,531,208 proposed by the assignee, no further explanation will be made.

The sampling of the LAF sensor output will now be explained with reference to the flowchart of FIG. 33. This subroutine is activated at TDC.

The subroutine of the flowchart of FIG. 33 starts at S600 in which the engine speed Ne, the manifold pressure Pb and the valve timing V/T are read. The program then goes to S604 and S606 in which Hi and Lo valve timing maps (explained later) are looked up and to S608 in which the sensor output is sampled for use in observer computation at Hi or Lo valve timing. Specifically, the timing map is looked up using the detected engine speed Ne and the manifold pressure Pb as address data, the No. of one of the aforesaid 12 buffers is selected, and the sampling value stored therein is selected.

Figure 45:
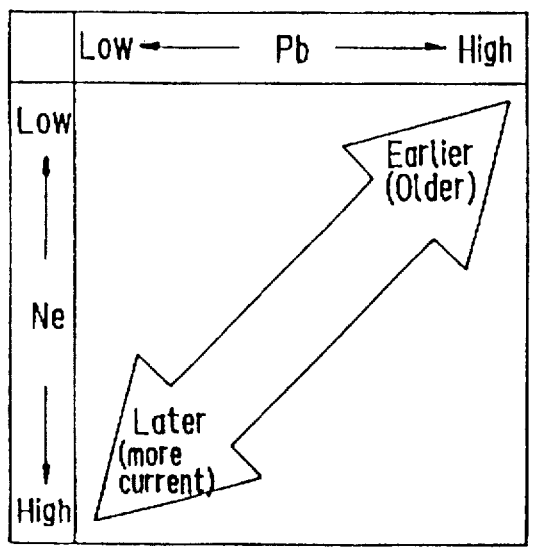
FIG. 45 is an explanatory view showing the characteristics of a timing map referred to in the flowchart of FIG. 33.

FIG. 45 shows the characteristics of the timing maps. As shown, the characteristics are defined so that the sampling crank angle of the selected value becomes earlier with decreasing engine speed Ne and increasing manifold pressure (load) Pb. By an "earlier" value is meant a relatively older one sampled nearer to the preceding TDC. Conversely, the characteristics are defined so that the sampling crank angle of the selected value becomes later (becomes a newer value nearer to the following TDC) with increasing engine speed Ne and decreasing manifold pressure Pb.

Figure 46:
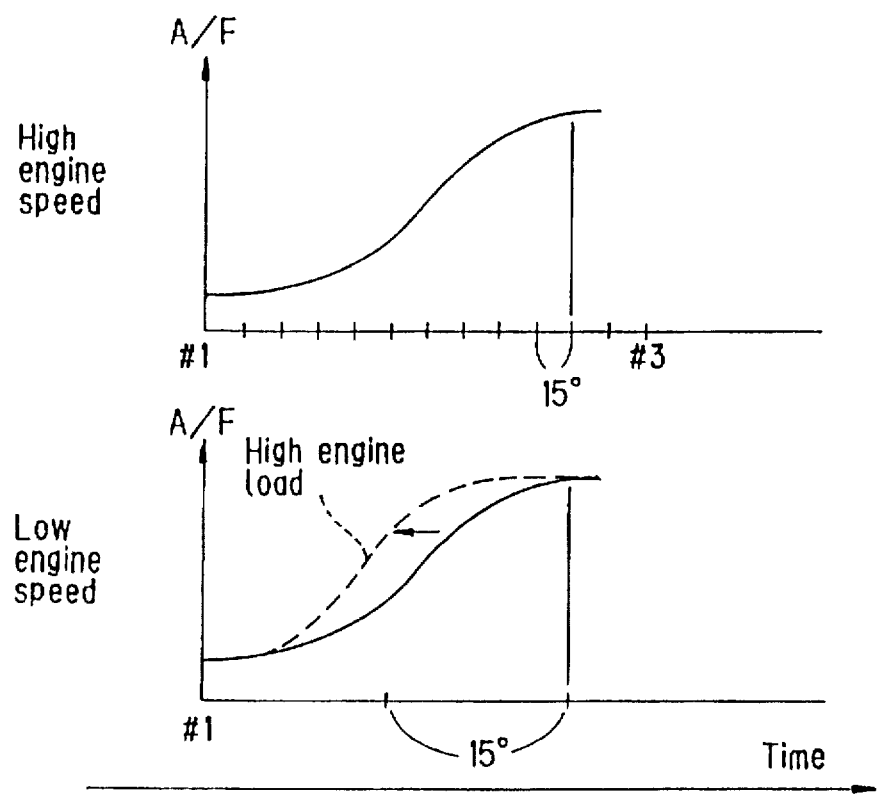
FIG. 46 is a timing chart showing the characteristics of sensor output with respect to the engine speed and a timing chart showing the characteristics of sensor output with respect to the engine load.

It is best to sample the LAF sensor output as close as possible to the inflection point of the actual air/fuel ratio, as shown in FIG. 32. Assuming the sensor response time (detection lag) to be constant, this inflection point, or the first peak thereof, for example, will, as shown in FIG. 46, occur at progressively earlier crank angles with decreasing engine speed. As engine load increases, the exhaust gas can be expected to increase in pressure and volume and therefore reach the sensor earlier owing to its higher flow rate. This is why the selection of the sampled data is determined as shown in FIG. 45.

The valve timing will now be discussed. Defining an arbitrary engine speed on the Lo side as Ne1-Lo and on the Hi side as Ne1-Hi and an arbitrary manifold pressure on the Low side as Pb1-Lo and on the Hi side as Pb1-Hi, the values are mapped such that Pb1-Lo >Pb1-Hi and Ne1-Lo >Ne1-Hi.

In other words, since the time point at which the exhaust valve opens is earlier at HiV/T than at LoV/T, the map characteristics are determined so that an earlier sampling point is selected at HiV/T than at LoV/T insofar as the engine speed and manifold pressure are the same.

The program then goes to S610 in which the observer matrix is computed for HiV/T and to S612 in which the computation is similarly made for LoV/T. It then proceeds to S614 in which the valve timing is discriminated again and, depending on the result of the discrimination, to S616 in which the computation result for HiV/T is selected or to S618 in which that for LoV/T is selected. This completes the routine.

In other words, since the behavior of the confluence point air/fuel ratio also varies with the valve timing, the observer matrix has to be changed synchronously with switching of the valve timing. However, the estimation of the air/fuel ratios at the individual cylinders is not conducted instantaneously. Since several cycles are required for the observer computation to converge, the computations using the observer matrices before and after valve timing switchover are conducted in parallel and one of the computation results is selected in accordance with the new valve timing in S614, even when the valve timing is changed. After the estimation has been made for the individual cylinders, the feedback correction coefficient is calculated for eliminating the error relative to the desired value and the quantity of fuel injection is determined.

The aforesaid configuration improves the accuracy of the air/fuel ratio detection. Since, as shown in FIG. 47, the sampling is conducted at relatively short intervals, the sampled values faithfully reflect the sensor output and the values sampled at relatively short intervals are progressively stored in the group of buffers. The inflection point of the sensor is predicted from the engine speed and the manifold pressure and the corresponding value is selected from the group of buffers at the prescribed crank angle. The observer computation is then conducted for estimating the air/fuel ratios at the individual cylinders, thereby enabling the cylinder-by-cylinder feedback control to be conducted as explained with reference to FIG. 44.

The CPU core 70 can therefore accurately ascertain the maximum and minimum values of the sensor output, as shown at the bottom of FIG. 47. As a result, the estimation of the air/fuel ratios of the individual cylinders using the aforesaid observer can be conducted using values that approximate the behavior of the actual air/fuel ratio, thereby enabling an improvement in accuracy when the cylinder-by-cylinder air/fuel ratio feedback control is conducted in the manner described with reference to FIG. 44.

It should be noted in the above that, the sampling may be made for both the HiV/T and LoV/T, and then the discrimination may be made for the first time as to which timing is selected.

It should also be noted that, since the LAF sensor response time becomes shorter when the air-fuel mixture is lean than in the case when the air-fuel mixture is rich, it is preferable to select the datum sampled earlier when the air/fuel ratio to be detected is lean.

Further, since the exhaust gas pressure drops due to decrease in atmospheric pressure at high altitude, the exhaust gas arrives at the LAF sensor in a time shorter than at a low altitude. As a result, it is preferable to select the datum sampled earlier as the altitude of the place where the vehicle travels increases.

Furthermore, since the sensor response time becomes longer as the sensor becomes degraded, it is preferable to select the datum sampled earlier as the sensor degradation increases.

Since these are explained in an assignee's earlier Japanese Patent Application No. Hei 6(1994)-243,277, it will not be discussed further here.

The feedback correction coefficient such as KSTR will then be explained.

As disclosed in FIG. 44, the PID control law is ordinarily used for fuel metering control for internal combustion engines. The control error between the desired value and the manipulated variable (control input) 5 is multiplied by a P term (proportional term), an I term (integral term) and a D term (differential or derivative term) to obtain the feedback correction coefficient (feedback gain). In addition, it has recently been proposed to obtain the feedback correction coefficient by use of modern control theory.

In the MIDO$_2$ control according to the invention, as mentioned earlier, the feedback correction coefficient KSTR is calculated using an adaptive controller (Self Tuning Regulator), instead of the confluence point feedback correction coefficient KLAF calculated using a PID controller as shown in FIG. 44. This dynamically ensures the response of the system from the desired air/fuel ratio KCMD to the detected air/fuel ratio KACT, since the value KCMD becomes the smoothed value of KACT due to the engine response delay, if the basic quantity of fuel injection determined in the feedforward system is merely corrected by the desired air/fuel ratio feedback correction coefficient KCMDM. The correction coefficient KSTR is therefore multiplied by the basic quantity of fuel injection together with the correction coefficient KCMDM.

Figure 48:
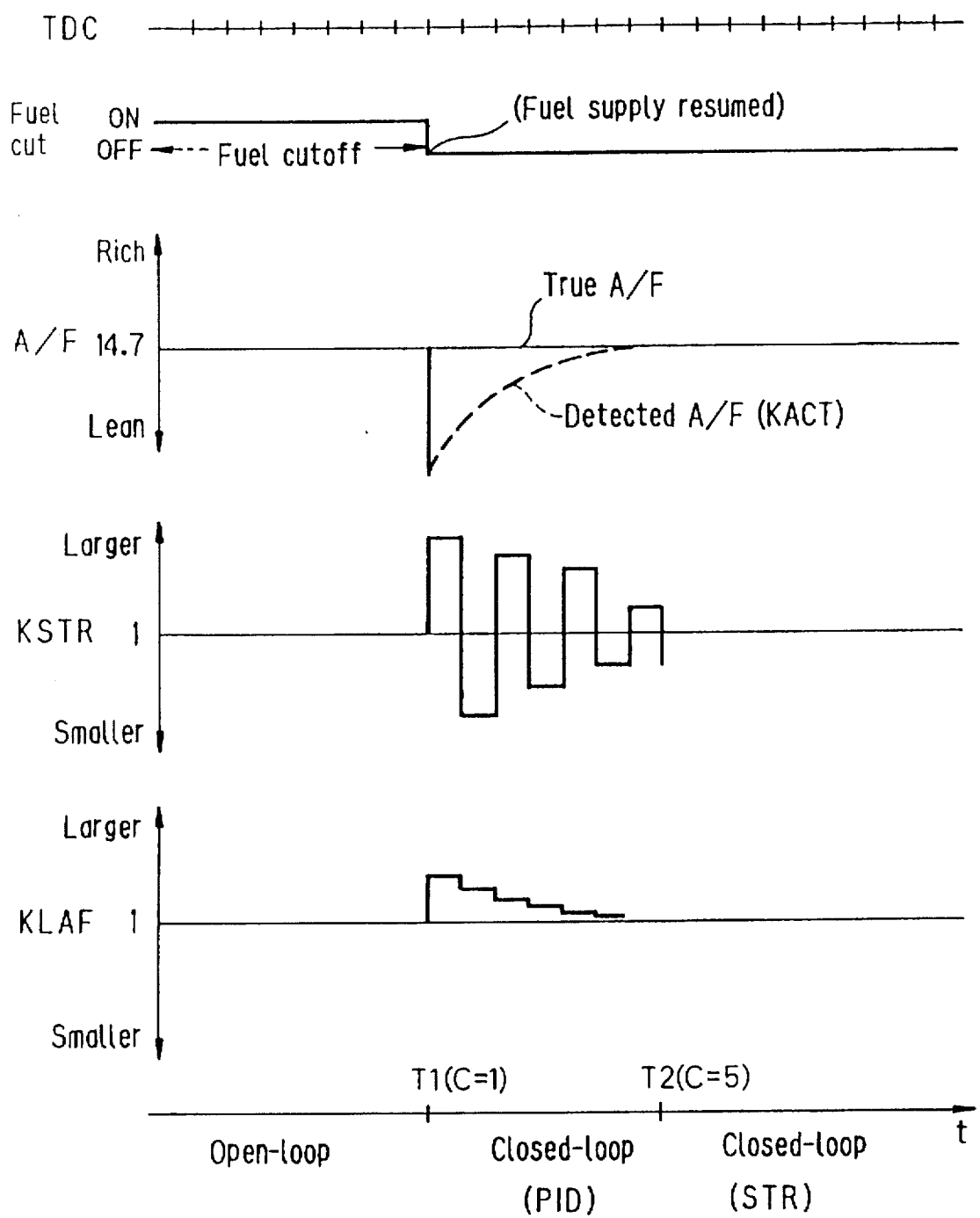
FIG. 48 is a timing chart showing the air/fuel ratio detection delay when fuel supply is resumed after cutoff.

When the feedback correction coefficient is determined using modern control law such as adaptive control law, however, as the control response is relatively high in such cases, it may under some engine operating conditions become unstable owing to controlled variable fluctuation or oscillation, degrading the stability of control. Further, the supply of fuel is shut off during cruising and certain other operating conditions and, as shown in FIG. 48, it is controlled in an open-loop (O/L) fashion during the fuel cutoff period.

Then when the fuel supply is resumed for obtaining a stoichiometric air/fuel ratio (14.7:1), for example, fuel is supplied based on the quantity of fuel injection determined in accordance with an empirically obtained characteristic. As a result, the true air/fuel ratio (A/F) jumps from the lean side to 14.7:1. However, a certain amount of time is required for the supplied fuel to be combusted and for the combusted gas to reach the air/fuel ratio sensor. In addition, the air/fuel ratio sensor has a detection delay time. Because of this, the detected air/fuel ratio is not always the same as the true air/fuel ratio but, as shown by the broken line in FIG. 48, involves a relatively large error.

At this time, as soon as the high-control-response feedback correction coefficient KSTR is determined based on an adaptive control law, the adaptive controller STR determines the feedback correction coefficient KSTR so as to immediately eliminate the error between the desired value and the detected value. As this difference is caused by the sensor detection delay and the like, however, the detected value does not indicate the true air/fuel ratio. Since the adaptive controller nevertheless absorbs the relatively large difference all at one time, KSTR fluctuates widely as shown in FIG. 48, thereby also causing the controlled variable to fluctuate or oscillate and degrading the control stability.

The occurrence of this problem is not limited to the time of resumption of fuel supply following cutoff. It also arises at the time of resuming feedback control following full-load enrichment and at resuming stoichiometric air/fuel ratio control following lean-burn control. It also occurs when switching from perturbation control in which the desired air/fuel ratio is deliberately fluctuated to control using a fixed desired air/fuel ratio. In other words, the problem arises whenever a large variation occurs in the desired air/fuel ratio.

It is therefore preferable to determine one feedback correction coefficient of high control response using a control law such as the adaptive control law and another feedback correction coefficient of low control response using a control law such as the PID control law (illustrated as KLAF in the figure) and to select one or the other of the feedback correction coefficients depending on the engine operating condition. Since the different types of control laws have different characteristics, however, a sharp difference in level may arise between the two correction coefficients. Because of this, switching between the correction coefficients is liable to destabilize the controlled variable and degrade the control stability The system according to the invention is configured such that the feedback correction coefficients different in control response are determined using an adaptive control law and a PID control law to be switched in response to the operating conditions of the engine and the switching between the feedback correction coefficients is smoothed, thereby improving fuel metering and air/fuel ratio control performance while ensuring control stability.

Figure 49:
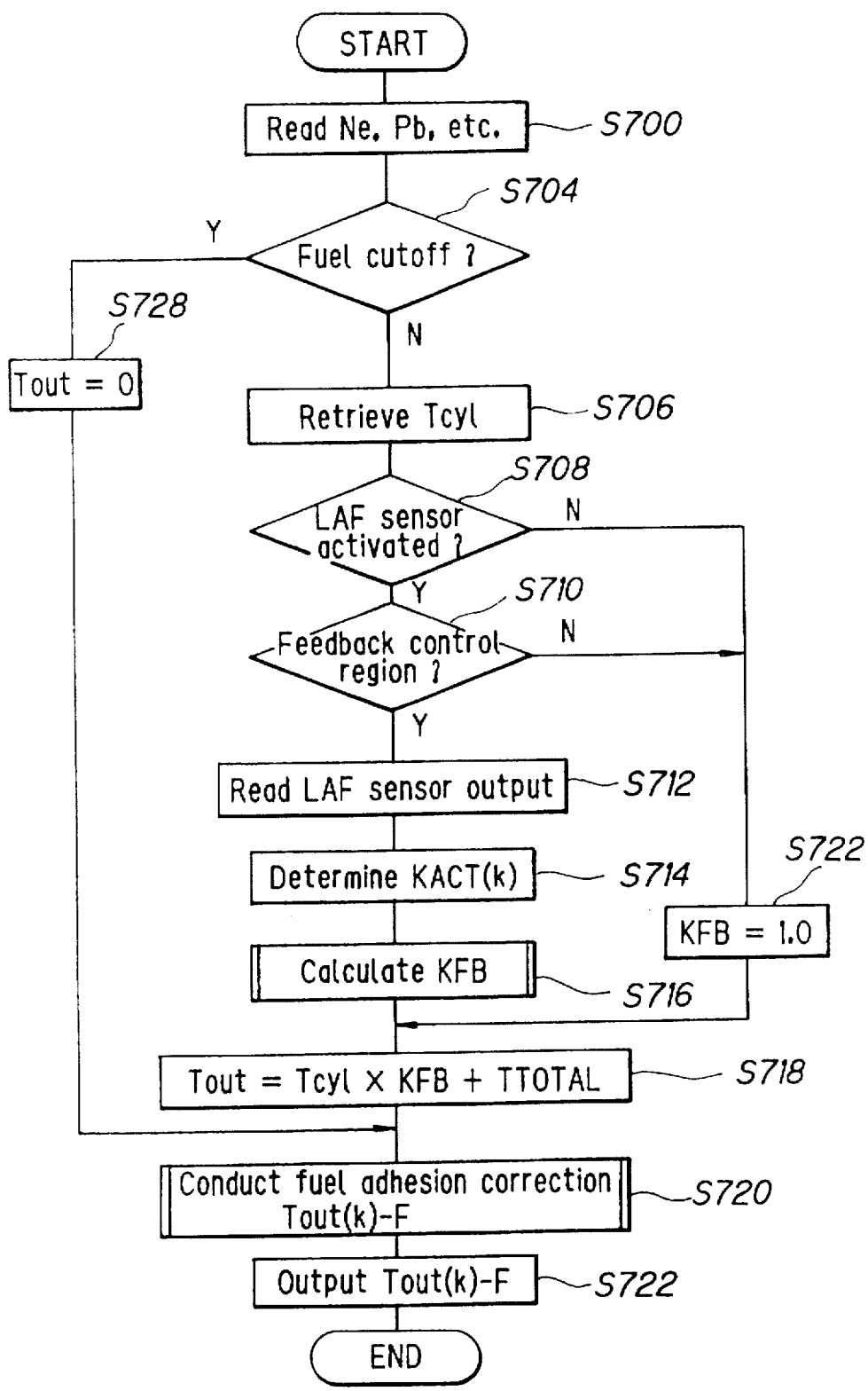
FIG. 49 is a flowchart showing the feedback correction coefficient referred to in the explanation of the configuration illustrated in FIG. 8.

FIG. 49 is a subroutine flowchart showing the determination or calculation of the feedback correction coefficients including KSTR.

For ease of understanding, the adaptive controller STR will first be explained with reference to FIG. 50. Specifically, the adaptive controller comprises a controller named STR (Self Tuning Regulator) and an adaptation mechanism (controller (system) parameter estimator).

As mentioned earlier, the required quantity of fuel injection Tcyl is determined on the basis of the basic quantity of fuel injection in the feedforward system and based on the value Tcyl, the output quantity of fuel injection Tout is determined as will be explained later and is supplied to the controlled plant (engine 10) through fuel injector 22. The desired air/fuel ratio KCMD and the controlled variable (detected air/fuel ratio) KACT (plant output y) are input to the STR controller that calculates the feedback correction coefficient KSTR using a recursion or recurrence formula. In other words, the STR controller receives the coefficient vector (controller parameters expressed as a vector) $\hat{\theta}$ adaptively estimated or identified by the adaptation mechanism and forms a feedback compensator.

One identification or adaptation law (algorithm) available for adaptive control is that proposed by I.D. Landau et al. The adaptive control system is nonlinear in characteristic so that a stability problem is inherent. In the adaptation law proposed by I.D. Landau et al, the stability of the adaptation law expressed in a recursion formula is ensured at least using Lyapunov's theory or Popov's hyperstability theory. This method is described in, for example, *Computrol* (Corona Publishing Co., Ltd.) No. 27, pp. 28–41; *Automatic Control Handbook* (Ohm Publishing Co., Ltd.) pp. 703–707; "A Survey of Model Reference Adaptive Techniques - Theory and Applications" by I.D. Landau in *Automatica*, Vol. 10, pp. 353–379; "Unification of Discrete Time Explicit Model Reference Adaptive Control Designs" by I.D. Landau et al. in *Automatica*, Vol. 17, No. 4, pp. 593–611; and "Combining Model Reference Adaptive Controllers and Stochastic Self-tuning Regulators" by I.D. Landau in *Automatica*, Vol. 18, No. 1, pp. 77–84.

The adaptation or identification algorithm of I. D. Landau et al. is used in the present system. In this adaptation or identification algorithm, when the polynomials of the denominator and numerator of the transfer function $B(Z^{-1})/A(Z^{-1})$ of the discrete controlled system are defined in the manner of Eq. 25 and Eq. 26 shown below, then the controller parameters or system (adaptive) parameters $\hat{\theta}(k)$ are made up of parameters (dynamic engine characteristic parameters) as shown in Eq. 27 and are expressed as a vector (transpose vector). And the input zeta (k) to the adaptation mechanism becomes that shown by Eq. 28. Here, there is taken as an example a plant in which m=1, n=1 and d=3, namely, the plant model is given in the form of a linear system with three control cycles of dead time.

$$A(z^{-1}) = 1 + a_1 z^{-1} + \ldots + a_n z^{-n} \qquad \text{Eq. 25}$$

$$B(z^{-1}) = b_0 + b_1 z^{-1} + \ldots + b_m z^{-m} \qquad \text{Eq. 26}$$

$$\begin{aligned}\hat{\theta}^T(k) &= [\hat{b}hd\,0(k), \hat{B}_R(z^{-1},k), \hat{S}(z^{-1},k)] \\ &= [\hat{b}_0(k), \hat{r}_1(k), \ldots, r_{m+d-1}(k), s_0(k), \ldots, s_{n-1}(k)] \\ &= [b_0(k), r_1(k), r_2(k), r_3(k), s_0(k)]\end{aligned} \qquad \text{Eq. 27}$$

$$\begin{aligned}\xi^T(k) &= [u(k), \ldots, u(k-m-d+1), y(k), \ldots, y(k-n+1)] \\ &= [u(k), u(k-1), u(k-2), u(k-3), y(k)]\end{aligned} \qquad \text{Eq. 28}$$

Here, the factors constituting the STR controller, i.e., the scalar quantity $\hat{b}_o^{-1}(k)$ that determines the gain, the control factor $\hat{B}_R(Z^{-1},k)$ that uses the manipulated variable and $\hat{S}(Z^{-1},k)$ that uses the controlled variable, all shown in Eq. 27, are expressed respectively as Eq. 29 to Eq. 31. In the equation, "m", "n" means the order of the numerator and denominator of the plant and "d" means the dead time. As mentioned above, there is taken as an example a plant in the form of a linear system with three control cycles of dead time.

$$b_0^{-1}(k) = 1/\,b_0 \qquad \text{Eq. 29}$$

$$\begin{aligned}B_R(Z^{-1},k) &= r_1 z^{-1} + r_2 z^{-2} + \ldots + r_{m+d-1} z^{-(m+d-1)} \\ &= r_1 z^{-1} + r_2 z^{-2} + r_3 z^{-3}\end{aligned} \qquad \text{Eq. 30}$$

$$\begin{aligned}S(Z^{-1},k) &= s_0 + s_1 z^{-1} + \ldots + s_{n-1} z^{-(n-1)} \\ &= s_0\end{aligned} \qquad \text{Eq. 31}$$

The adaptation mechanism estimates or identifies each coefficient of the scalar quantity and control factors and supplies to the STR controller.

The controller parameters, when expressing the coefficients in a group by a vector $\hat{\theta}$, is calculated by Eq. 32 below. In Eq. 32, $\Gamma$ (k) is a gain matrix (the (m+n+d)th order square matrix) that determines the estimation/identification rate or speed of the controller parameters $\hat{\theta}$, and e asterisk (k) is a signal indicating the generalized estimation/identification error, i.e., an estimation error signal of the controlled parameters. They are represented by recursion formulas such as those of Eqs. 33 and 34.

$$\hat{\theta}(k) = \hat{\theta}(k-1) + \Gamma(k-1)\xi(k-d)e^*(k) \qquad \text{Eq. 32}$$

-continued $$\Gamma(k) = \frac{1}{\lambda_1(k)} \left[ \Gamma(k-1) - \frac{\lambda_2(k)\Gamma(k-1)\xi(k-d)\xi^T(k-d)\Gamma(k-1)}{\lambda_1(k) + \lambda_2(k)\xi^T(k-d)\Gamma(k-1)\xi(k-d)} \right] \quad \text{Eq. 33}$$

$$e^*(k) = \frac{D(z^{-1})y(k) - \hat{\theta}^T(k-1)\xi(k-d)}{1 + \xi^T(k-d)\Gamma(k-1)\xi(k-d)} \quad \text{Eq. 34}$$

As mentioned before, the adaptation mechanism estimates or identifies each of the controller parameters (vector) $\hat{\theta}$ using the manipulated variable u(i) and the controlled variable y (j) of the plant (i,j includes past values) such that an error between the desired value and the controlled variable becomes zero.

Various specific algorithms are given depending on the selection of lambda 1 and lambda 2 in Eq. 33. lambda 1(k)=1, lambda 2(k)=lambda (0<lambda<2) gives the gradually-decreasing gain algorithm (least-squares method when lambda=1); and lambda 1(k)=lambda 1 (0<lambda 1<1), lambda 2(k)=lambda 2 (0<lambda 2<lambda) gives the variable-gain algorithm (weighted least-squares method when lambda 2=1). Further, defining lambda 1(k)/lambda 2(k)=σ and representing lambda 3 as in Eq. 35, the constant-trace algorithm is obtained by defining lambda 1(k)=lambda 3(k). Moreover, lambda 1(k)=1, lambda 2(k)=0 gives the constant-gain algorithm. As is clear from Eq. 33, in this case $\Gamma(k)=\Gamma(k-1)$, resulting in the constant value $\Gamma(k)=\Gamma$. Any of the algorithms are suitable for the time-varying plant such as the fuel metering control system according to the invention.

$$\lambda_3(k) = 1 - \frac{\|\Gamma(k-1)\xi(k-d)\|^2}{\sigma + \xi^T(k-d)\Gamma(k-1)\xi(k-d)} \cdot \frac{1}{tr\xi(0)} \quad \text{Eq. 35}$$

Thus, the adaptive controller (adaptive controller means) is a controller expressed in a recursion formula such that the dynamic behavior of the controlled object (engine) can be ensured. Specifically, it can be defined as the controller provided at its input with the adaptation mechanism (adaptation mechanism means), more precisely the adaptation mechanism, expressed in recursion formula.

The feedback correction coefficient KSTR(k) is specifically calculated as shown by Eq. 36:

$$KSTR(k) = \frac{KCMD(k-d') - s_0 \cdot y(k) - r_1 \times KSTR(k-1) - r_2 \times KSTR(k-2) - r_3 \times KSTR(k-3)}{b_0} \quad \text{Eq. 36}$$

The thus-obtained adaptive correction coefficient KSTR is multiplied by the required quantity of fuel injection as a feedback correction coefficient (general name of the coefficient KSTR and others determined by a PID control law) to determine the output quantity of fuel injection Tout which is then supplied to the controlled plant (engine). More specifically, the output quantity of fuel injection Tout is calculated as follows:

Tout=TiM-F×KCMDM×KFB×KTOTAL+TTOTAL

In the above, TTOTAL indicates the total value of the various corrections for atmospheric pressure, etc., conducted by addition terms (but does not include the injector dead time, etc., which is added separately at the time of outputting the output quantity of fuel injection Tout.)

Figure 50:
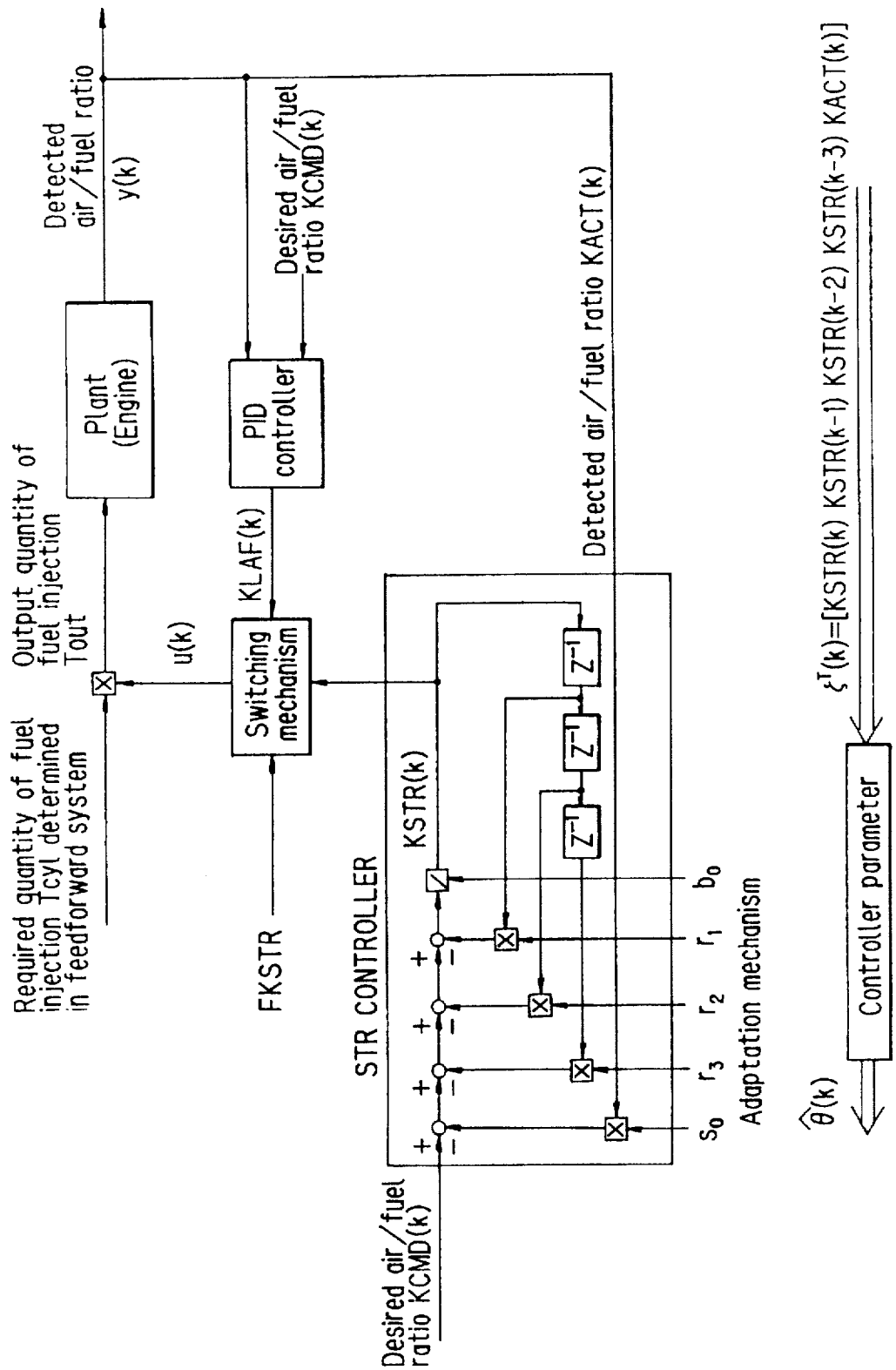
FIG. 50 is a block diagram explaining the calculation of FIG. 49.

What characterizes FIG. 50 (and FIG. 8) is, first, that the STR controller is placed outside the system for calculating the quantity of fuel injection (the aforesaid feedforward system), and not the quantity of fuel injection but the air/fuel ratio is defined as the desired value. In other words, the manipulated variable is indicated in terms of the quantity of fuel injection and the adaptation mechanism operates to determine the feedback correction coefficient KSTR so as to bring the air/fuel ratio produced as a result of fuel injection in the exhaust system to equal the desired value, thereby increasing robustness against disturbance. As this was described in the assignee's Japanese Patent Application No. Hei 6(1994)-66,594 (filed in the United States on Mar. 9, 1995 under the number of U.S. patent application Ser. No. 08/401,430), it will not be explained in detail here.

A second characteristic feature is that the manipulated variable is determined as the product of the feedback correction coefficient and the basic quantity of fuel injection. This results in a marked improvement in the control convergence. On the other hand, the configuration has the drawback that the controlled value tends to fluctuate when the manipulated variable is inappropriately determined. A third characteristic feature is that, a conventional PID controller is provided, in addition to the STR controller, to determine another feedback correction coefficient named KLAF based on the PID control law, and either one is selected by a switch as the final feedback correction coefficient KFB.

More specifically, the detected value KACT(k) and the desired value KCMD(k) are also input to the PID controller, which calculates the PID correction coefficient KLAF(k) based on the PID control law so as to eliminate the control error between the detected value at the exhaust system confluence point and the desired value. One or the other of the feedback correction coefficient KSTR, obtained by the adaptive control law, and the PID correction coefficient KLAF, obtained using the PID control law, is selected to be used in determining the fuel injection calculation quantity by a switching mechanism shown in the figure.

Next, the calculation of the PID correction coefficient will be explained.

First, the control error DKAF between the desired air/fuel ratio KCMD and the detected air/fuel ratio KACT is calculated as:

DKAF(k)=KCMD(k-d')-KACT(k).

In this equation, KCMD(k-d') is the desired air/fuel ratio (in which d' indicates the dead time before KCMD is reflected in KACT and thus signifies the desired air/fuel ratio before the dead time control cycle), and KACT(k) is the detected air/fuel ratio (in the current control (program) cycle).

Next, the control error DKAF(k) is multiplied by specific coefficients to obtain variables, i.e., the P (proportional) term KLAFP(k), I (integral) term KLAFI(k), and the D (differential or derivative) term KLAFD(k) as:

P term: KLAFP(k)=DKAF(k)×KP

I term: KLAFI(k)=KLAFI(k-1) +DKAF(k)×KI

D term: KLAFD(k)=(DKAF(k)−DKAF(k-1))×KD.

Thus: the P term is calculated by multiplying the error by the proportional gain KP; the I term is calculated by adding the value of KLAFI(k-1), the feedback correction coefficient in the preceding control cycle (k-1), to the product of the error and the integral gain KI; and, the D term is calculated by multiplying the difference between the value of DKAF (k), the error in the current control cycle (k), and the value of DKAF(k-1), the error in the preceding control cycle (k-1 ), by the differential gain KD. The gains KP, KI and KD are calculated based on the engine speed and the engine load. Specifically, they are retrieved from a map using the engine speed Ne and the manifold pressure Pb as address data.

Finally, KLAF(k), the value of the feedback correction coefficient according to the PID control law in the current control cycle, is calculated by summing the thus-obtained values:

$$KLAF(k)=KLAFP(k) +KLAFI(k) +KLAFD(k).$$

It should be noted that the offset of 1.0 is assumed to be included in the I term KLAFI(k) so that the feedback correction coefficient is a multiplication coefficient (namely, the I term KLAFI(k) is given an initial value of 1.0).

It should also be noted here that when the PID correction coefficient KLAF is selected for fuel injection quantity calculation, the STR controller holds the controller parameters such that the adaptive correction coefficient KSTR is 1.0 (initial value) or near one.

Based on the above, the determination or calculation of the feedback correction coefficient will be explained with reference to FIG. 49. The program is activated at every TDC.

In FIG. 49, the program starts at S700 in which the detected engine speed Ne and manifold pressure Pb, etc., are read, and proceeds to S704 in which a check is made as to whether the supply of fuel has been cut off. Fuel cutoff is implemented under specific engine operating conditions, such as when the throttle is fully closed and the engine speed is higher than a prescribed value, at which time the supply of fuel is stopped and open-loop control is effected.

When it is found in S704 that fuel cutoff is not implemented, the program proceeds to S706 in which it is determined whether activation of the LAF sensor 54 is complete. This is done by comparing the difference between the output voltage and the center voltage of the LAF sensor 54 with a prescribed value (1.0 V, for example) and determining that activation is complete when the difference is smaller than the prescribed value.

When S708 finds that activation is complete, the program goes to S710 in which it is checked whether the engine operating condition is in the feedback control region. This is conducted using a separate routine (not shown in the drawing). For example, when the engine operating condition has changed suddenly, such as during full-load enrichment, high engine speed, EGR or the like, fuel metering is controlled not in the closed-loop manner, but in an open-loop fashion.

When the result is affirmative, the program goes to S712 in which the output of the LAF sensor is read, to S714 in which the air/fuel ratio KACT(k) is determined or calculated from the output, and to S716 in which the feedback correction coefficient KFB (the general name for KSTR and KLAF) is calculated. As mentioned earlier, k is used to mean a discrete variable in the specification and the sample number in the discrete-time system.

Figure 51:
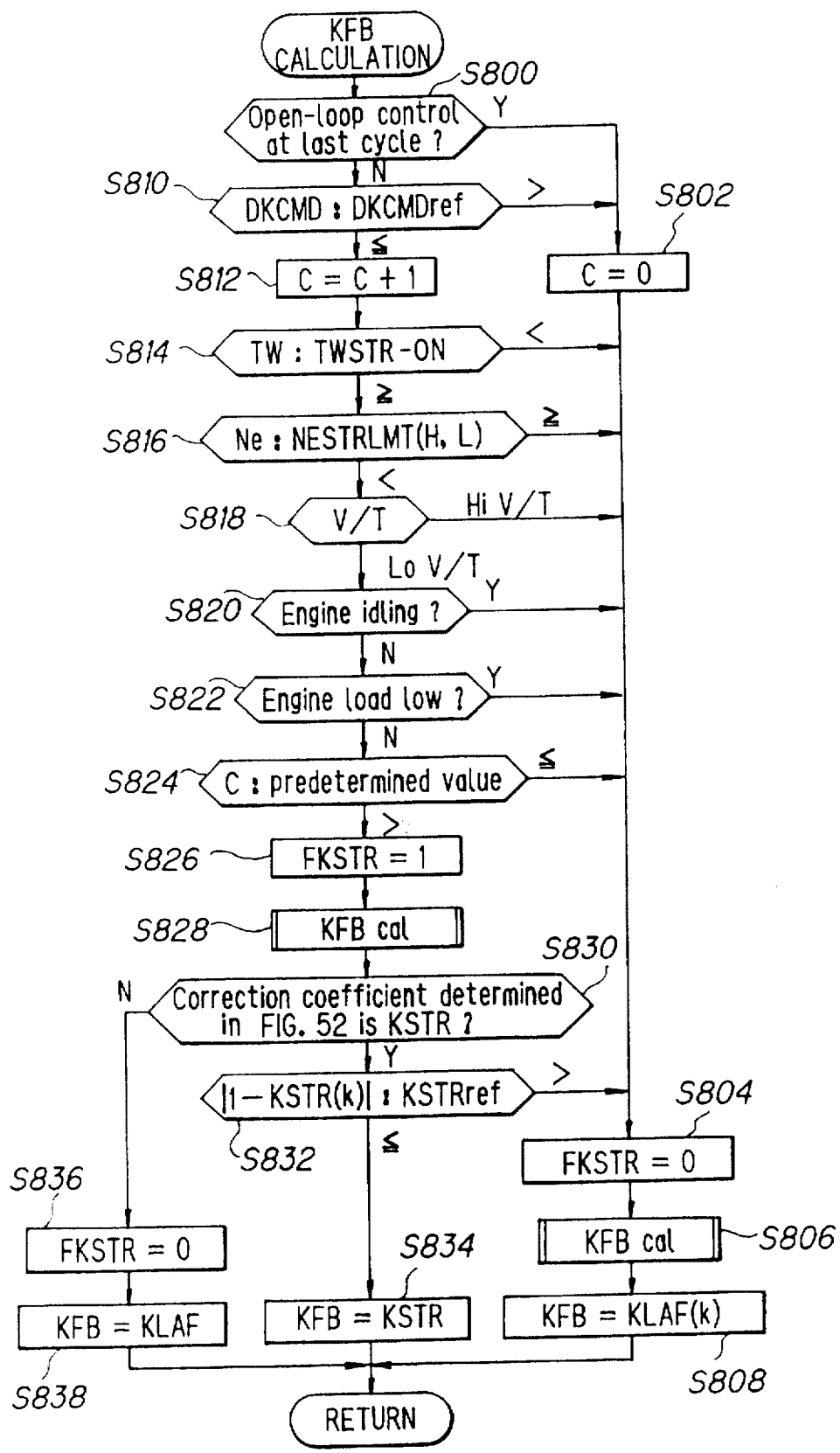
FIG. 51 is a subroutine flowchart of FIG. 49 showing the calculation of feedback correction coefficient more specifically.

The subroutine for this calculation is shown by the flowchart of FIG. 51.

First, in S800, it is checked whether openloop control was in effect during the preceding cycle (during the last control (calculation) cycle, namely, at the preceding routine activation time). When open-loop control was in effect during fuel cutoff or the like in the preceding cycle, the result in S800 is affirmative. In this case, a counter value C is reset to 0 in S102, the bit of a flag FKSTR is reset to 0 in S804, and the feedback correction coefficient KFB is calculated in S106. The resetting of the bit of flag FKSTR to 0 in S804 indicates that the feedback correction coefficient is to be determined by the PID control law. Further, as explained hereafter, setting the bit of the flag FKSTR to 1 indicates that the feedback correction coefficient is to be determined by the adaptive control law.

Figure 52:
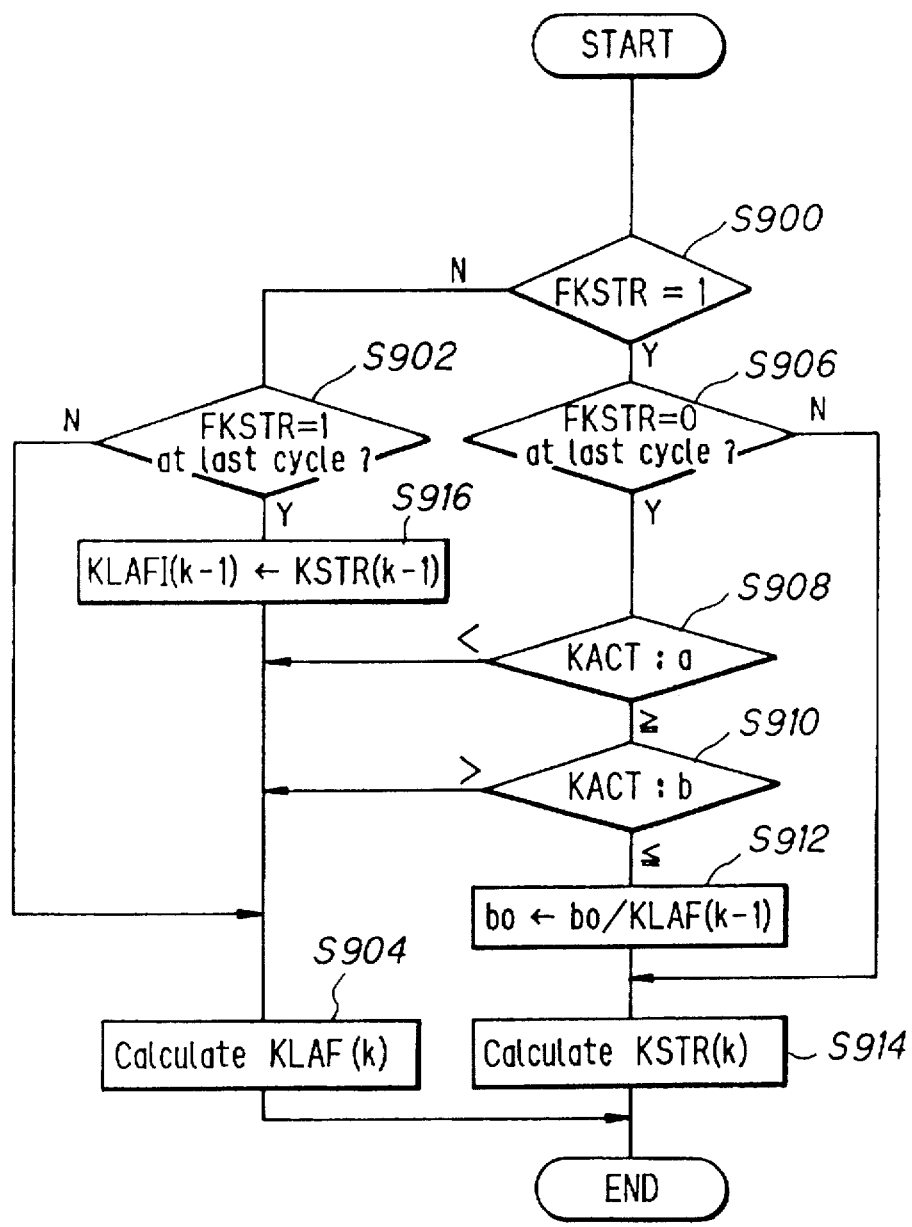
FIG. 52 is a subroutine flowchart similar to FIG. 51.

A subroutine showing the specific procedures for calculating the feedback correction coefficient KFB is shown by the flowchart of FIG. 52. In S900, it is checked whether the bit of flag FKSTR is set to 1, i.e., as to whether or not the operating condition is in the STR (controller) operation region. Since this flag was reset to 0 in S804 of the subroutine of FIG. 51, the result in this step is NO and it is checked in S902 whether the bit of flag FKSTR was set to 1 in the preceding control cycle, i.e., as to whether or not the operating condition was in the STR (controller) operation region in the preceding cycle.

Since the result here is naturally NO, the program moves to S904 where PID correction coefficient KLAF(k) is calculated by the PID controller based on PID control law in the manner described earlier. More precisely, the PID correction coefficient KLAF(k) calculated by the PID controller is selected. Returning to the subroutine of FIG. 51, KFB is set to KLAF(k) in S808.

In the subroutine of FIG. 51, when it is found in S800 that open-loop control was not in effect in the preceding control cycle, i.e., that feedback control was resumed following open-loop control, the difference DKCMD between KCMD (k-1), the value of the desired value in the preceding control cycle, and the value of KCMD(k), the desired value in the current control cycle, is calculated and compared with a reference value DKCMDref in S810. When the difference DKCMD is found to exceed the reference value DKCMDref, the PID correction coefficient is calculated by PID control law in S802 and the following steps.

This is because when the change in the desired air/fuel ratio is large, a situation similar to that when fuel cutoff is resumed arises. Specifically, the detected value probably does not indicate the true value owing to air/fuel ratio detection delay and the like, so that, similarly, the controlled variable may become unstable. A large change occurs in the desired equivalent ratio, for example, when normal fuel supply is resumed following full-load enrichment, when stoichiometric air/fuel ratio control is resumed following lean-burn control (at an air/fuel ratio of 20:1 or leaner, for example), and when stoichiometric air/fuel ratio control using a fixed desired air/fuel ratio is resumed following perturbation control in which the desired air/fuel ratio is fluctuated.

On the other hand, when S810 finds the difference DKCMD to be equal to or smaller than reference value DKCMDref, the counter value C is incremented in S812, it is checked in S814 whether the engine coolant temperature Tw is less than a prescribed value TWSTR.ON. The prescribed value TWSTR.ON is set at a relatively low coolant temperature and when the detected engine coolant temperature TW is below the prescribed value TWSTRON, the program proceeds to S804 in which the PID correction coefficient is calculated by PID control law. The reason for this is that the combustion is unstable at low coolant temperatures, making it impossible to obtain a stable detection of the value KACT owing to misfiring and the like. Although not shown, for the same reason, the same will be applied when the coolant temperature is abnormally high.

If S814 finds that the engine coolant temperature TW is not lower than the prescribed value TWSTRON, the program advances to S816 in which it is checked whether the detected engine speed Ne is at or above a prescribed value NESTRLMT. The prescribed value NESTRLMT is set at a relatively high engine speed. When S816 finds that the detected engine speed Ne is at or above the prescribed value NESTRLMT, the program goes to S804 in which the PID correction coefficient is calculated. This is because during high-speed engine operation there tends to be insufficient time for calculation and, moreover, combustion is unstable.

When S816 finds that the detected engine speed Ne is lower than the prescribed value NESTRLMT, the program proceeds to S818 in which a check is made which valve timing is selected in the variable valve timing mechanism. If HiV/T, the program proceeds to S804 where the PID correction coefficient is calculated. This is because the large amount of valve timing overlap present when the high-engine-speed side valve timing characteristic has been selected is apt to cause intake air blowby (escape of intake air through the exhaust valve), in which case the detected value KACT is not likely to be stable. In addition, the detection delay of the LAF sensor cannot be ignored during high-speed operation.

When S818 finds that LoV/T has been selected (this includes the condition in which one of two intake valves is being rested), the program goes to S820 in which it is checked whether the engine is idling. If the result is YES, the program goes to S804 in which the PID correction coefficient is calculated. This is because the generally stable operating condition during idling obviates the need for a high gain such as that according to the adaptive control law. Further, the aforesaid electric air control valve (EACV) 53 is regulated to control the quantity of intake air. There is the possibility that the intake air control and the subject fuel metering control, if conducted, would conflict with each other. This is another reason why the gain is set to low using the PID correction coefficient.

When S820 finds that the engine is not idling, the program proceeds to S822 in which it is judged whether the engine load is low. When the result is YES, the program goes to S804 in which the PID correction coefficient is calculated. This is because combustion is not stable in the low engine load region.

When S822 finds that the engine load is not low, the counter value C is compared with a predetermined value, 5 for example, in S824. So long as the counter value C is found to be at or below the predetermined value, the PID correction coefficient KLAF(k) calculated by PID control law is selected through the procedures of S804, S806, S900, S902 (S916), S904 and S908.

In other words, during the period from time T1 at which fuel cutoff is discontinued in FIG. 48 and feedback control is resumed following open-loop control (when C=1, as mentioned in connection with FIG. 51) to time T2 (counter value C=5), the feedback correction coefficient is set to the value KLAF determined by the PID controller using PID control law. Unlike the feedback correction coefficient KSTR determined by the STR controller, the PID correction coefficient KLAF according to PID control law does not absorb the control error DKAF between the desired value and the detected value all at one time but exhibits a relatively gradual absorption characteristic.

Thus, even when, as in FIG. 48, a relatively large difference arises owing to the delay up to completion of combustion of fuel after resuming fuel supply and the LAF sensor detection delay, the correction coefficient does not become unstable as in the case of the STR controller and, therefore, does not cause instability of the controlled variable (plant output). The predetermined value is set to 5 (i.e., 5 control cycles or TDCs (TDC: Top Dead Center)) in this embodiment because this period is considered sufficient for absorbing the combustion delay and detection delay. Alternatively, the period (predetermined value) can be determined from the engine speed, engine load and other such factors affecting the exhaust gas transport delay parameters. For instance, the predetermined value can be set small when the engine speed and manifold pressure produce a small exhaust gas transport delay parameter and be set large when they produce a large exhaust gas transport delay parameter.

Next, when S824 in the subroutine of FIG. 51 finds that counter value C exceeds the prescribed value, namely, is 6 or larger, the bit of the flag FKSTR is set to 1 in S826 and the feedback correction coefficient KFB is calculated according to the subroutine of FIG. 52 in S828. In this case, the result of the check in S900 of the subroutine of FIG. 52 becomes YES and a check is made in S906 as to whether or not the bit of flag FKSTR was reset to 0 in the preceding control cycle, i.e., whether or not the operating condition was in the PID operation region in the preceding cycle.

When this is the first time that the counter value exceeded the predetermined value, the result of this check is YES, in which case the detected value KACT(k) is compared with a lower limit value a, e.g., 0.95, in S908. If the detected value is found to be equal to or greater than the lower limit value, the detected value is compared with an upper limit value b of, say, 1.05 in S910. When it is found to be equal to or smaller than the upper limit value, the program advances through S912 (explained later) to S914, where the adaptive correction coefficient KSTR(k) is calculated using the STR controller.

In other words, when S908 finds that the detected value is below the lower limit value a or S910 finds that the detected value exceeds the upper limit value b, the program goes to S904 where the feedback correction coefficient is calculated based on PID control. In other words, a switch is made from PID control to STR (adaptive) control when the engine operating condition is in the STR controller operation region and the detected value KACT is 1 or in the vicinity thereof. This enables the switch from PID control to STR (adaptive) control to be made smoothly and prevents fluctuation of the controlled variable.

When S910 finds that the detected air/fuel ratio KACT(k) is at or below the upper limit value b, the program moves to S912 where, as shown, the aforesaid scalar quantity $b_0$, the value determining the gain of the STR controller, is set to or replaced with the value obtained by dividing the same by KLAF(k-1), the value of the PID correction coefficient by PID control in the preceding control cycle, whereafter the feedback correction coefficient KSTR(k) determined by the STR controller is calculated in S914.

In other words, the STR controller basically calculates the feedback correction coefficient KSTR(k) in accordance with Eq. 36 as explained earlier. When the result in S906 is affirmative and the program moves to S908 and the succeeding steps, however, this means that the feedback correction coefficient was determined based on PID control in the preceding control cycle. As was explained earlier with reference to the configuration of FIG. 50, moreover, the feedback correction coefficient KSTR is fixed at 1 and the STR controller operation is kept discontinued when feedback correction coefficient is determined by PID control. Saying this in other words, the vector $\hat{\theta}$ of the controller parameters to be used in the STR controller is determined such that KSTR=1.0. When determination of the feedback correction coefficient KSTR by the STR controller is resumed, therefore, the controlled variable becomes unstable when the value of KSTR deviates greatly from 1, rendering the controlled variable unstable.

In light of this, the scalar quantity $b_0$ (in the controller parameters that are held by the STR controller such that the adaptive correction coefficient KSTR is fixed at 1.0 (initial value) or thereabout) is divided by the value of the feedback correction coefficient by PID control in the preceding control cycle. Thus, as can be seen from Eq. 37, since the first term is 1, the value of the second term KLAF(k-1) becomes the correction coefficient KSTR(k) of the current control cycle, provided that the controller parameters are held such that KSTR=1.0 as just mentioned:

$$KSTR(k) = \left[ \frac{KCMD(k-d') - s_0 xy(k) - r_1 \times KSTR(k-1) - r_2 \times KSTR(k-2) - r_3 \times KSTR(k-3)}{b_0} \right] \times \quad \text{Eq. 37}$$

$$KLAF(k-1) = 1 \times KLAF(k-1) = KLAF(k-1)$$

As a result, the detected value KACT is 1 or near 1 in S908 and S910 and, in addition, the switch from PID control to STR control can be made smoothly.

In the subroutine of FIG. 52, when S902 finds that the engine operating condition was in the STR (controller) operation region in the preceding control cycle, the value of KSTR(k-1), the adaptive correction coefficient in the preceding control cycle, is set to or replaced with the value of KLAFI(k-1), the I term of the PID correction coefficient in the preceding cycle, in S916. As a result, when KLAF(k) is calculated in S904, the I term KLAFI thereof becomes:

$$KLAFI(k) = KSTR(k-1) + DKAF(k) \times KI$$

and the calculated I term is added to the P term and the D term to obtain KLAF(k).

This method is adopted because of the rapid change which may occur in the integral term when the feedback correction coefficient is calculated following a switch from adaptive control to PID control. By using the value of KSTR to determine the initial value of the PID correction coefficient in the foregoing manner, the difference between the correction coefficient KSTR(k-1) and the correction coefficient KLAF(k) can be kept small. At the time of switching from STR control to PID control, therefore, the difference in the gain of the feedback correction coefficient can be kept small and the transition can be made smoothly and continuously, thereby preventing sudden change in the controlled variable.

When S900 in the subroutine of FIG. 52 finds that the engine operating condition is in the STR (controller) operation region and S906 finds that the operating condition was not in the PID operation region in the preceding control cycle either, the feedback correction coefficient KSTR(k) is calculated based on the STR controller in S914. This calculation is made in accordance with Eq. 36 as explained earlier.

Next, in S830 of the subroutine of FIG. 51, it is checked whether the correction coefficient calculated by the subroutine of FIG. 52 is KSTR, and when it is, the difference between 1.0 and KSTR(k) is calculated and its absolute value is compared with a threshold value KSTRref in S832.

Figure 53:
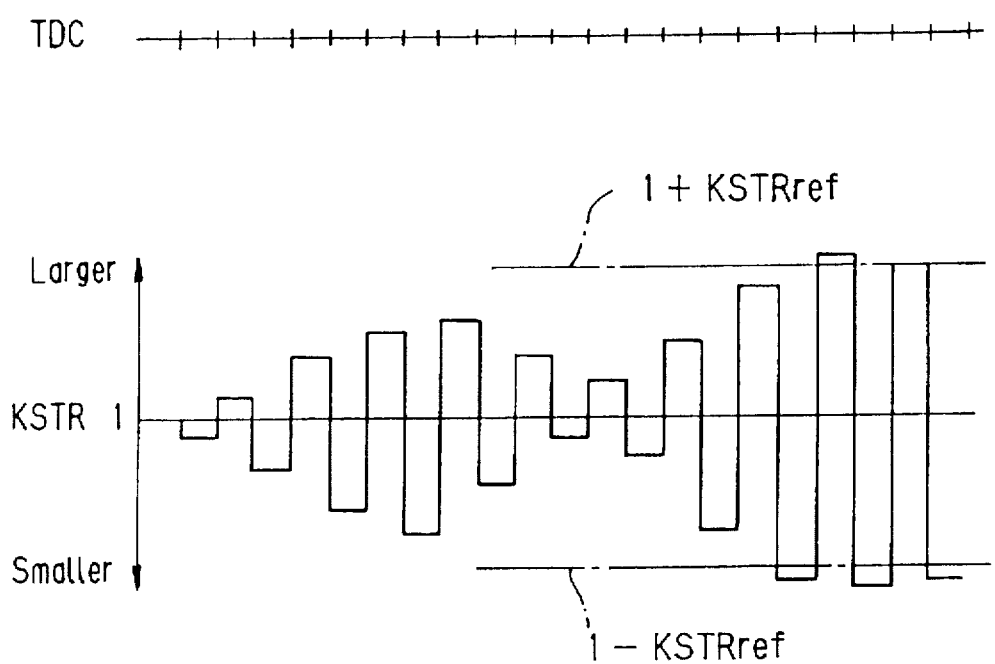
FIG. 53 is a timing chart explaining the calculation of FIG. 51.

This is in part related to what was said in the earlier explanation. Wild fluctuation of the feedback correction coefficient causes sudden changes in the controlled variable and degrades control stability. The absolute value of the difference between 1.0 and the feedback correction coefficient is therefore compared with a threshold value and when it exceeds the threshold value a new feedback correction coefficient is determined based on PID control in S804 and the following steps. As a result, the controlled variable does not change suddenly and stable control can be realized. Here, it is alternatively possible to compare the coefficient, instead of the absolute value, with two threshold values by the magnitude making 1.0 as its center. This is illustrated in FIG. 53.

When S832 finds that the absolute value of the difference between 1.0 and the calculated feedback correction coefficient KSTR(k) does not exceed the threshold value, the value determined by the STR controller is set as the feedback correction coefficient KFB in S834. When the result in S830 is NO, the bit of the flag FKSTR is reset to 0 in S836 and the value determined by the PID controller is set as the feedback correction coefficient KFB in S838.

Next, in S718 of the routine of FIG. 49, the required quantity of fuel injection Tcyl is multiplied by the calculated feedback correction coefficient KFB, etc., and the addition term TTOTAL is added to the result to obtain the output quantity of fuel injection Tout. The program next proceeds to S720 in which fuel adhesion correction will be conducted (explained later) and to S722 in which the corrected output quantity of fuel injection Tout is output to the fuel injector 22 via the drive circuit 72 as the manipulated variable.

When S704 finds that the fuel cutoff is in progress, the output quantity of fuel injection Tout is set to zero in S728. When the result is negative in S708 or S710, since this means the control is conducted in open-loop fashion, the program goes to S722 in which KFB is set to 1.0, to S718 in which Tout is calculated. When the result in S704 is affirmative, open-loop control is conducted and Tout is set to a predetermined value at S728.

In the above, when open-loop control is discontinued and feedback control is resumed, as in the case where the supply of fuel is resumed after once being cut off, the feedback correction coefficient is determined based on PID control law for a predetermined period. As a result, the feedback correction coefficient determined by the STR controller is not used during periods when the difference between the detected air/fuel ratio and the true air/fuel ratio is large owing to the time required for the supplied fuel to be combusted and to the detection delay of the sensor itself. The controlled variable (detected value) therefore does not become unstable and degrade the stability of the control.

On the other hand, since a predetermined value is set during this period, the control convergence can be improved after the detected value has stabilized by using the adaptive correction coefficient determined by the STR controller for operating the system so as to absorb the control error all at one time. A particularly notable feature of the embodiment is that an optimal balance is achieved between control stability and control convergence owing to the fact that the control convergence is improved by determining the manipulated variable as the product of the feedback correction coefficient and the manipulated variable.

It should be noted here that, since the detected air/fuel ratio is not stable immediately after the LAF sensor is activated, the feedback correction coefficient may be determined using the PID control law for a predetermined period after LAF sensor activation is completed.

When fluctuation of the desired air/fuel ratio is large, moreover, the feedback correction coefficient is determined based on PID control even after the passage of the predetermined period so that an optimal balance between control stability and convergence is achieved when feedback control is resumed following open loop control as at the time of discontinuing fuel cutoff, full-load enrichment or the like.

Since the feedback control coefficient is determined by PID control law when the adaptive control coefficient determined by the STR controller becomes unstable, moreover, an even better balance between control stability and convergence is achieved.

Further, in switching from STR control to PID control the I term of KLAF is calculated using the feedback correction coefficient determined by the STR controller, while in resuming STR control following PID control a time at which the detected value KACT is 1 or near one is selected and the initial value of the feedback correction coefficient by the adaptive control law (STR controller) is set approximately equal to the PID correction coefficient by PID control law. In other words, the system ensures smooth transition back and forth between PID control and adaptive control. Since the manipulated variable therefore does not change suddenly, the controlled variable does not become unstable.

In addition, since the feedback correction coefficient is determined based on the PID control law during engine idling, no conflict occurs between the fuel metering feedback control and the intake air quantity control conducted during engine idling.

Fuel adhesion correction of the output quantity of fuel injection Tout will now be explained. The fuel adhesion correction is conducted for each cylinder value as mentioned earlier and the values for the individual cylinders are identified by assigning a cylinder number n (n=1,2,3,4).

In the configuration illustrated, before the fuel adhesion plant, a fuel adhesion correction compensator is inserted in series that has a transfer function inverse to that of the plant. The fuel adhesion correction parameter are retrieved from mapped data that are prepared in advance corresponding to engine operating conditions such as coolant temperature Tw, engine speed Ne, manifold pressure Pb, etc.

When the retrieved parameters and actual parameters of the engine are identical, the product of the transfer functions of the plant and the compensator will be 1.0, meaning that the desired quantity of fuel injection=actual quantity of cylinder-intake fuel and that the correction is perfect.

Figure 54:
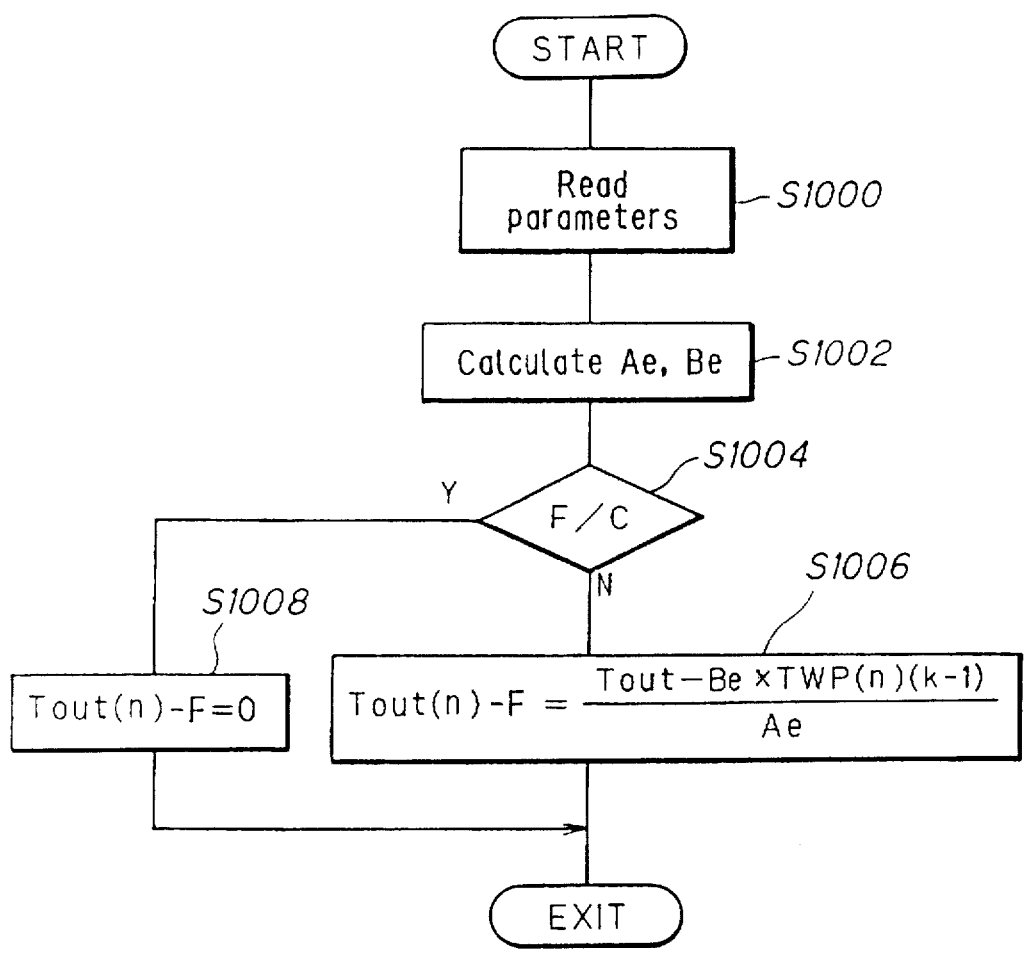
FIG. 54 is a subroutine flowchart of FIG. 49 showing the fuel adhesion correction of the output quantity of fuel injection.

Based on the foregoing, the fuel adhesion correction of the output quantity of fuel injection Tout in S720 of the FIG. 49 flowchart, is explained with reference to a subroutine flowchart shown in FIG. 54. The program shown in FIG. 54 is activated at a crank angular position synchronized in every TDC and is looped until the values Tout(n) have been determined for all cylinders. The suffix (k-1) means a value calculated at the last control cycle (last program loop). The value calculated at the current control cycle (current program loop) is omitted from being affixed with (k).

The program starts at S1000 in which the various parameters are read and proceeds to S1002 in which a direct ratio A and a take-off ratio B are determined. This is conducted by retrieval from mapped data (whose characteristics are shown in FIG. 55) using the detected engine speed Ne and manifold pressure Pb as address data. It should be note that the mapped data are established separately for the Hi V/T and Lo V/T characteristics of the variable valve timing characteristics and the retrieval is conducted by selecting either of the mapped data corresponding to the valve timing characteristics currently selected. At the same time, a table (whose characteristic is illustrated in FIG. 56) is looked up using the detected coolant temperature as an address datum to retrieve a correction coefficient KATW and KBTW.

The ratios A, B are multiplied by the coefficient KATW and KBTW and are corrected. Similarly, other correction coefficients KA, KB are determined in response to the presence/absence of the EGR and canister purging operation and the desired air/fuel ratio KCMD, although the determination is not illustrated in the figure. Specifically, naming the ratios corrected as Ae, Be, they are corrected as follows:

$$Ae = A \times KATW \times KA$$

$$Be = B \times KBTW \times KB$$

The program proceeds to S1004 in which it is determined whether fuel supply is cut off and when the result is negative, to S1006 in which the output quantity of fuel injection Tout is corrected in the manner as illustrated to determine the output quantity of fuel injection for the individual cylinders Tout(n)-F. When the result at S1104 is affirmative, the program proceeds to S1008 in which the value Tout(n)-F is made zero. Here, the value TWP(n) illustrated means the quantity of fuel adhered to the wall of the intake pipe 12.

Figure 57:
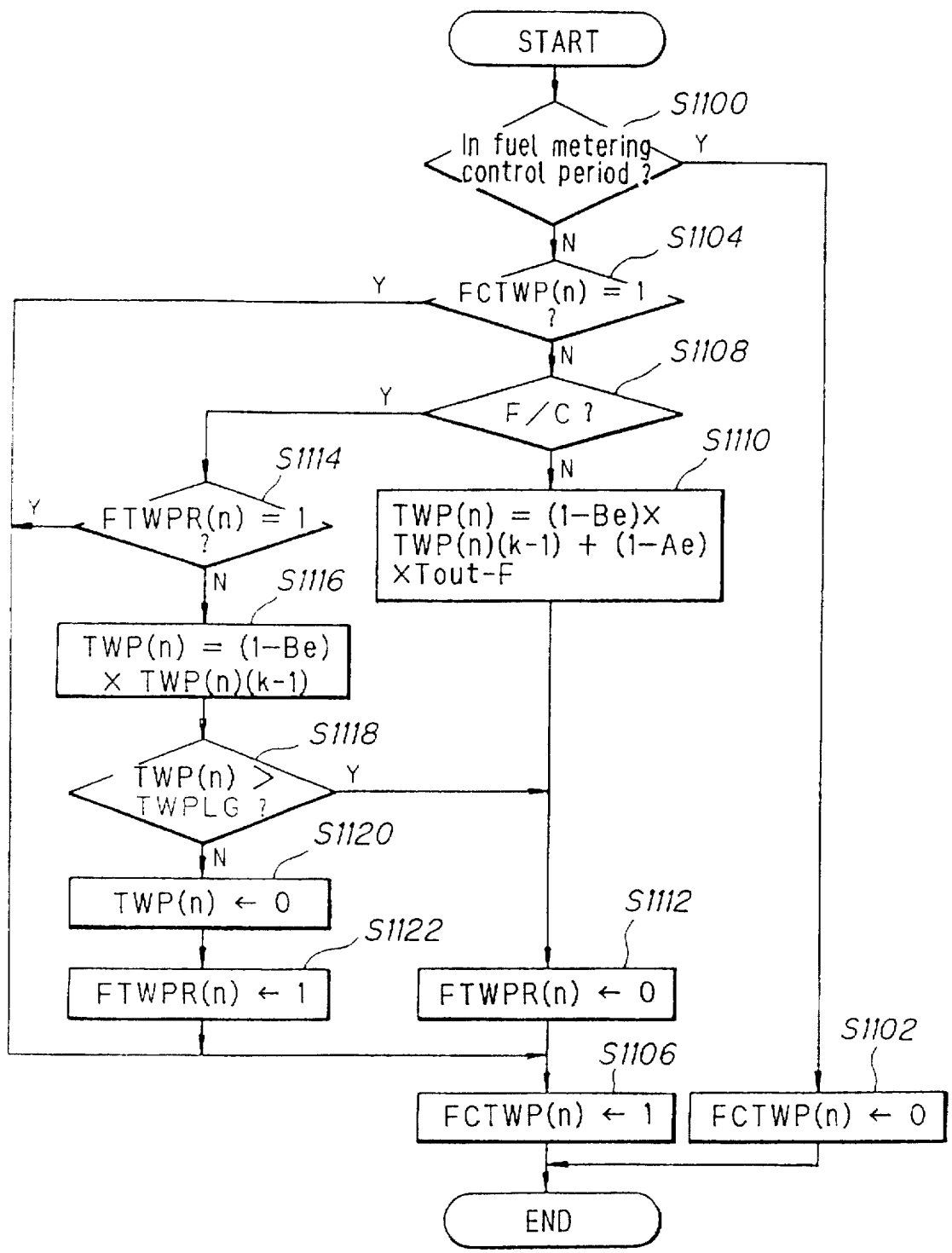
FIG. 57 is a subroutine flowchart of FIG. 54.

FIG. 57 is a subroutine flowchart for determining or calculating the value TWP(n). The program illustrated is activated at a predetermined crank angular position.

The program starts at S1100 in which it is determined whether the current program loop is within a period starting at a time when the Tout calculation begins and ending at a time when fuel injection at any cylinder ceases. The period is hereinafter referred to as "fuel metering control period". When the result is affirmative, the program proceeds to S1102 in which the bit of a first flag FCTWP(n) indicating the termination of the TWP(n)calculation for the cylinder n is set to 0 to permit the calculation and the program is immediately terminated.

When the result at S1100 is negative, the program proceeds to S1104 in which it is confirmed whether the bit of the flag FCTWP(n) is 1 and when affirmative, since this means that the value TWP(n) for the cylinder concerned has finished, the program goes to S1106. On the other hand, when the result is negative, the program goes to S1108 in which it is determined whether fuel supply is cut off. If the answer at S1108 is NO, the program goes to S1110 in which the value TWP(n) is calculated in the manner illustrated.

Here, the value TWP(k-1) is a value calculated at the last control cycle. The first term in the right of the equation means the quantity of fuel that adhered to the wall at the last injection and still remains there without being taken off, and the second term thereof means the quantity of fuel that adheres to the wall at the current injection.

The program then proceeds to S1112 in which the bit of a flag TTWPR(n) (indicating that the quantity of fuel adhesion is zero) is set to zero, to S1106 in which the bit of the first flag FCTWP(n) is set to 1 and then the program is terminated.

When S1108 finds that the supply of fuel is cut off, the program goes to S1114 in which it is determined whether the bit of the second flag FTWPR(n) (indicating that the remaining quantity of fuel adhesion is zero) is 1, and when affirmative, to S1106 since TWP(n)=0. If the result at S1114 is negative, the program goes to S1116 in which the value TWP(n) is calculated according to the equation illustrated. The equation corresponds to that shown at S1110 except for the fact that the right second term is deleted. This is because, since fuel supply is cut off, no fuel adhesion occurs.

The program then proceeds to S1118 in which it is determined whether the value TWP(n) is greater than a predetermined small value TWPLG, and then to S1112 when affirmative. If negative, since this means that the remaining quantity of fuel adhesion is small enough to be ignored, the program goes to S1120 in which the value is set to zero, to S1122 in which the bit of the second flag is set to 1, and then to S1106.

With the arrangement, it becomes possible to accurately determine the quantity of fuel adhered to the intake manifold wall for the individual cylinders (the value TWP(n)) and by using the value in determining the output quantity of fuel injection Tout in the configuration shown in FIG. 54, it becomes possible to supply the optimum quantity of fuel to the individual cylinder combustion chambers, taking into account the quantity of fuel remaining on the intake manifold wall and that taken therefrom. It should be noted that the foregoing adhesion correction including the calculation of the ratios A, B is conducted when the engine is starting. Also the foregoing description should be applied irrespective of whether the fuel injection is made for the individual cylinders at the same time or is made sequentially in the firing order.

It should be noted in the foregoing that in the configuration shown in FIG. 8, it is alternatively possible to provide a third catalytic converter 94 as illustrated in a block 400 depicted by dashed lines. The third catalyst 94 is preferably a so-called "light-off" catalyzer that stimulates the activation of the catalysts in a shorter period, for example, one that is a so-called "electrically heated catalyzer" having a heater to promote activation. In that sense, the volume of the third catalyst should be sufficiently smaller than the catalysts installed downstream thereof.

The third catalyst 94 may be a three-way catalyst similarly to the others. The third catalyst 94 may be provided when desired. However, when the engine is a V-type engine and the fuel metering control system according to the invention is constituted (for each bank of the V-type engine), the provision of the third catalyst 94 will be effective, since the volume or amount of the exhaust gas at each bank will be relatively small. The provision of the third catalyst would affect the dead time in the system and as a result, the controlled variable, etc., will be different.

It should be noted in the foregoing that in the configuration shown in FIG. 8, it is alternatively possible to provide a filter 96 before the observer as illustrated by phantom lines. The detection response lag of the LAF sensor is adjusted by the observer calculation as mentioned before, and the lag can alternatively be adjusted in a hardware manner by providing such a filter 96 as is capable of compensating the first order lag.

It should also be noted that in the configuration disclosed in the FIG. 8 block diagram, not all of the elements are indispensable. Rather, one or some of the elements can be deleted.

Figure 58:
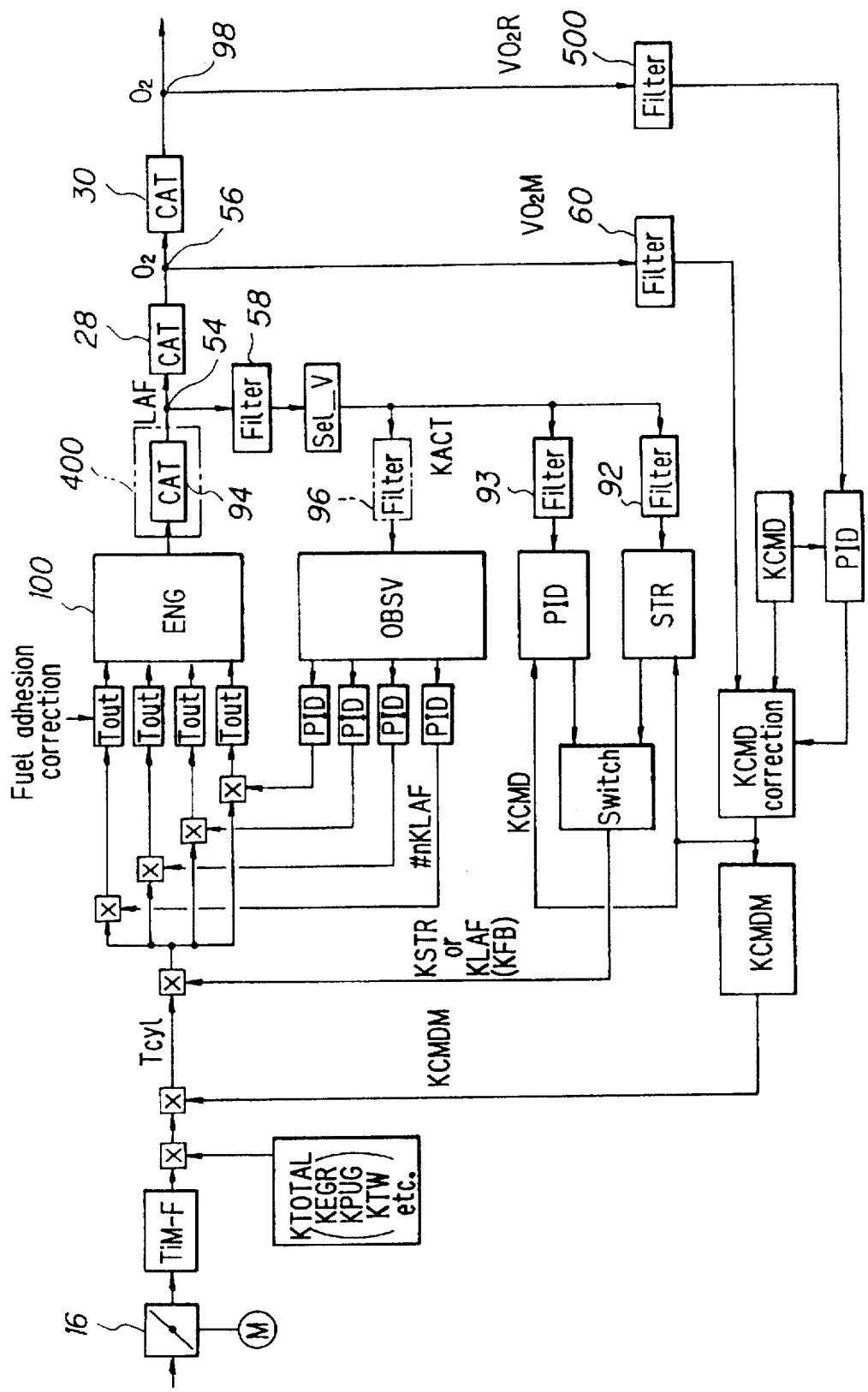
FIG. 58 is a view, similar to FIG. 8, but showing the configuration of the system according to the second embodiment of the invention.

FIG. 58 is a block diagram, similar to FIG. 8, but showing the configuration of the system according to a second embodiment of the invention.

In the second embodiment, a second $O_2$ sensor 98 is installed downstream of the second catalytic converter 30. Outputs of the second $O_2$ sensor 98 are used to correct the desired air/fuel ratio KCMD as illustrated. The desired air/fuel ratio KCMD can therefore be determined more optimally, enhancing control performance. Since the air/fuel ratio of the exhaust gas that will finally be emitted to the air is detected, emission efficiency will be improved. The configuration also makes it possible to monitor whether the catalysts positioned upstream of the $O_2$ sensor 98 degrade.

The second $O_2$ sensor 98 may be used as a substitute for the first $O_2$ sensor 56. The second catalytic converter 30 may have the same configuration as is disclosed in FIG. 5 and the second $O_2$ sensor may be placed at a position between catalyst beds.

The second $O_2$ sensor 98 is followed by a low-pass filter 500 having the cut-off frequency of 1000 Hz. Since the filter 500 and the filter 60 do not have linear characteristics, they may be of the type called linearizer that can compensate the deficiency.

While the throttle valve is operated by a stepper motor in the foregoing embodiments, it can instead be mechanically linked with the accelerator pedal and be directly operated in response to accelerator pedal depression.

While the EGR control valve of a motor-powered type is used in the EGR mechanism, it is alternative possible to use that having a diaphragm operable by the vacuum pressure in the intake pipe.

The second catalytic converter 30 may be omitted, although it depends on the performance of the first catalytic converter.

While a low-pass filter is used, it is alternatively possible to use a band pass filter equivalent thereto.

While the foregoing embodiments were described as using the output of a single air/fuel ratio sensor installed at the exhaust system confluence point, the invention is not limited to this arrangement and it is possible instead to conduct the air/fuel ratio feedback control based on air/fuel ratios detected by air/fuel ratio sensors installed for the individual cylinders.

While the air/fuel ratio is, in fact, expressed as an equivalence ratio, the air/fuel ratio and the equivalence ratio can instead be determined separately.

While the feedback correction coefficients KSTR, #nKLAF and KLAF were calculated as multiplication coefficients (terms) in the foregoing embodiments, they can instead be calculated as addition terms.

While the aforesaid embodiments were described with respect to examples using STRs, MRACS (model reference adaptive control systems) can be used instead.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling fuel metering for an internal combustion engine having an air intake system including a throttle valve, a plurality of cylinders, and an exhaust system, said system comprising:

(a) an air/fuel ratio sensor located in the exhaust system of the engine for detecting an air/fuel ratio of an exhaust gas of the engine;

(b) engine operating condition detecting means for detecting engine operating conditions including at least engine speed and engine load;

(c) basic fuel injection quantity determining means for determining a basic quantity of fuel injection for individual cylinders based on at least the detected engine operating conditions and a change in an effective opening area of the throttle valve;

(d) a catalytic converter installed downstream of said air/fuel ratio sensor;

(e) a feedback loop for calculating a feedback correction coefficient to correct the basic quantity of fuel injection such that the detected air/fuel ratio detected by said air/fuel ratio sensor is brought to a desired air/fuel ratio;

(f) output fuel injection quantity determining means for correcting the basic quantity of fuel injection based on the feedback correction coefficient, to determine an output quantity of fuel injection;

(g) fuel adhesion correction means for determining an adhered fuel correction based on a quantity of fuel adhered on an intake manifold wall of the engine;

(h) output fuel injection correcting means for correcting the output quantity of fuel injection based on the adhered fuel correction; and (i) fuel injector means for injecting fuel in the individual cylinders of the engine based on the corrected quantity of fuel injection.

2. A system according to claim 1, further including:
(a) an exhaust gas recirculation means for recirculating a portion of the exhaust gas to said air intake system; and
(b) exhaust gas recirculation correction coefficient calculating means for calculating an exhaust gas recirculation correction coefficient based on a recirculation ratio of the exhaust gas recirculation by said exhaust gas recirculated means, wherein said basic fuel injection quantity determining means corrects the basic quantity of fuel injection based on the exhaust gas recirculation correction coefficient.

3. A system according to claim 1, further including:
(a) a canister purge means for recirculating a purged gas to said air intake system; and
(b) canister purge correction coefficient calculating means for calculating a canister purge correction coefficient based on a mass of the canister purged gas recirculated by said canister purge means, wherein said basic fuel injection quantity determining means corrects the basic quantity of fuel injection based on the canister purge correction coefficient.

4. A system according to claim 1, wherein said second throttle opening area determining means determines the second value based on at least a first-order lag of the throttle opening and a manifold pressure detected by said engine operating condition detecting means.

5. A computer program controlled system for controlling fuel metering for an internal combustion engine having an air intake system including a throttle valve, a plurality of cylinders, and an exhaust system, said system comprising:
(a) basic fuel injection quantity determining means for determining a basic quantity of fuel injection for individual cylinders based on detected engine operating conditions and a change in an effective opening area of a throttle valve in the air intake system;
(b) a feedback loop for calculating a feedback correction coefficient to correct the basic quantity of fuel injection such that a detected air/fuel ratio is brought to a desired air/fuel ratio;
(c) output fuel injection quantity determining means for correcting the basic quantity of fuel injection based on the feedback correction coefficient, to determine an output quantity of fuel injection;
(d) fuel adhesion correction means for determining an adhered fuel correction based on a quantity of fuel adhered on an intake manifold wall of the engine; and
(e) output fuel injection correcting means for correcting the output quantity of fuel injection based on the adhered fuel correction,
wherein said basic fuel injection quantity determining means including
base fuel injection quantity determining means for determining a base quantity of fuel injection based on at least the engine speed and engine load detected by said engine operating condition detecting means:
first throttle opening area determining means for determining a first value indicative of an actual effective opening area of a throttle valve installed in an air intake pipe of the engine:
second throttle opening area determining for determining a second value indicative of a first-lag of the actual effective opening area of the throttle valve;
ratio determining means for determining a ratio of the first value and the second value; and
multiplying means for multiplying the base quantity of fuel injection by the ratio to determine said basic quantity of fuel injection.

6. A computer program controlled system according to claim 5, wherein the engine includes an exhaust gas recirculation system for recirculating a portion of an exhaust gas to said air intake system, said system further including:
(a) exhaust gas recirculation correction coefficient calculating means for calculating an exhaust gas recirculation correction coefficient based on a recirculation ration of the exhaust gas recirculated by the exhaust gas recirculation system, wherein said basic fuel injection quantity determining means corrects the basic quantity of fuel injection based on the exhaust gas recirculation correction coefficient.

7. A computer program controlled system according to claim 5, wherein the engine includes a canister purge system that recirculates a purged gas to said air intake system, said system further including:
(a) canister purge correction coefficient calculating means for calculating a canister purge correction coefficient based on a mass of the canister purged gas recirculated by the canister purge system, wherein said basic fuel injection quantity determining means corrects the basic quantity of fuel injection based on the canister purge correction coefficient.

8. A system according to claim 5, wherein said second throttle opening area determining means determines the second value based on at least a first-order lag of the throttle opening and a manifold pressure detected by said engine operating condition detecting means.

9. A method for controlling fuel metering for an internal combustion engine having an air intake system including a throttle valve, a plurality of cylinders, and an exhaust system, said method comprising the steps of:
(a) a detecting an air/fuel ratio of an exhaust gas of the engine;
(b) detecting engine operating conditions including at least engine speed and engine load;
(c) determining a basic quantity of fuel injection for individual cylinders based on at least the detected engine operating conditions and a change in the effective opening area of the throttle valve;
(d) calculating a feedback correction coefficient to correct the basic quantity of fuel injection such that the detected air/fuel ratio is brought to a desired value;
(e) correcting the basic quantity of fuel injection based on the feedback correction coefficient, to determine an output quantity of fuel injection;
(f) determining an adhered fuel correction based on the quantity of fuel adhered on an intake manifold wall of the engine;
(g) correcting the output quantity of fuel injection based on the adhered fuel correction; and
(h) injecting fuel in the individual cylinders of the engine based on the corrected quantity of fuel injection,
wherein said step of determining said basic fuel injection quantity and change in effective opening area includes the steps of:
determining a base quantity of fuel injection based on at least the engine speed and engine load detected by said engine operating condition detecting means;
determining a first value indicative of an actual effective opening area of a throttle valve installed in an air intake pipe of the engine;
determining a second value indicative of a first-lag of the actual effective opening area of the throttle valve ratio;

determining a ratio of the first value and the second value; and multiplying the base quantity of fuel injection by the ratio to determine said basic quantity of fuel injection.

10. A method according to claim 9, further including:

(a) recirculating a portion of the exhaust gas to the air intake system; and (b) calculating an exhaust gas recirculation correction coefficient based on a recirculation ratio of the exhaust gas recirculated by an exhaust gas recirculation system, wherein said basic quantity of fuel injection is corrected based on the exhaust gas recirculation correction coefficient.

11. A method according to claim 9, further including:

(a) recirculating a canister purged gas to the air intake system; and (b) calculating a canister purge correction coefficient based on a mass of the canister purged gas recirculated by a canister purge system, wherein said basic fuel injection quantity determining means corrects the basic quantity of fuel injection based on the canister purge correction coefficient.

12. A system according to claim 9, wherein said step of determining the second value is based on at least a first-order lag of the throttle opening and a manifold pressure detected by said engine operating condition detecting means.

13. A computer program for controlling fuel metering for an internal combustion engine having an air intake system including a throttle valve, a plurality of cylinders, and an exhaust system, said computer program comprising the steps of:

(a) determining a basic quantity of fuel injection for individual cylinders based on detected engine operating conditions and a change in an effective opening area of a throttle valve in the air intake system;

(b) calculating a feedback correction coefficient to correct the basic quantity of fuel injection such that a detected air/fuel ratio is brought to a desired value;

(c) correcting the basic quantity of fuel injection based on the feedback correction coefficient, to determine an output quantity of fuel injection;

(d) determining an adhered fuel correction based on a quantity of fuel adhered on an intake manifold wall of the engine; and (e) correcting the output quantity of fuel injection based on the adhered fuel correction, wherein said step of determining said basic fuel injection quantity and change in effective opening area includes the steps of:

determining a base quantity of fuel injection based on at least the engine speed and engine load detected by said engine operating condition detecting means:

determining a first value indicative of an actual effective opening area of a throttle valve installed in an air intake pipe of the engine:

determining a second value indicative of a first-lag of the actual effective opening area of the throttle valve:

determining a ratio of the first value and the second value; and multiplying the base quantity of fuel injection by the ratio to determine said basic quantity of fuel injection.

14. A system according to claim 13, wherein said step of determining the second value is based on at least a first-order lag of the throttle opening and a manifold pressure detected by said engine operating condition detecting means.

* * * * *

UNITED STATES PATENT AND TRADEMARK OFFICE
CERTIFICATE OF CORRECTION

PATENT NO. : 5,758,308

DATED : May 26, 1998

INVENTOR(S) : Maki et al.

It is certified that error appears in the above-identified patent and that said Letters Patent is hereby corrected as shown below:

Column 42, line 65, after "injection" insert therefor --

, wherein said basic fuel injection quantity determining means including base fuel injection quantity determining means for determining a base quantity of fuel injection based on at least the engine speed and engine load detected by said engine operating condition detecting means;

first throttle opening area determining means for determining a first value indicative of an actual effective opening area of a throttle valve installed in an air intake pipe of the engine;

second throttle opening area determining for determining a second value indicative of a first-lag of the actual effective opening area of the throttle valve;

ratio determining means for determining a ratio of the first value and the second value; and multiplying means for multiplying the base quantity of fuel injection by the ratio to determine said basic quantity of fuel injection. --

UNITED STATES PATENT AND TRADEMARK OFFICE
CERTIFICATE OF CORRECTION

PATENT NO. : 5,758,308

DATED : May 26, 1998

INVENTOR(S) : Maki et al.

It is certified that error appears in the above-identified patent and that said Letters Patent is hereby corrected as shown below:

```
Column 43, line 55 and line 59, delete ":" insert therefor
-- ; --

Column 44, line 8, delete "ration" insert therefor -- ratio --

Column 46, lines 19, 22 and 24,  delete ":" insert therefor
-- ; --
```

Signed and Sealed this

Twenty-seventh Day of October, 1998

*Attest:*

BRUCE LEHMAN

*Attesting Officer*   Commissioner of Patents and Trademarks